United States Patent
Schofield et al.

(10) Patent No.: US 8,692,659 B2
(45) Date of Patent: *Apr. 8, 2014

(54) ACCESSORY MOUNTING SYSTEM FOR VEHICLE

(71) Applicant: Magna Electronics Inc., Auburn Rd., MI (US)

(72) Inventors: Kenneth Schofield, Holland, MI (US); Niall R. Lynam, Holland, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/689,801

(22) Filed: Nov. 30, 2012

(65) Prior Publication Data

US 2013/0141579 A1  Jun. 6, 2013

Related U.S. Application Data

(63) Continuation of application No. 13/345,303, filed on Jan. 6, 2012, now Pat. No. 8,325,028, which is a continuation of application No. 13/039,962, filed on (Continued)

(51) Int. Cl.
    *B60R 1/00* (2006.01)

(52) U.S. Cl.
    USPC .................. 340/438; 340/435; 340/425.5

(58) Field of Classification Search
    CPC ............ B60R 1/00; B60R 1/02; B60R 1/025; B60R 1/04; B60R 1/006; B60R 1/12; B60R 11/02; B60R 11/04; B60R 2011/0033
    USPC .............. 340/425.5, 435, 436, 438, 457, 461, 340/903, 937; 348/148, 151; 359/844, 872; 362/492, 494, 503; 307/10.1, 10.2
    See application file for complete search history.

(56) References Cited

U.S. PATENT DOCUMENTS

| 2,414,223 A | 1/1947 | De Virgilis |
| 3,870,404 A | 3/1975 | Wilson et al. |

(Continued)

FOREIGN PATENT DOCUMENTS

| DE | 3525672 | 1/1987 |
| DE | 3605704 | 8/1987 |

(Continued)

OTHER PUBLICATIONS

"Combination of rain sensing, autolamps and telephone antenna in one module," Research Disclosure, Kenneth Mason Publications, Hampshire, GB No. 412, Aug. 1998, p. 1045XP-000824825.

(Continued)

*Primary Examiner* — Van T. Trieu

(74) *Attorney, Agent, or Firm* — Gardner, Linn, Burkhart & Flory, LLP

(57) ABSTRACT

An accessory mounting system for a vehicle includes an attachment element attached at an in-cabin surface of a vehicle windshield of a vehicle. The attachment element has a mirror mounting button. At least one attachment member is attached at the in-cabin surface of the vehicle windshield local to the attachment element. An interior rearview mirror assembly has a mirror head and a mirror support. The mirror head includes a mirror reflective element and a mirror casing. The mirror support includes a mirror mount that is configured to mount the interior rearview mirror assembly to the mirror mounting button of the attachment element. A structure is configured for mounting to the attachment member and is configured to receive and be supported by the attachment member. The structure is configured to accommodate a forward facing camera having a field of view through the vehicle windshield.

97 Claims, 21 Drawing Sheets

Related U.S. Application Data now Pat. No. 8,309,907, which is a continuation of application No. 12/467,660, filed on May 18, 2009, now Pat. No. 7,888,629, which is a continuation of application No. 12/197,660, filed on Aug. 25, 2008, now Pat. No. 7,538,316, which is a continuation of application No. 11/828,880, filed on Jul. 26, 2007, now Pat. No. 7,420,159, which is a continuation of application No. 11/699,271, filed on Jan. 29, 2007, now Pat. No. 7,265,342, which is a continuation of application No. 11/418,906, filed on May 5, 2006, now Pat. No. 7,262,406, which is a continuation of application No. 10/913,748, filed on Aug. 6, 2004, now Pat. No. 7,041,965, which is a continuation of application No. 10/618,334, filed on Jul. 11, 2003, now Pat. No. 6,774,356, which is a continuation of application No. 09/997,579, filed on Nov. 29, 2001, now Pat. No. 6,593,565, which is a continuation of application No. 09/433,467, filed on Nov. 4, 1999, now Pat. No. 6,326,613, which is a continuation-in-part of application No. 09/003,966, filed on Jan. 7, 1998, now Pat. No. 6,250,148, said application No. 12/276,770 is a continuation-in-part of application No. 12/052,341, filed on Mar. 20, 2008, now Pat. No. 7,579,940, which is a continuation of application No. 11/625,374, filed on Jan. 22, 2007, now Pat. No. 7,579,939, which is a continuation of application No. 10/755,915, filed on Jan. 13, 2004, now Pat. No. 7,446,650, which is a continuation of application No. 09/793,002, filed on Feb. 26, 2001, now Pat. No. 6,690,268, said application No. 10/755,915 is a continuation-in-part of application No. 10/232,122, which is a continuation of application No. 09/710,016, which is a continuation-in-part of application No. 09/513,941, which is a continuation-in-part of application No. 09/213,075, filed on Dec. 16, 1998, now Pat. No. 6,124,647, said application No. 10/755,915 is a continuation-in-part of application No. 10/279,059, filed on Oct. 23, 2002, now Pat. No. 6,774,774, which is a continuation of application No. 09/876,816, filed on Jun. 7, 2001, now Pat. No. 6,472,979, which is a continuation of application No. 09/513,941, which is a continuation-in-part of application No. 09/213,075, said application No. 10/755,915 is a continuation-in-part of application No. 10/618,334, which is a continuation of application No. 09/997,579, which is a continuation of application No. 09/433,467, which is a continuation-in-part of application No. 09/003,966, said application No. 10/755,915 is a continuation-in-part of application No. 10/270,830, filed on Oct. 15, 2002, now Pat. No. 6,717,524, which is a continuation of application No. 09/903,336, filed on Jul. 11, 2001, now Pat. No. 6,466,136, which is a continuation of application No. 09/396,179, filed on Sep. 14, 1999, now Pat. No. 6,278,377, which is a continuation-in-part of application No. 09/382,720, filed on Aug. 25, 1999, now Pat. No. 6,243,003.

(60) Provisional application No. 60/263,680, filed on Jan. 23, 2001, provisional application No. 60/243,986, filed on Oct. 27, 2000, provisional application No. 60/238,483, filed on Oct. 6, 2000, provisional application No. 60/237,077, filed on Sep. 30, 2000, provisional application No. 60/234,412, filed on Sep. 21, 2000, provisional application No. 60/218,336, filed on Jul. 14, 2000, provisional application No. 60/186,520, filed on Mar. 2, 2000.

(56) References Cited

U.S. PATENT DOCUMENTS

| | | |
|---|---|---|
| 4,065,750 A | 12/1977 | Duncan et al. |
| 4,254,931 A | 3/1981 | Aikens et al. |
| 4,274,078 A | 6/1981 | Isobe et al. |
| 4,286,305 A | 8/1981 | Pilat et al. |
| 4,443,057 A | 4/1984 | Bauer et al. |
| 4,646,210 A | 2/1987 | Skogler et al. |
| 4,646,673 A | 3/1987 | Fordyce |
| 4,733,336 A | 3/1988 | Skogler et al. |
| 4,760,497 A | 7/1988 | Roston |
| 4,768,135 A | 8/1988 | Kretschmer et al. |
| 4,781,436 A | 11/1988 | Armbruster |
| 4,793,690 A | 12/1988 | Gahan et al. |
| 4,807,096 A | 2/1989 | Skogler et al. |
| 4,859,867 A | 8/1989 | Larson et al. |
| 4,863,130 A | 9/1989 | Marks, Jr. |
| 4,871,917 A | 10/1989 | O'Farrell et al. |
| 4,886,960 A | 12/1989 | Molyneux et al. |
| 4,891,559 A | 1/1990 | Matsumoto et al. |
| 4,895,097 A | 1/1990 | Lechnir |
| 4,916,374 A | 4/1990 | Schierbeek et al. |
| 4,930,742 A | 6/1990 | Schofield et al. |
| 4,936,533 A | 6/1990 | Adams et al. |
| 4,956,591 A | 9/1990 | Schierbeek et al. |
| 4,967,319 A | 10/1990 | Seko |
| 4,973,844 A | 11/1990 | O'Farrell et al. |
| 5,058,851 A | 10/1991 | Lawlor et al. |
| 5,096,287 A | 3/1992 | Kakinami et al. |
| 5,100,095 A | 3/1992 | Haan et al. |
| 5,140,455 A | 8/1992 | Varaprasad et al. |
| 5,151,816 A | 9/1992 | Varaprasad et al. |
| 5,178,448 A | 1/1993 | Adams et al. |
| 5,193,029 A | 3/1993 | Schofield et al. |
| 5,255,442 A | 10/1993 | Schierbeek et al. |
| 5,264,997 A | 11/1993 | Hutchisson et al. |
| 5,266,873 A | 11/1993 | Arditi et al. |
| 5,327,288 A | 7/1994 | Wellington et al. |
| 5,330,149 A | 7/1994 | Haan et al. |
| D351,370 S | 10/1994 | Lawlor et al. |
| 5,361,190 A | 11/1994 | Roberts |
| 5,371,659 A | 12/1994 | Pastrick et al. |
| 5,377,949 A | 1/1995 | Haan et al. |
| 5,426,294 A | 6/1995 | Kobayashi et al. |
| 5,439,305 A | 8/1995 | Santo |
| 5,455,716 A | 10/1995 | Suman et al. |
| 5,469,298 A | 11/1995 | Suman et al. |
| 5,475,366 A | 12/1995 | Van Lente et al. |
| 5,487,522 A | 1/1996 | Hook |
| 5,488,352 A | 1/1996 | Jasper |
| 5,497,306 A | 3/1996 | Pastrick |
| 5,521,760 A | 5/1996 | DeYoung et al. |
| 5,530,240 A | 6/1996 | Larson et al. |
| 5,537,003 A | 7/1996 | Bechtel et al. |
| 5,550,677 A | 8/1996 | Schofield et al. |
| 5,566,224 A | 10/1996 | Azam et al. |
| 5,570,127 A | 10/1996 | Schmidt |
| 5,572,354 A | 11/1996 | Desmond et al. |
| 5,576,687 A | 11/1996 | Blank et al. |
| 5,582,383 A | 12/1996 | Mertens et al. |
| 5,587,236 A | 12/1996 | Agrawal et al. |
| 5,609,652 A | 3/1997 | Yamada et al. |
| 5,615,857 A | 4/1997 | Hook |
| 5,631,638 A | 5/1997 | Kaspar et al. |
| 5,632,551 A | 5/1997 | Roney et al. |
| 5,649,756 A | 7/1997 | Adams et al. |
| 5,654,686 A | 8/1997 | Geschke et al. |
| 5,659,423 A | 8/1997 | Schierbeek et al. |
| 5,660,454 A | 8/1997 | Mori et al. |
| 5,661,455 A | 8/1997 | Van Lente et al. |
| 5,666,157 A | 9/1997 | Aviv |
| 5,669,698 A | 9/1997 | Veldman et al. |
| 5,669,705 A | 9/1997 | Pastrick et al. |

(56) References Cited

U.S. PATENT DOCUMENTS

| | | |
|---|---|---|
| 5,671,996 A | 9/1997 | Bos et al. |
| 5,689,241 A | 11/1997 | Clarke, Sr. et al. |
| 5,691,848 A | 11/1997 | Van Lente et al. |
| 5,703,568 A | 12/1997 | Hegyi |
| 5,708,410 A | 1/1998 | Blank et al. |
| 5,708,743 A | 1/1998 | DeAndrea et al. |
| 5,774,283 A | 6/1998 | Nagel et al. |
| 5,786,772 A | 7/1998 | Schofield et al. |
| 5,796,094 A | 8/1998 | Schofield et al. |
| 5,796,176 A | 8/1998 | Kramer et al. |
| 5,798,575 A | 8/1998 | O'Farrell et al. |
| 5,820,097 A | 10/1998 | Spooner |
| 5,820,245 A | 10/1998 | Desmond et al. |
| 5,825,283 A | 10/1998 | Camhi |
| 5,837,891 A | 11/1998 | Bridge |
| 5,845,000 A | 12/1998 | Breed et al. |
| 5,863,116 A | 1/1999 | Pastrick et al. |
| 5,878,353 A | 3/1999 | ul Azam et al. |
| 5,910,854 A | 6/1999 | Varaprasad et al. |
| 5,923,027 A | 7/1999 | Stam et al. |
| 5,926,087 A | 7/1999 | Busch et al. |
| 5,940,503 A | 8/1999 | Palett et al. |
| 5,947,586 A | 9/1999 | Weber |
| 5,971,552 A | 10/1999 | O'Farrell et al. |
| 6,000,823 A | 12/1999 | Desmond et al. |
| 6,006,159 A | 12/1999 | Schmier et al. |
| 6,020,704 A | 2/2000 | Buschur |
| 6,028,537 A | 2/2000 | Suman et al. |
| 6,056,410 A | 5/2000 | Hoekstra et al. |
| 6,066,933 A | 5/2000 | Ponziani |
| 6,087,942 A | 7/2000 | Sleichter, III et al. |
| 6,087,953 A | 7/2000 | DeLine et al. |
| 6,089,721 A | 7/2000 | Schierbeek |
| 6,097,023 A | 8/2000 | Schofield |
| 6,097,024 A | 8/2000 | Stam et al. |
| 6,100,798 A | 8/2000 | Liang |
| 6,108,084 A | 8/2000 | Winner |
| 6,124,647 A | 9/2000 | Marcus et al. |
| 6,124,886 A | 9/2000 | DeLine et al. |
| 6,151,065 A | 11/2000 | Steed et al. |
| 6,158,655 A | 12/2000 | DeVries, Jr. et al. |
| 6,166,625 A | 12/2000 | Teowee et al. |
| 6,166,698 A | 12/2000 | Turnbull et al. |
| 6,170,955 B1 | 1/2001 | Campbell et al. |
| 6,172,613 B1 | 1/2001 | DeLine et al. |
| 6,176,602 B1 | 1/2001 | Pastrick et al. |
| 6,198,087 B1 | 3/2001 | Boon |
| 6,198,409 B1 | 3/2001 | Schofield et al. |
| 6,207,967 B1 | 3/2001 | Hochstein |
| 6,210,008 B1 | 4/2001 | Hoekstra et al. |
| 6,222,460 B1 | 4/2001 | DeLine et al. |
| 6,229,226 B1 | 5/2001 | Kramer et al. |
| 6,229,434 B1 | 5/2001 | Knapp et al. |
| 6,243,003 B1 | 6/2001 | DeLine et al. |
| 6,250,148 B1 | 6/2001 | Lynam |
| 6,259,359 B1 | 7/2001 | Fujinami et al. |
| 6,276,821 B1 | 8/2001 | Pastrick et al. |
| 6,278,377 B1 | 8/2001 | DeLine et al. |
| 6,291,905 B1 | 9/2001 | Drummond et al. |
| 6,294,989 B1 | 9/2001 | Schofield et al. |
| 6,296,379 B1 | 10/2001 | Pastrick |
| 6,299,316 B1 | 10/2001 | Fletcher et al. |
| 6,299,319 B1 | 10/2001 | Mertens et al. |
| 6,305,807 B1 | 10/2001 | Schierbeek |
| 6,313,454 B1 | 11/2001 | Bos et al. |
| 6,318,697 B1 | 11/2001 | Corrado et al. |
| 6,320,176 B1 | 11/2001 | Schofield et al. |
| 6,323,477 B1 | 11/2001 | Blasing et al. |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,013 B1 | 1/2002 | Battiti et al. |
| 6,341,523 B2 | 1/2002 | Lynam |
| 6,353,392 B1 | 3/2002 | Schofield et al. |
| 6,366,213 B2 | 4/2002 | DeLine et al. |
| 6,386,742 B1 | 5/2002 | DeLine et al. |
| 6,392,218 B1 | 5/2002 | Kuehnle |
| 6,406,152 B1 | 6/2002 | Hoekstra et al. |
| 6,412,973 B1 | 7/2002 | Bos et al. |
| 6,420,975 B1 | 7/2002 | DeLine et al. |
| 6,428,172 B1 | 8/2002 | Hutzel et al. |
| 6,433,676 B2 | 8/2002 | DeLine et al. |
| 6,445,287 B1 | 9/2002 | Schofield et al. |
| 6,452,148 B1 | 9/2002 | Bendicks et al. |
| 6,466,136 B2 | 10/2002 | DeLine et al. |
| 6,477,464 B2 | 11/2002 | McCarthy et al. |
| 6,496,117 B2 | 12/2002 | Gutta et al. |
| 6,498,967 B1 | 12/2002 | Hopkins et al. |
| 6,501,387 B2 | 12/2002 | Skiver et al. |
| 6,513,252 B1 | 2/2003 | Schierbeek et al. |
| 6,516,664 B2 | 2/2003 | Lynam |
| 6,545,598 B1 | 4/2003 | De Villeroche |
| 6,555,804 B1 | 4/2003 | Blasing |
| 6,564,122 B1 | 5/2003 | Huertgen et al. |
| 6,587,573 B1 | 7/2003 | Stam et al. |
| 6,587,968 B1 | 7/2003 | Leyva |
| 6,593,565 B2 | 7/2003 | Heslin et al. |
| 6,596,978 B2 | 7/2003 | Hochstein |
| 6,603,137 B2 | 8/2003 | Hochstein |
| 6,614,043 B2 | 9/2003 | Hochstein |
| 6,615,650 B2 | 9/2003 | Mahner et al. |
| 6,617,564 B2 | 9/2003 | Ockerse et al. |
| 6,646,359 B2 | 11/2003 | Schaefer et al. |
| 6,648,477 B2 | 11/2003 | Hutzel et al. |
| 6,653,615 B2 | 11/2003 | Bechtel et al. |
| 6,660,360 B2 | 12/2003 | Mertzel et al. |
| 6,672,744 B2 | 1/2004 | DeLine et al. |
| 6,672,745 B1 | 1/2004 | Bauer et al. |
| 6,690,268 B2 | 2/2004 | Schofield et al. |
| 6,731,071 B2 | 5/2004 | Baarman |
| 6,734,904 B1 | 5/2004 | Boon et al. |
| 6,737,963 B2 | 5/2004 | Gutta et al. |
| 6,738,088 B1 | 5/2004 | Uskolovsky et al. |
| 6,742,904 B2 | 6/2004 | Bechtel et al. |
| 6,742,905 B2 | 6/2004 | Suyama et al. |
| 6,765,480 B2 | 7/2004 | Tseng |
| 6,768,092 B2 | 7/2004 | Sakata |
| 6,774,356 B2 | 8/2004 | Heslin et al. |
| 6,774,810 B2 | 8/2004 | DeLine et al. |
| 6,784,129 B2 | 8/2004 | Seto et al. |
| 6,799,904 B2 | 10/2004 | Schaefer et al. |
| 6,803,574 B2 | 10/2004 | Abel et al. |
| 6,806,485 B2 | 10/2004 | Jackson, Jr. |
| 6,812,645 B2 | 11/2004 | Baarman |
| 6,824,281 B2 | 11/2004 | Schofield et al. |
| 6,825,620 B2 | 11/2004 | Kuennen et al. |
| 6,831,268 B2 | 12/2004 | Bechtel et al. |
| 6,831,288 B1 | 12/2004 | Schmitt et al. |
| 6,832,719 B2 | 12/2004 | DeVries, Jr. et al. |
| 6,841,767 B2 | 1/2005 | Mindl et al. |
| 6,867,510 B2 | 3/2005 | Kramer et al. |
| 6,877,870 B2 | 4/2005 | Krug |
| 6,877,888 B2 | 4/2005 | DeLine et al. |
| 6,889,064 B2 | 5/2005 | Baratono et al. |
| 6,894,619 B1 | 5/2005 | Schmitt et al. |
| 6,917,163 B2 | 7/2005 | Baarman |
| 6,924,470 B2 | 8/2005 | Bechtel et al. |
| 6,930,593 B2 | 8/2005 | Crawshaw |
| 6,968,736 B2 | 11/2005 | Lynam |
| 6,975,215 B2 | 12/2005 | Schofield et al. |
| 6,975,390 B2 | 12/2005 | Mindl et al. |
| 6,980,092 B2 | 12/2005 | Turnbull et al. |
| 6,995,354 B2 | 2/2006 | Hagan et al. |
| 7,004,593 B2 | 2/2006 | Weller et al. |
| 7,016,783 B2 | 3/2006 | Hac et al. |
| 7,041,965 B2 | 5/2006 | Heslin et al. |
| 7,053,761 B2 | 5/2006 | Schofield et al. |
| 7,075,511 B1 | 7/2006 | Mousseau et al. |
| 7,108,409 B2 | 9/2006 | DeLine et al. |
| 7,111,996 B2 | 9/2006 | Seger et al. |
| 7,188,963 B2 | 3/2007 | Schofield et al. |
| 7,195,381 B2 | 3/2007 | Lynam et al. |
| 7,199,767 B2 | 4/2007 | Spero |
| 7,205,524 B2 | 4/2007 | Drummond et al. |

(56) References Cited

U.S. PATENT DOCUMENTS

| | | |
|---|---|---|
| 7,242,320 B2 | 7/2007 | Lawlor et al. |
| 7,249,860 B2 | 7/2007 | Kulas et al. |
| 7,255,451 B2 | 8/2007 | McCabe et al. |
| 7,255,465 B2 | 8/2007 | DeLine et al. |
| 7,262,406 B2 | 8/2007 | Heslin et al. |
| 7,265,342 B2 | 9/2007 | Heslin et al. |
| 7,289,037 B2 | 10/2007 | Uken et al. |
| 7,297,932 B2 | 11/2007 | Georgiadis et al. |
| 7,304,680 B2 | 12/2007 | Köhler et al. |
| 7,311,428 B2 | 12/2007 | DeLine et al. |
| 7,322,755 B2 | 1/2008 | Neumann et al. |
| 7,370,983 B2 | 5/2008 | DeWind et al. |
| 7,420,159 B2 | 9/2008 | Heslin et al. |
| 7,438,774 B2 | 10/2008 | Kurfiss et al. |
| 7,446,427 B2 | 11/2008 | Parker et al. |
| 7,460,007 B2 | 12/2008 | Schofield et al. |
| 7,467,883 B2 | 12/2008 | DeLine et al. |
| 7,480,149 B2 | 1/2009 | DeWard et al. |
| 7,490,944 B2 | 2/2009 | Blank et al. |
| 7,497,632 B2 | 3/2009 | Kajino et al. |
| 7,538,316 B2 | 5/2009 | Heslin et al. |
| 7,570,793 B2 | 8/2009 | Lages et al. |
| 7,609,961 B2 | 10/2009 | Park |
| 7,646,889 B2 | 1/2010 | Tsukamoto |
| 7,651,228 B2 | 1/2010 | Skiver et al. |
| 7,657,052 B2 | 2/2010 | Larson et al. |
| 7,658,521 B2 | 2/2010 | DeLine et al. |
| 7,697,028 B1 | 4/2010 | Johnson |
| 7,719,408 B2 | 5/2010 | DeWard et al. |
| 7,728,721 B2 | 6/2010 | Schofield et al. |
| 7,780,137 B2 | 8/2010 | Hansel et al. |
| 7,780,454 B2 | 8/2010 | Baranski |
| 7,811,011 B2 | 10/2010 | Blaesing et al. |
| 7,817,205 B2 | 10/2010 | Schulte et al. |
| 7,837,173 B2 | 11/2010 | Zinzer et al. |
| 7,855,353 B2 | 12/2010 | Blaesing et al. |
| 7,855,755 B2 | 12/2010 | Weller et al. |
| 7,860,275 B2 | 12/2010 | Leleve et al. |
| 7,864,981 B2 | 1/2011 | Leleve et al. |
| 7,888,629 B2 | 2/2011 | Heslin et al. |
| 7,889,086 B2 | 2/2011 | Schafer et al. |
| 7,911,356 B2 | 3/2011 | Wohlfahrt et al. |
| 7,914,188 B2 | 3/2011 | DeLine et al. |
| 7,916,009 B2 | 3/2011 | Schofield et al. |
| 7,940,305 B2 | 5/2011 | Adameck |
| 7,965,336 B2 | 6/2011 | Bingle et al. |
| 7,994,471 B2 | 8/2011 | Heslin et al. |
| 8,051,707 B2 | 11/2011 | Roehr et al. |
| 8,094,002 B2 | 1/2012 | Schofield et al. |
| 8,100,568 B2 | 1/2012 | DeLine et al. |
| 8,134,117 B2 | 3/2012 | Heslin et al. |
| 8,179,437 B2 | 5/2012 | Schofield et al. |
| 8,192,095 B2 | 6/2012 | Kortan et al. |
| 8,256,821 B2 | 9/2012 | Lawlor et al. |
| 8,288,711 B2 | 10/2012 | Heslin et al. |
| 8,309,907 B2 | 11/2012 | Heslin et al. |
| 8,325,028 B2 | 12/2012 | Schofield et al. |
| 8,339,453 B2 | 12/2012 | Blake, III et al. |
| 2002/0075387 A1 | 6/2002 | Janssen |
| 2002/0126457 A1 | 9/2002 | Kameyama |
| 2004/0200948 A1 | 10/2004 | Bos et al. |
| 2005/0237385 A1 | 10/2005 | Kosaka et al. |
| 2006/0050018 A1 | 3/2006 | Hutzel et al. |
| 2006/0061008 A1 | 3/2006 | Karner et al. |
| 2007/0132610 A1 | 6/2007 | Guernalec et al. |
| 2007/0235638 A1 | 10/2007 | Backes et al. |
| 2008/0092673 A1 | 4/2008 | Hansel et al. |
| 2010/0208077 A1 | 8/2010 | DeWard et al. |
| 2011/0155874 A1 | 6/2011 | Roehr et al. |
| 2012/0224065 A1 | 9/2012 | Schofield et al. |
| 2012/0310519 A1 | 12/2012 | Lawlor et al. |

FOREIGN PATENT DOCUMENTS

| | | |
|---|---|---|
| DE | 9306989.8 | 7/1993 |
| DE | 4214223 | 11/1993 |
| DE | 4329983 | 3/1995 |
| DE | 29513369 | 12/1995 |
| DE | 19647200 | 1/1998 |
| DE | 29805142 | 6/1998 |
| DE | 19755008 | 7/1999 |
| DE | 10132982 | 1/2003 |
| DE | 10211444 | 10/2003 |
| DE | 10237554 | 3/2004 |
| DE | 10237607 | 3/2004 |
| DE | 10342837 | 4/2005 |
| DE | 102005002686 | 8/2006 |
| DE | 102005015973 | 10/2006 |
| DE | 102006039065 | 3/2007 |
| EP | 0461424 | 12/1991 |
| EP | 0667254 | 8/1995 |
| EP | 0928723 | 7/1999 |
| EP | 0969275 | 1/2000 |
| EP | 1376051 | 1/2004 |
| EP | 1389565 | 2/2004 |
| GB | 2210835 | 6/1989 |
| GB | 2316379 | 2/1998 |
| JP | 59029539 | 2/1984 |
| JP | 62043543 | 2/1987 |
| JP | 11131880 | 5/1999 |
| JP | 11254925 | 9/1999 |
| WO | WO9814974 | 4/1998 |
| WO | WO9914088 | 3/1999 |
| WO | WO9923828 | 5/1999 |

OTHER PUBLICATIONS

N.R. Lynam, "Electrochromic Automotive Day/Night Minor," *SAE Technical Paper Series*, 870636 (1987).

N.R. Lynam, "Smart Windows for Automobiles," *SAE Technical Paper Series*, 900419 (1990).

N.R. Lynam and A. Agrawal, "Automotive Applications of Chromogenic Materials," from *Large Area Chromogenics: Materials and Devices for Transmittance Control*, C.M. Lampert and C.G. Granquist, Eds, Optical Engineering Press, Washington (1990).

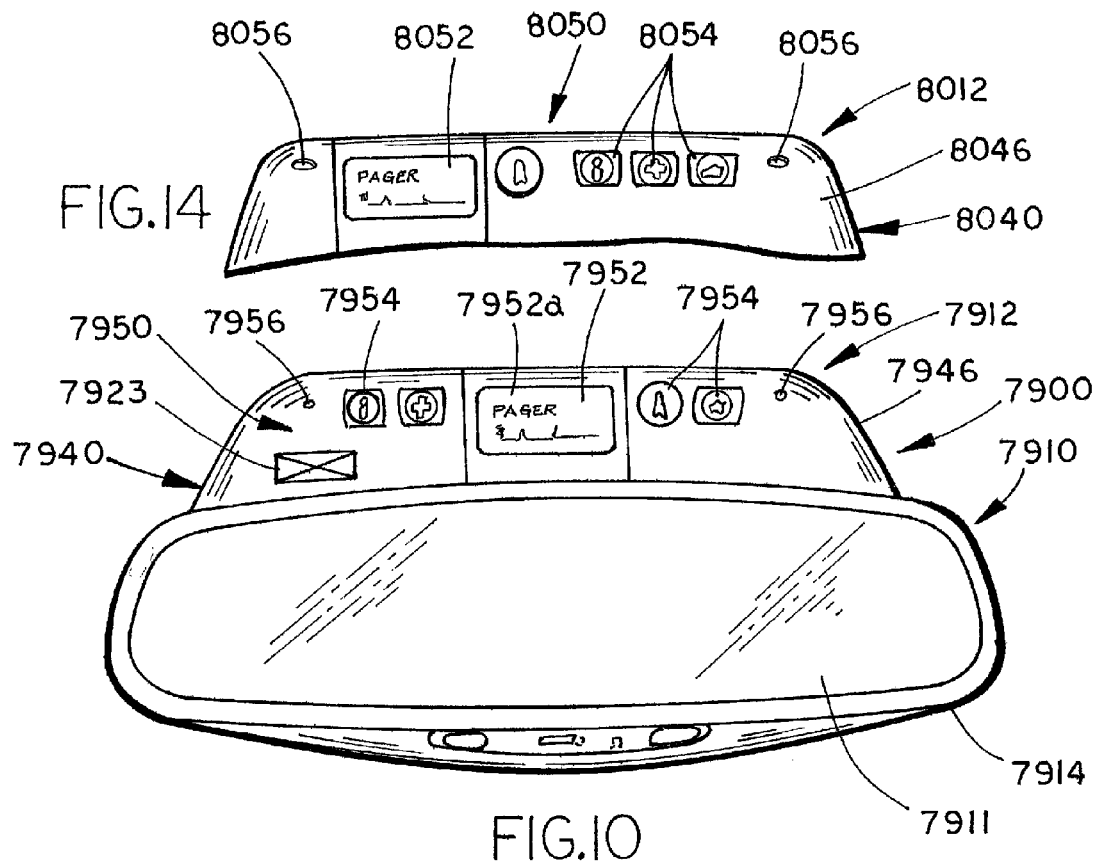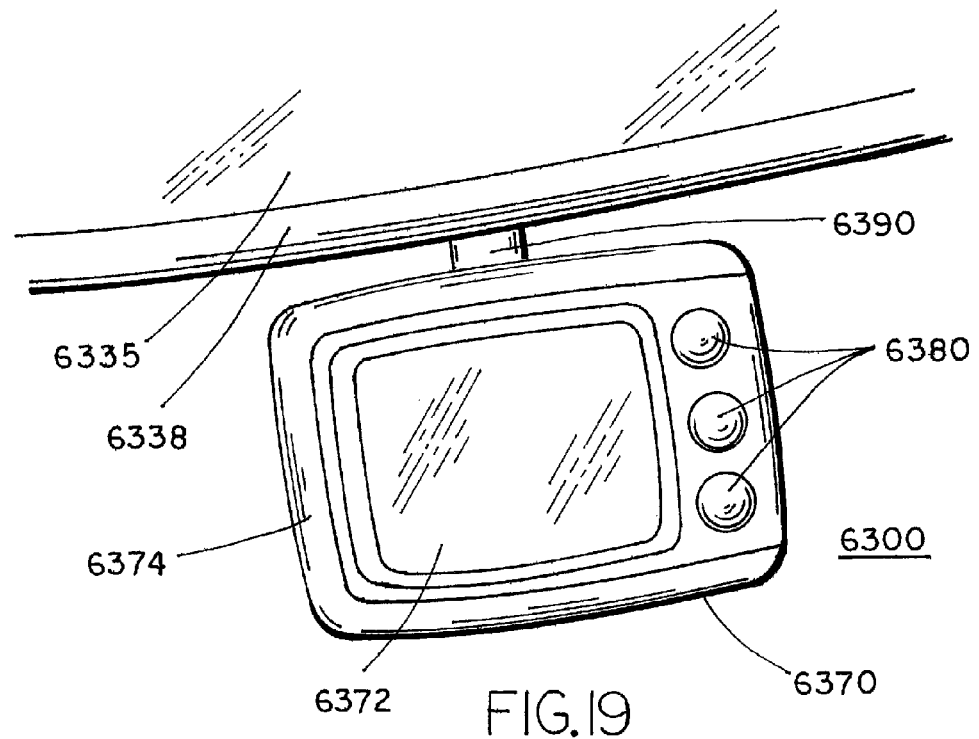

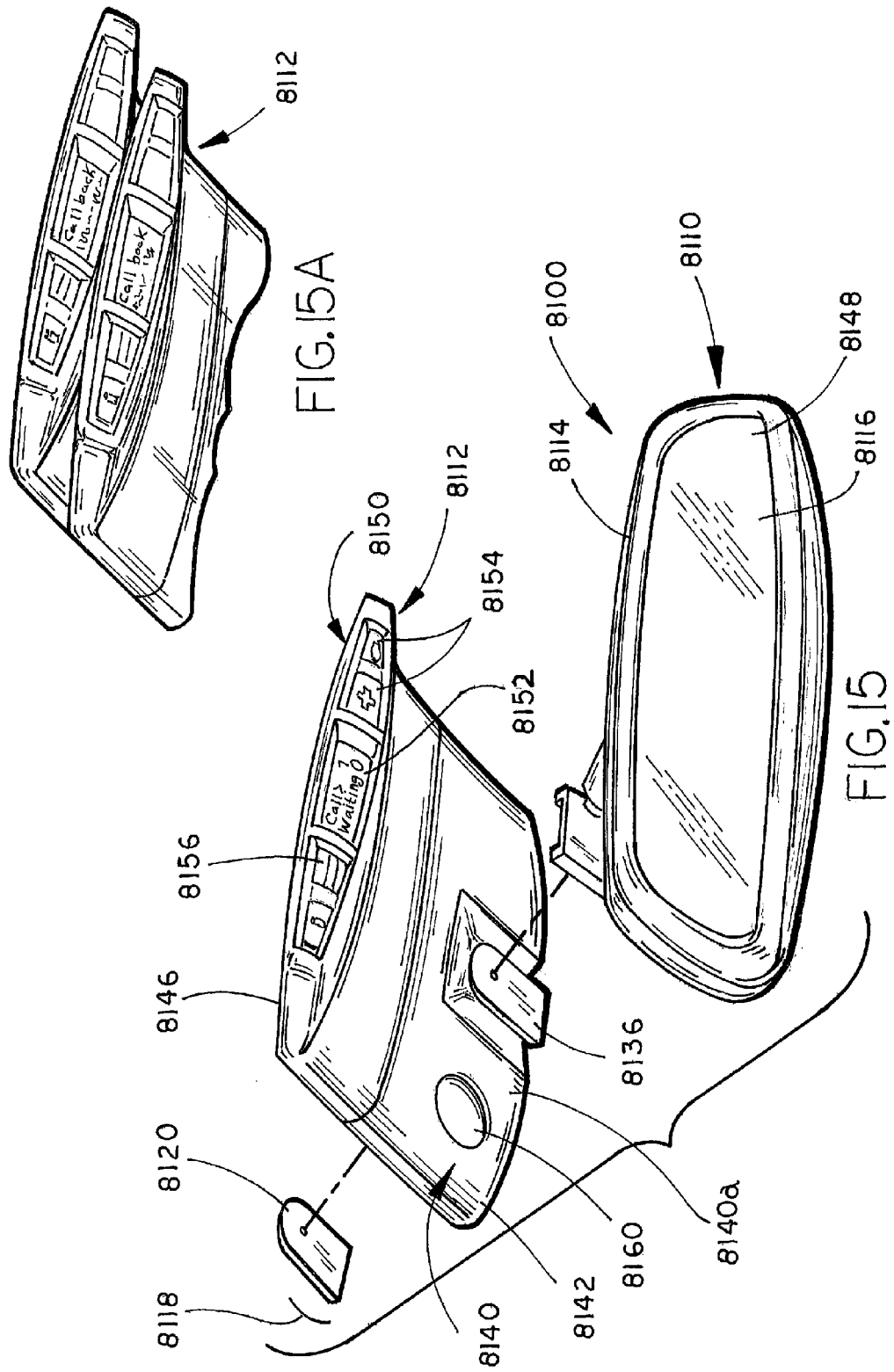

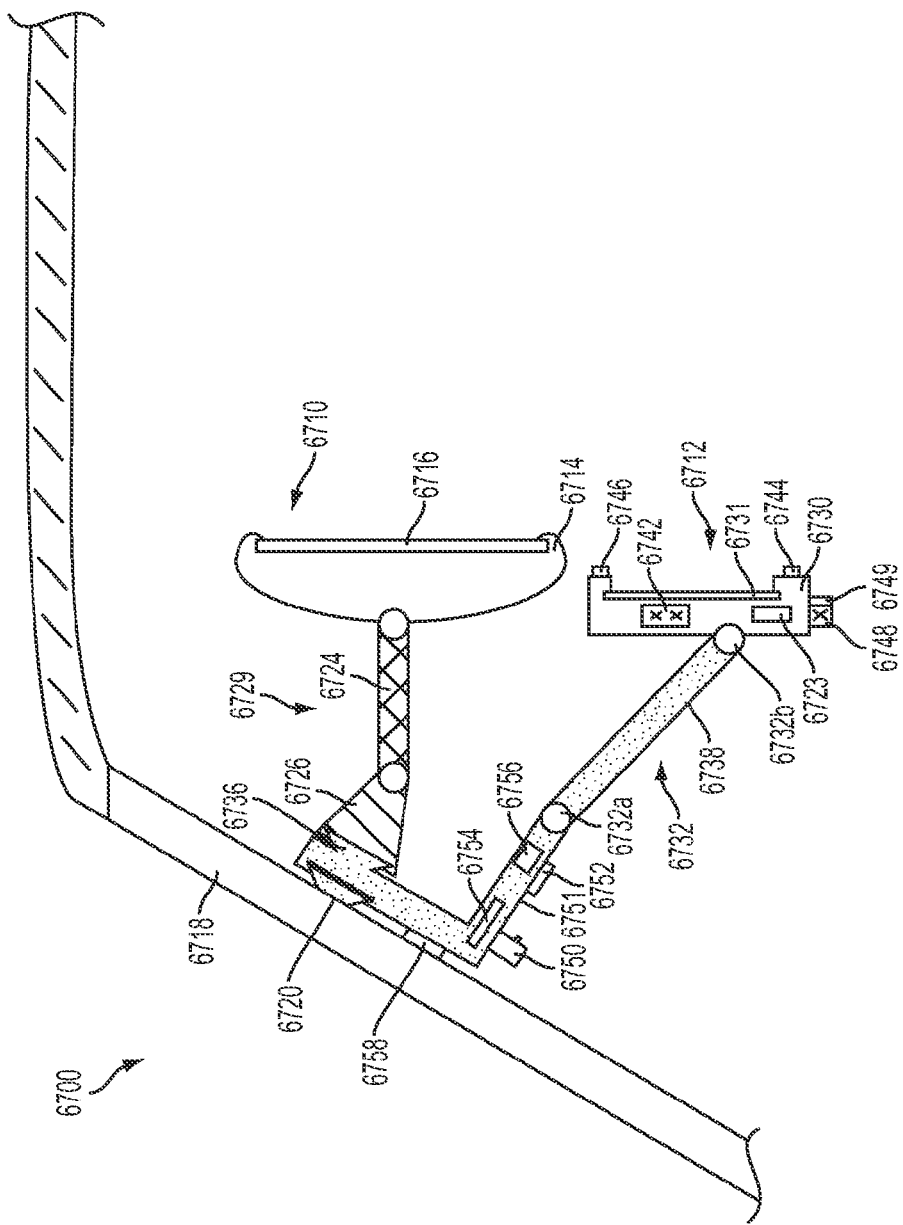

ACCESSORY MOUNTING SYSTEM FOR VEHICLE

CROSS-REFERENCE TO RELATED APPLICATIONS

The present application is a continuation of U.S. patent application Ser. No. 13/345,303, filed Jan. 6, 2012, now U.S. Pat. No. 8,325,028, which is a continuation of U.S. patent application Ser. No. 13/039,962, filed Mar. 3, 2011, now U.S. Pat. No. 8,094,002, which is a continuation of U.S. patent application Ser. No. 12/764,359, filed Apr. 21, 2010, now U.S. Pat. No. 7,916,009, which is a continuation of U.S. patent application Ser. No. 12/276,770, filed Nov. 24, 2008, now U.S. Pat. No. 7,728,721, which is a continuation of U.S. patent application Ser. No. 11/441,592, filed May 26, 2006, now U.S. Pat. No. 7,460,007, which is a continuation of U.S. patent application Ser. No. 10/940,545, filed Sep. 14, 2004, now U.S. Pat. No. 7,053,761, which is a continuation of U.S. patent application Ser. No. 10/232,122, filed Aug. 30, 2002, now U.S. Pat. No. 6,975,215, which is a continuation of U.S. patent application Ser. No. 09/710,016, filed Nov. 10, 2000, now U.S. Pat. No. 6,445,287, which is a continuation-in-part of U.S. patent application Ser. No. 09/513,941, filed Feb. 28, 2000, now U.S. Pat. No. 6,294,989, which are incorporated by reference herein in their entireties; and U.S. patent application Ser. No. 12/764,359 is a continuation-in-part of U.S. patent application Ser. No. 12/759,305, filed Apr. 13, 2010, now U.S. Pat. No. 8,309,907, which is a continuation of U.S. patent application Ser. No. 12/467,660, filed May 18, 2009, now U.S. Pat. No. 7,888,629, which is a continuation of U.S. patent application Ser. No. 12/197,660, filed Aug. 25, 2008, now U.S. Pat. No. 7,538,316, which is a continuation of U.S. patent application Ser. No. 11/828,880, filed Jul. 26, 2007, now U.S. Pat. No. 7,420,159, which is a continuation of U.S. patent application Ser. No. 11/699,271, filed Jan. 29, 2007, now U.S. Pat. No. 7,265,342, which is a continuation of U.S. patent application Ser. No. 11/418,906, filed May 5, 2006, now U.S. Pat. No. 7,262,406, which is a continuation of U.S. patent application Ser. No. 10/913,748, filed Aug. 6, 2004, now U.S. Pat. No. 7,041,965, which is a continuation of U.S. patent application Ser. No. 10/618,334, filed Jul. 11, 2003, now U.S. Pat. No. 6,774,356, which is a continuation of U.S. patent application Ser. No. 09/997,579, filed Nov. 29, 2001, now U.S. Pat. No. 6,593,565, which is a continuation of U.S. patent application Ser. No. 09/433,467, filed Nov. 4, 1999, now U.S. Pat. No. 6,326,613, which is a continuation-in-part of U.S. patent application Ser. No. 09/003,966, filed Jan. 7, 1998, now U.S. Pat. No. 6,250,148; and U.S. patent application Ser. No. 12/276,770 is a continuation-in-part of U.S. patent application Ser. No. 12/052,341, filed Mar. 20, 2008, now U.S. Pat. No. 7,579,940, which is a continuation of U.S. patent application Ser. No. 11/625,374, filed Jan. 22, 2007, now U.S. Pat. No. 7,579,939, which is a continuation of U.S. patent application Ser. No. 10/755,915, filed Jan. 13, 2004, now U.S. Pat. No. 7,446,650, which is a continuation of U.S. application Ser. No. 09/793,002, filed Feb. 26, 2001, now U.S. Pat. No. 6,690,268, which claims benefit of U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Sep. 21, 2000; Ser. No. 60/218,336, filed Jul. 14, 2000; and Ser. No. 60/186,520, filed Mar. 2, 2000; and U.S. patent application Ser. No. 10/755,915 is also a continuation-in-part of U.S. patent application Ser. No. 10/232,122, filed Aug. 30, 2002, now U.S. Pat. No. 6,975,215, which is a continuation of U.S. patent application Ser. No. 09/710,016, filed Nov. 10, 2000, now U.S. Pat. No. 6,445,287, which is a continuation-in-part of U.S. patent application Ser. No. 09/513,941, filed Feb. 28, 2000, now U.S. Pat. No. 6,294,989, which is a continuation-in-part of U.S. patent application Ser. No. 09/213,075, filed Dec. 16, 1998, now U.S. Pat. No. 6,124,647; and U.S. patent application Ser. No. 10/755,915 is also a continuation-in-part of U.S. patent application Ser. No. 10/279,059, filed Oct. 23, 2002, now U.S. Pat. No. 6,774,774, which is a continuation of U.S. patent application Ser. No. 09/876,816, filed Jun. 7, 2001, now U.S. Pat. No. 6,472,979, which is a continuation of U.S. patent application Ser. No. 09/513,941, filed Feb. 28, 2000, now U.S. Pat. No. 6,294,989, which is a continuation-in-part of U.S. patent application Ser. No. 09/213,075, filed Dec. 16, 1998, now U.S. Pat. No. 6,124,647; and U.S. patent application Ser. No. 10/755,915 is also a continuation-in-part of U.S. patent application Ser. No. 10/618,334, filed Jul. 11, 2003, now U.S. Pat. No. 6,774,356, which is a continuation of U.S. patent application Ser. No. 09/997,579, filed Nov. 29, 2001, now U.S. Pat. No. 6,593,565, which is a continuation of U.S. patent application Ser. No. 09/433,467, filed Nov. 4, 1999, now U.S. Pat. No. 6,326,613, which is a continuation-in-part of U.S. patent application Ser. No. 09/003,966, filed Jan. 7, 1998, now U.S. Pat. No. 6,250,148; and U.S. patent application Ser. No. 10/755,915 is also a continuation-in-part of U.S. patent application Ser. No. 10/270,830, filed Oct. 15, 2002, now U.S. Pat. No. 6,717,524, which is a continuation of U.S. patent application Ser. No. 09/903,336, filed Jul. 11, 2001, now U.S. Pat. No. 6,466,136, which is a continuation of U.S. patent application Ser. No. 09/396,179, filed Sep. 14, 1999, now U.S. Pat. No. 6,278,377, which is a continuation-in-part of U.S. patent application Ser. No. 09/382,720, filed Aug. 25, 1999, now U.S. Pat. No. 6,243,003.

BACKGROUND OF THE INVENTION

This invention relates generally to vehicular function monitoring and display systems. More particularly, the invention is related to a system for assisting the manual inflating of tires while mounted on the wheels of a vehicle. Most particularly, this invention is related to a system for assisting the manual inflating of tires of the vehicle that includes an indicator assembly positioned on an exterior vehicle portion such as an exterior mirror assembly.

Remote tire pressure sensors have been developed which sense tire pressure and transmit, such as via a radio frequency link, the tire pressure to a vehicle-based controller. The information regarding tire pressure may be used to control vehicle safety-based devices, such as ride and comfort control systems, road-handling systems, braking systems, and the like. It is also known to utilize such sensors in combination with tires that can run without inflation in order to warn the driver that the tire is operating in an emergency mode and should be driven at a limited speed for a limited distance.

It is known to utilize various gauges and displays in view of the driver. For example, it is known to place a display of vehicle tire pressure within the interior cabin of the vehicle in view of the driver. This includes displaying the vehicle tire pressure in an interior mirror-based display. Typically, such displays mounted in the interior cabin provide a read-out of the inflation status of individual tires on the vehicle, such as an alphanumerical read-out of tire pressure or an icon indicative of tire pressure status. For example, a read-out or an icon indicative of the individual tire pressures at the four wheels on an automobile can be displayed at the reflective element of the interior rearview mirror assembly. While such displays alert the driver of the vehicle sitting in the interior vehicular cabin when the vehicle is operating as to the inflation status of individual tires present on the vehicle, they are little to no aid to a driver or other person while actually pumping air into or bleeding air from an individual tire in response to recognition of an undesired tire inflation pressure. While pumping air into or bleeding air from a tire mounted on a vehicle (such as commonly occurs at service stations and the like), a person typically uses an air line connected to an air compressor. The air line is manually connected to an inflation valve provided at the vehicular tire; the person presses the air line to a nipple of the tire valve, and, by so doing, pressurized air is allowed pass through the tire valve, or escape from the tire valve, to inflate or deflate tire pressure to the desired pressure value. To so do, typically the engine is turned off and the driver exits the vehicle, and crouches down at a particular wheel on a side of the vehicle in order to adjust the tire pressure at that particular wheel. While so doing, the driver typically does not have a view of the vehicle interior, and typically relies on a hand-held tire pressure gauge or on a gauge provided on the air line used for tire pressure adjustment. Thus, even though the vehicle tire may be equipped with a sensor for measuring the air pressure in the tire, in systems known to date, this tire pressure monitoring sensor does not provide a readily readable indication of correct or incorrect tire inflation pressure to the person external to the vehicle who is adjusting the tire pressure in that tire on the vehicle, and especially while that person is in the act of adjusting that tire pressure.

SUMMARY OF THE INVENTION

The present invention provides a new and useful system that provides an indicator external of the vehicle to indicate the inflation condition of the vehicle tires. The present invention provides a readily interpretable indication of correct or incorrect tire inflation pressure to a person external to the vehicle who is adjusting the tire pressure in that tire on the vehicle, and especially while that person is in the act of adjusting that tire pressure. Preferably, the indicator is positioned at an exterior vehicle portion, such as a vehicle exterior rearview mirror assembly, where the indicator can be observed by a user inflating or deflating the vehicle tires located at the vehicle side of that exterior vehicle portion. However, the present invention may also be used as a convenient indicator to the driver or passenger entering a vehicle that one or more of the vehicle tires are in an under-pressure or over-pressure condition.

According to the invention, a tire inflation monitoring system suitable for use on a vehicle is provided that comprises at least one tire inflation indicator assembly positioned at an exterior vehicle portion at a side of the vehicle and visible exterior the vehicle. The at least one tire inflation indicator assembly provides an indication of the inflation condition of at least one vehicle tire positioned at that side of the vehicle, and wherein the tire inflation monitoring system includes a control receiving at least one input from at least one tire pressure sensor sensing pressure of the at least one vehicle tire, and the control producing an output to illuminate the at least one tire inflation indicator assembly in response to a tire pressure condition.

A vehicle exterior rearview mirror system, according to an aspect of the invention, includes at least one exterior rearview mirror assembly mounted on a side of the vehicle. The exterior rearview mirror assembly includes a reflective element and a support for the reflective element. The system further includes a tire inflation monitor including at least one tire inflation indicator assembly positioned at the exterior rearview mirror assembly and visible exterior of the vehicle. The at least one indicator assembly provides an indication of the inflation condition of at least one of the vehicle tires mounted to wheels of the vehicle on the side of the vehicle to which the exterior mirror assembly is mounted. The tire inflation monitor includes a control receiving at least one input from at least one tire pressure sensor sensing pressure of at least one of the vehicle tires. The tire inflation monitor further includes a control producing an output to illuminate the at least one tire inflation indicator assembly.

By providing a tire inflation monitor visible exterior of the vehicle, the present invention provides an indication to a vehicle user at a desirable location that provides a useful assistance to the user, or an attendant, inflating the vehicle tires. This is accomplished by providing a tire inflation indicator at the exterior rearview mirror assembly in order to be visible at the vehicle tires. As the vehicle tires are inflated from an under-pressure to an operating pressure range, the indicator provides an indication of this change. The indicator may also provide an indication when the tires are inflated to an over-inflated condition. The invention also provides a useful indication as the driver enters the vehicle or exits the vehicle that attention to the tires is necessary.

These and other objects, advantages, and features of this invention will become apparent upon review of the following specification in conjunction with the drawings.

BRIEF DESCRIPTION OF THE DRAWINGS

FIG. 10 is a front elevation view of another embodiment of an accessory module/mirror system incorporating a tire pressure monitoring and/or display system of the present invention;

FIG. 14 is a partial front elevation view of another embodiment of an accessory module incorporating the tire pressure monitoring and/or display system of the present invention;

FIG. 15 is an exploded perspective view of another embodiment of an accessory module/mirror system incorporating a tire pressure monitoring and/or display system of the present invention;

FIG. 15A is a partial perspective view of the accessory module of FIG. 15 illustrating a portion of the module telescoping between two viewing positions;

FIG. 19 is another embodiment of a video mirror system and a video display assembly incorporating a tire pressure monitoring and/or display system of the present invention;

FIG. 23 is a side elevation view of another embodiment of a video mirror system incorporating a tire pressure monitoring and/or display system of the present invention;

DESCRIPTION OF THE PREFERRED EMBODIMENT

Figure 1:
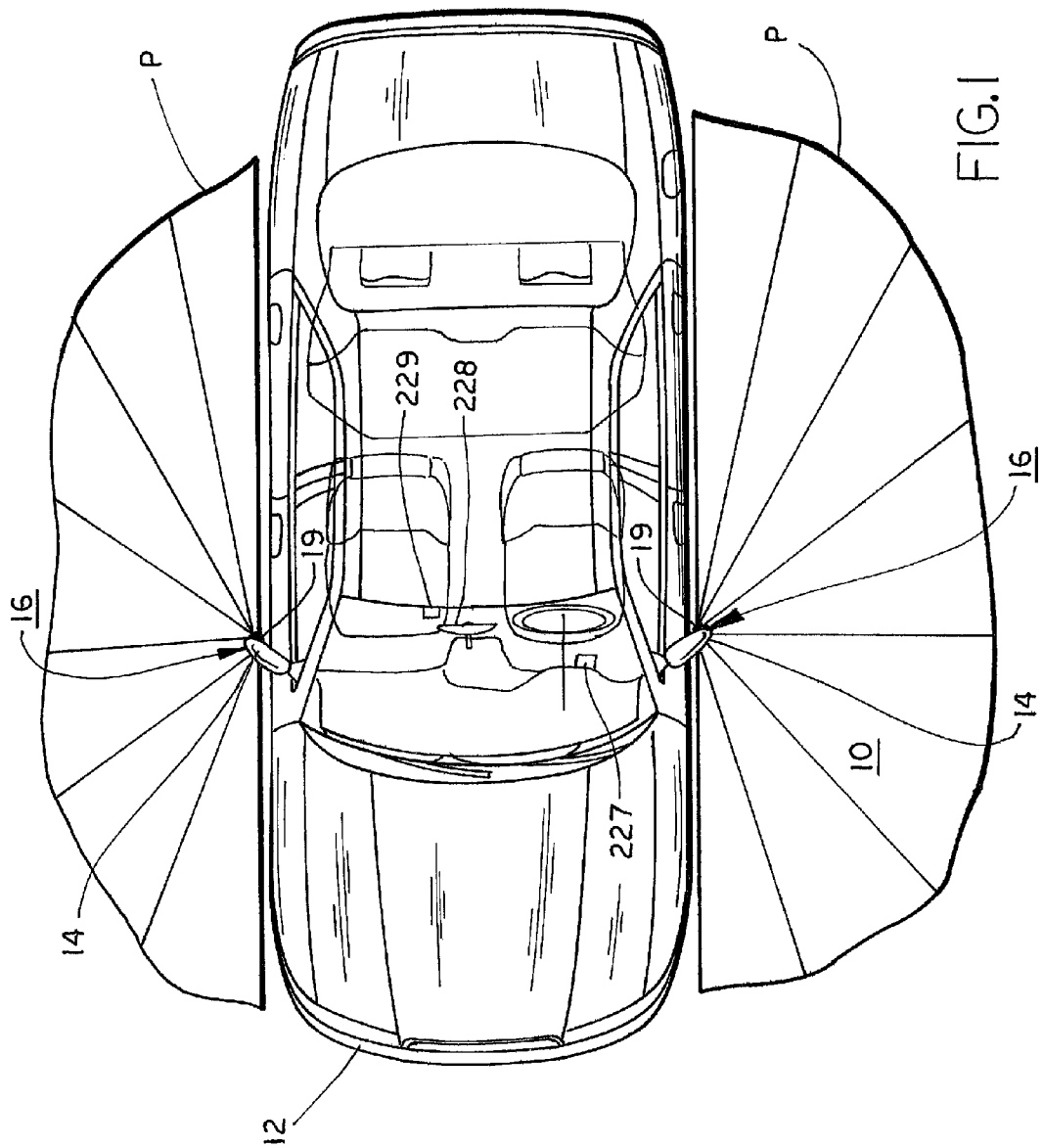
FIG. 1 is a top plan view of a vehicle exterior rearview mirror system equipped with tire pressure indicator assemblies, according to the invention.
Figure 2:
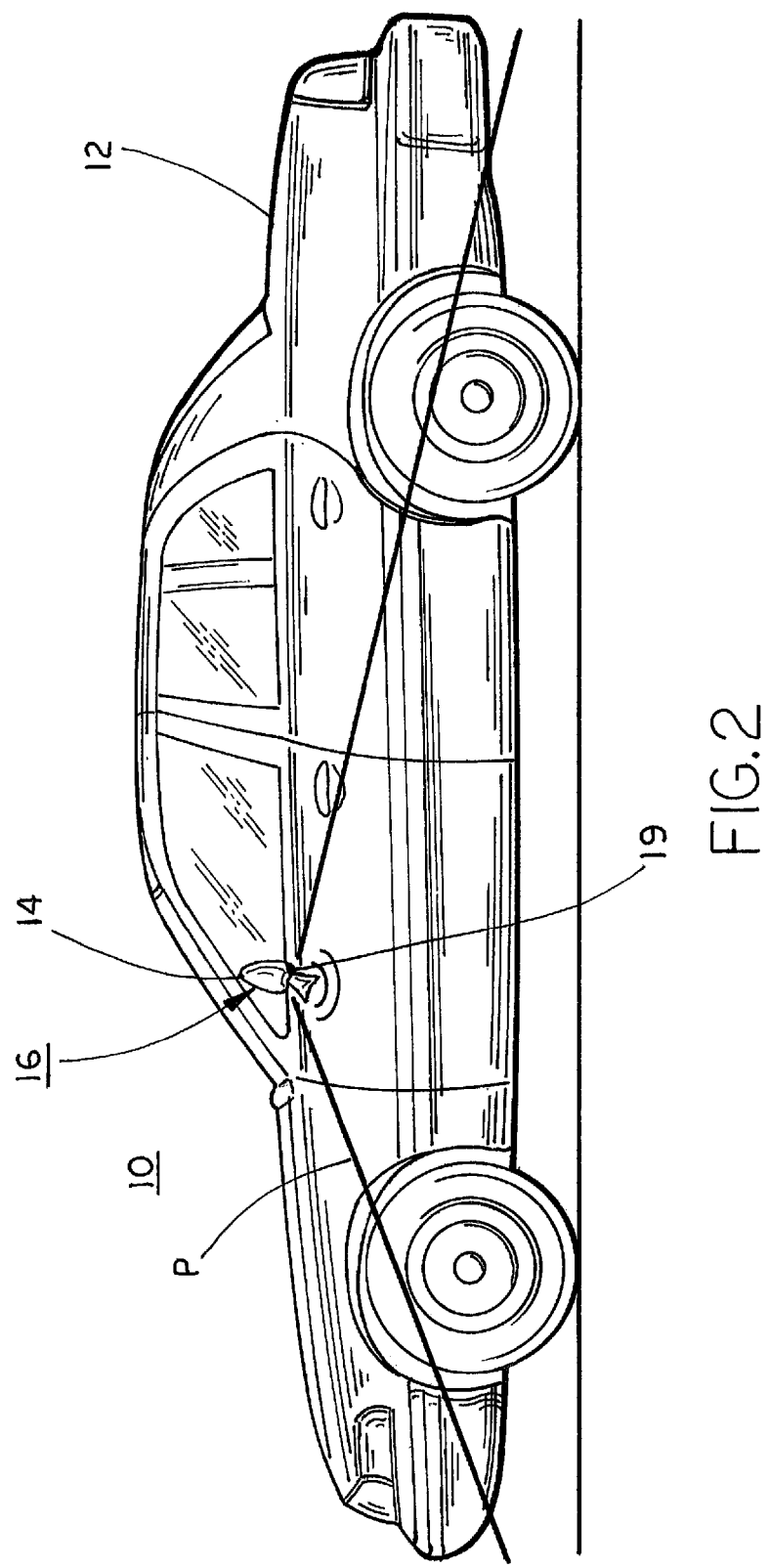
FIG. 2 is a side elevation of the vehicle in FIG. 1.
Figure 6:
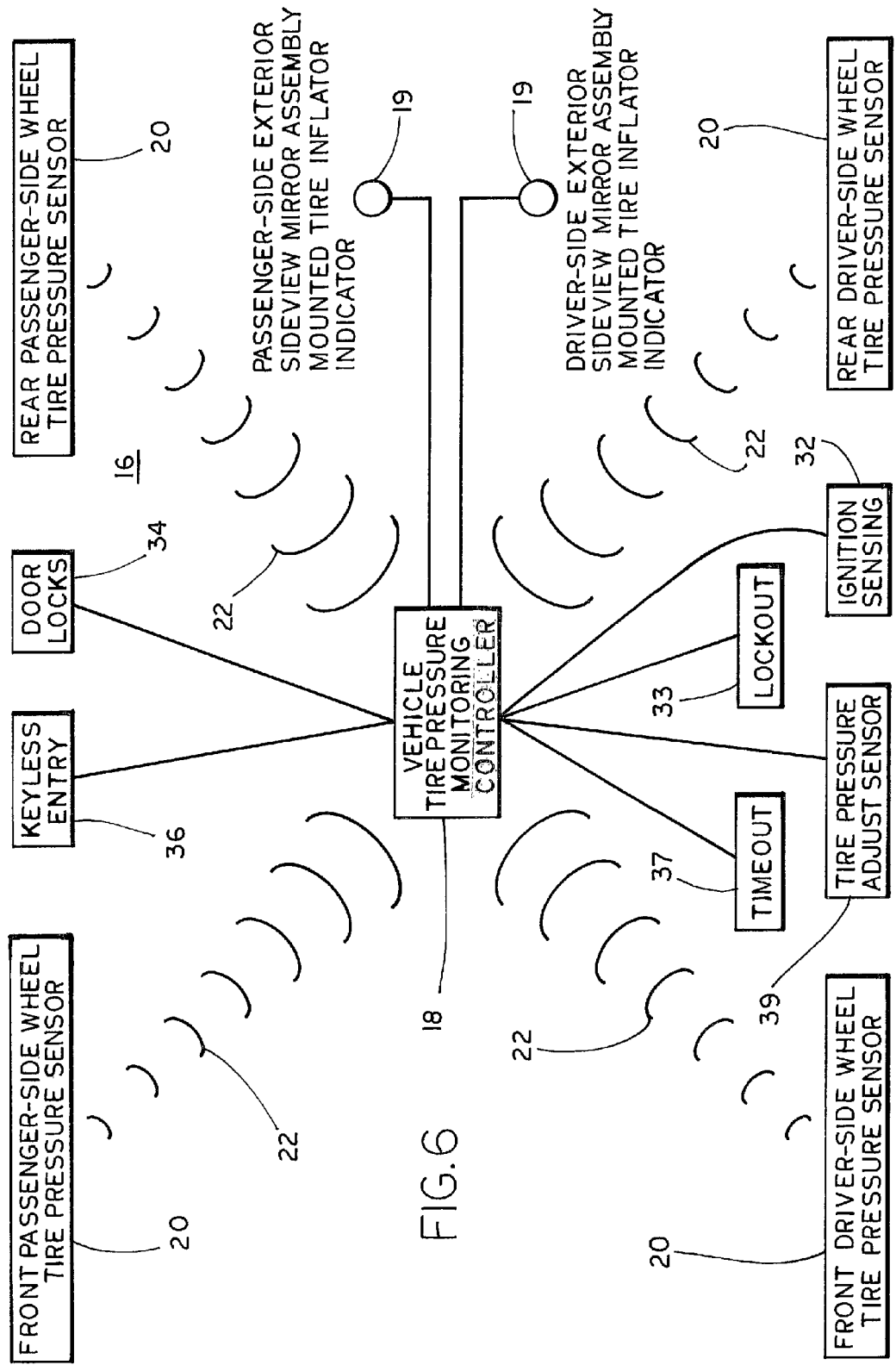
FIG. 6 is an electrical block diagram of a tire inflation monitoring system, according to the invention.
Figure 6A:
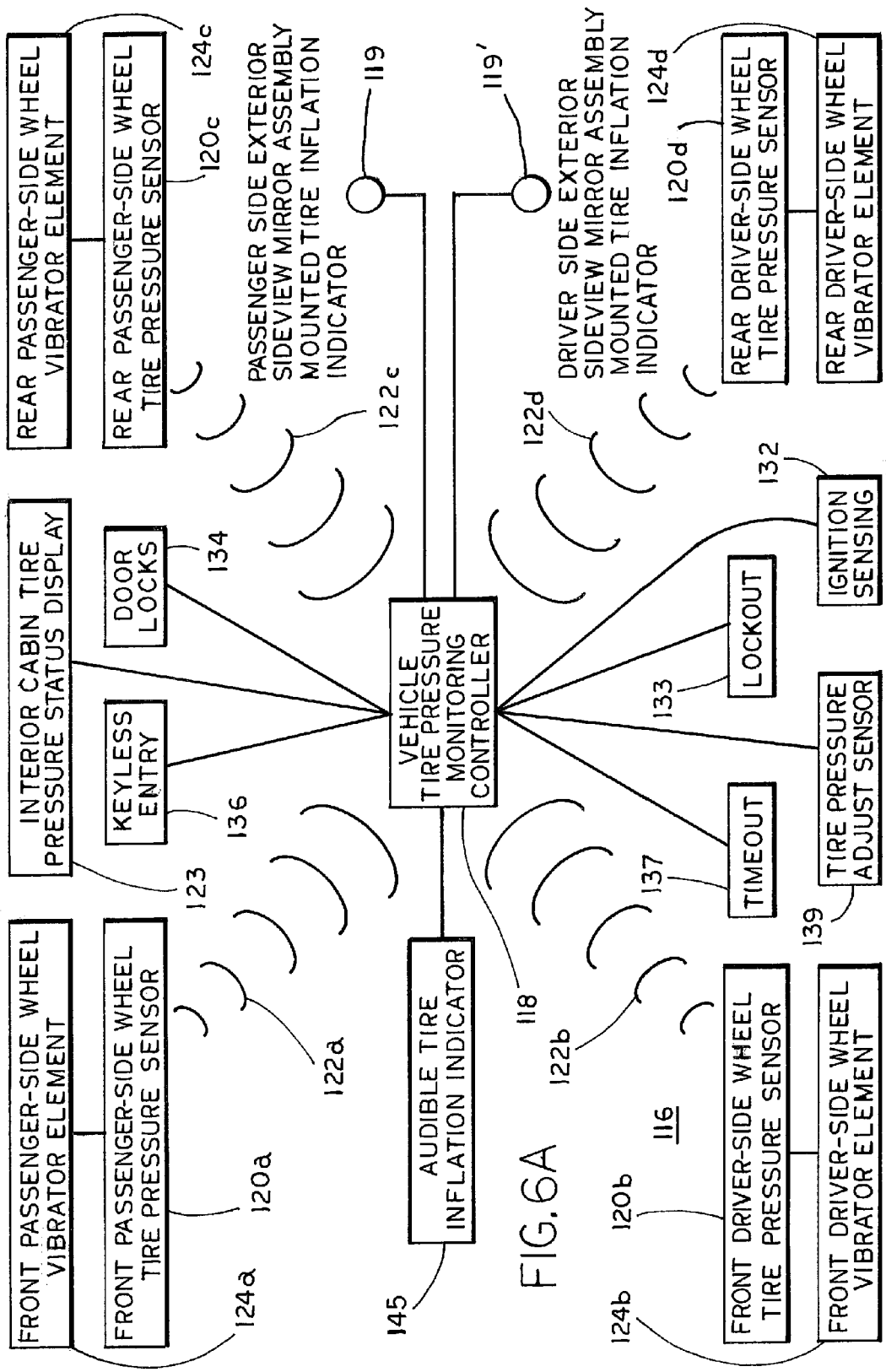
FIG. 6A is an electrical block diagram of another embodiment of the tire inflation monitoring system according to the present invention.

Referring now specifically to the drawings, and the illustrative embodiments depicted therein, a vehicle exterior rearview mirror system 10 for use with vehicle 12 includes one or more exterior rearview mirror assemblies 14 and a tire inflation monitoring system 16 (FIGS. 1, 2 and 6). Tire inflation monitoring system 16 includes at least one tire pressure indicator assembly 19 positioned at exterior rearview mirror assembly 14, a control 18, and one or more tire pressure sensors 20, each associated with one of the vehicle tires. Each tire pressure sensor 20 is connected wirelessly with control 18 by a wireless communication link 22 that, in the illustrated embodiment, is a radio frequency (RF) link. Tire pressure sensor 20 is commercially available from several sources and conventionally includes a wireless communication link 22 with a vehicle controller. Control 18 is an electronic control, and is preferably a microprocessor-based electronic control, but may, alternatively, be a digital logic controller, an analog controller, or the like. Preferably, control 18 performs additional vehicle functions. Most preferably, control 18 is interconnected with a vehicle serial bus system such as of the type disclosed in commonly assigned U.S. Pat. No. 5,959,367, the disclosure of which is hereby incorporated herein by reference.

Figure 3:
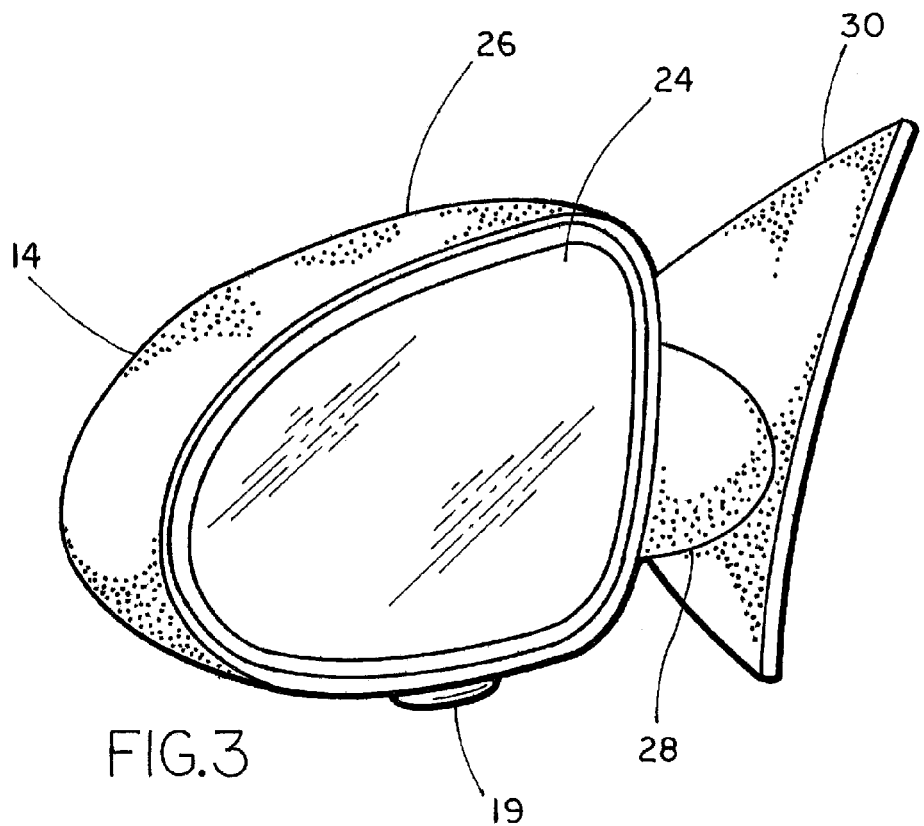
FIG. 3 is a perspective view of a vehicle exterior rearview mirror assembly, according to the invention.
Figure 4:
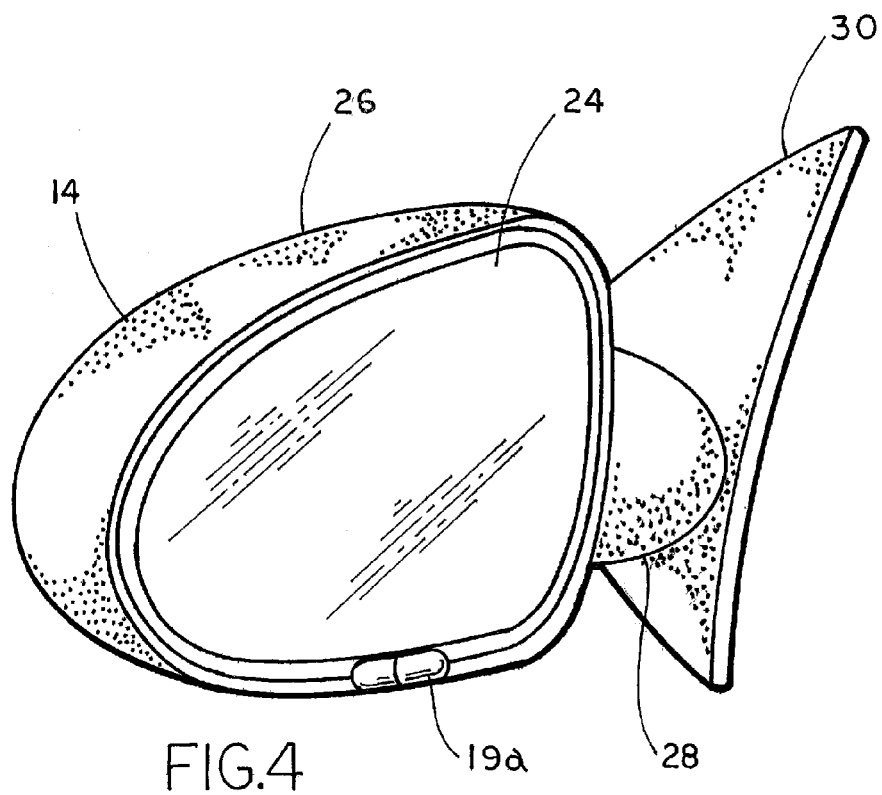
FIG. 4 is the same view as FIG. 3 of an alternative embodiment thereof.
Figure 5:
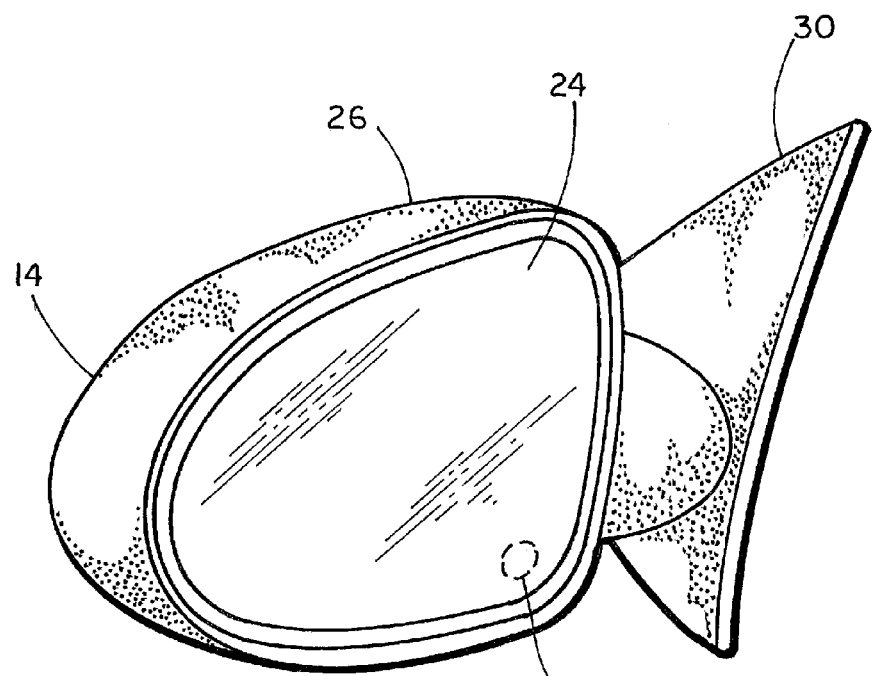
FIG. 5 is the same view as FIG. 3 of an alternative embodiment thereof.

Exterior rearview mirror assembly 14 includes a reflective element 24 and a support 26 supporting the reflective element by vehicle 12 (FIGS. 3-5). As is conventional, support 26 includes a fixed portion 28 attached to vehicle 12 and a movable portion (not shown) which movably supports reflective element 24. Preferably, the movable portion is an electrically controlled actuator of the type disclosed in commonly assigned patent application Ser. No. 09/228,348, filed Jan. 11, 1999, now U.S. Pat. No. 6,213,612, the disclosure of which is hereby incorporated herein by reference. Reflective element 24 may be any of several reflectors such as glass coated on its first or second surface with a suitable reflective layer or layers, such as disclosed in U.S. Pat. No. 5,179,471, the disclosure of which is hereby incorporated herein by reference, or, preferably, an electro-optic reflective element, and, most preferably, an electrochromic mirror element. However, the invention applies to all forms of reflective element 24. Electrochromic reflective elements 24 may be of any type such as disclosed in U.S. Pat. No. 4,902,108 issued to Byker; commonly assigned U.S. Pat. No. 5,668,663 issued to Varaprasad et al.; commonly assigned U.S. Pat. No. 5,724,187 issued to Varaprasad et al; commonly assigned U.S. Pat. No. 6,002,511 issued to Varaprasad et al.; commonly assigned U.S. Pat. No. 5,140,455 issued to Varaprasad et al.; commonly assigned U.S. Pat. No. 5,910,854 issued to Varaprasad et al. and commonly assigned U.S. patent application Ser. No. 08/429,643, filed Apr. 27, 1995, by Varaprasad et al., now U.S. Pat. No. 5,724,187, the disclosures of which are hereby all incorporated herein by reference. Electrochromic reflective elements 24 include electrochromic units, or cells, that decrease in transmissivity in response to a drive signal applied thereto. Most preferably, reflective element 24 comprises a front substrate and a rear substrate with an electrochromic medium disposed between, such as a solid polymer matrix electrochromic medium such as is disclosed in U.S. patent application Ser. No. 09/350,930, filed Jul. 12, 1999, now U.S. Pat. No. 6,154,306, the entire disclosure of which is hereby incorporated by reference herein. Most preferably, the front substrate comprises a glass plate of thickness less than about 1.6 mm, most preferably about 1.1 mm thickness or lower, and the rear substrate comprises a glass plate of thickness equal to or greater than about 1.6 mm, more preferably greater than about 1.8 mm thickness, most preferably equal to or greater than about 2.0 mm thickness. The rearmost surface of the rear substrate (the fourth surface as known in the mirror art) is reflector coated with a high reflecting metal film such as of aluminum or silver, or an alloy of aluminum or silver. Most preferably, the frontmost surface of the rear substrate (the third surface as known in the mirror art) is reflector coated with a high reflecting metal film such as of aluminum or silver, or an alloy of aluminum or silver, optionally overcoated with a transparent electronic conductor coating such as of indium tin oxide or of doped tin oxide.

Exterior rearview mirror assembly 14 may include other elements and functions as disclosed in commonly assigned U.S. Pat. Nos. 6,019,475; 5,371,659; 5,971,552; and 5,497,306, the disclosures of which are hereby incorporated herein by reference.

Tire inflation indicator assembly 19 preferably generates a pattern of light P viewable from the location of the tires of the vehicle on the side of the vehicle with which tire pressure sensors 20 are associated. In this manner, a user of the vehicle or an attendant or mechanic may inflate the vehicle tires while observing the pattern of light P generated by the tire pressure indicator assembly 19. This may be accomplished by mounting tire inflation indicator assembly 19 to a lower surface 30 of the portion of exterior rearview mirror assembly 14 that houses the mirror reflector. In addition to producing a pattern of light P, which is visible at the tires on the side of the vehicle with which the associated tire inflation indicator assembly 19 is located, the pattern of light P preferably will not be substantially visible to the driver of the vehicle. This avoids any distraction to the driver from the tire inflation indicator assembly while the driver is in the vehicle. Furthermore, there is less wind noise below the exterior rearview mirror assembly 14. Thus, the presence of the tire pressure indicator assembly there does not substantially contribute to wind noise generated by the exterior rearview mirror assembly. Furthermore, the bottom portion of exterior rearview mirror assembly 14 is typically hollow and provides a convenient attachment point for the tire inflation indicator assembly. Because the exterior mirror assembly protrudes outwardly from the vehicle body, locating the tire inflation indicator assembly at the exterior mirror assembly, and especially at a lower portion of the part of the exterior mirror assembly that houses the mirror reflector element, is advantageous. This is because such a location renders the indicator of the tire inflation indicator assembly readily visible to a person positioned at either or both of the front wheel tire and the rear wheel tire of the vehicle who is inflating/deflating a tire, and especially when the person adjusting the tire pressure is crouched down at a vehicle wheel tire while manually adjusting its tire pressure. For example, a tire inflation indicator assembly that includes a light source, such as a light-emitting diode, can protrude from the underside of the casing part of the exterior mirror assembly that houses the mirror reflector element. Thus, whether the user adjusting tire pressure is located at a front wheel tire or a rear wheel tire at one of the driver side or the passenger side of the vehicle, the user can see a single indicator of the tire inflation indicator assembly that is positioned below the casing of the exterior mirror assembly on that side, and that preferably protrudes therefrom (for example, as a pendant element), as he or she crouches down at that particular wheel tire on that particular vehicle side. It is preferable, for economy, that a single tire inflation indicator assembly be provided on an exterior vehicle portion of a side of the vehicle at a location visible to a person inflating either a front wheel tire of that side or a rear wheel tire of that side.

In an alternative embodiment, a tire inflation indicator assembly 19a may be positioned at fixed portion 28 of support 26. In the embodiment illustrated in FIG. 4, tire inflation indicator assembly 19a is illustrated on a surface directed rearwardly of vehicle 12 where it would generate a pattern of light visible at a rear tire of the vehicle on the side of the vehicle on which tire inflation indicator assembly 19a is located. Another tire inflation indicator assembly (not shown) may be positioned on a forward-facing portion of fixed portion 28, thereby being visible at the area around the forward tire on the same side of the vehicle on which the tire inflation assembly is located.

In another alternative embodiment illustrated in FIG. 5, a tire inflation indicator assembly 19b is positioned with the movable portion of support 26, such as on reflective element 24. Preferably, tire inflation indicator assembly 19b is positioned behind reflective element 24, thereby protected from environmental elements such as road splash, car washes, and the like. This is accomplished by removing a portion of a reflective coating on reflective element 24 such that tire inflation indicator assembly 19b is viewable through reflective element 24 (or by using a semitransparent mirror reflector such a dichroic mirror element such as is described in U.S. Pat. No. 5,361,190, the entire disclosure of which is hereby incorporated by reference herein). Tire inflation indicator assembly 19b may be joined with reflective element 24 according to the principles disclosed in U.S. Pat. No. 5,416,313, the disclosure of which is hereby incorporated herein by reference.

Other mountings for tire inflation indicator assembly, according to the invention, may be apparent to the skilled artisan. For example, the tire inflation indicator assembly may be mounted at the sail portion 30 of exterior rearview member assembly 14 or a portion of vehicle 12 adjacent to exterior rearview mirror assembly 14. Also, the tire inflation indicator assembly can be located at an exterior vehicle portion other than at the exterior mirror assembly. For example, a tire inflation indicator assembly can be located at a vehicle body side panel, such as at or part of a side marker assembly, or as part of a door panel assembly. Optionally, a tire inflation indicator assembly can be located at each wheel tire location, so that a person inflating or deflating a particular tire can see the indicator of tire pressure local to the particular wheel tire being inflated/deflated. Other elements may be combined with the tire inflation indicator assembly. For example, a temperature sensor for sensing the exterior temperature surrounding the vehicle may be positioned in a common housing with the tire inflation indicator assembly. Furthermore, the tire inflation indicator assembly may be positioned at a side-mounted camera assembly for a rearview camera vision system of the type disclosed in commonly assigned International Publication WO 96/38319, published Dec. 5, 1996, the disclosure of which is hereby incorporated herein by reference.

Tire inflation indicator system 16 optionally comprises a lockout 33 that prevents inadvertent actuation of tire inflation indicator assemblies 19 during operation of vehicle 12. Such lockouts are conventional and preferably comprise a circuit that is responsive to the vehicle being placed in gear to the vehicle reaching a determined speed (such as at least 5 miles per hour), or to turning an ignition switch to operate the engine. When the lockout circuit senses that the vehicle is operating or in a condition to operate, operation of tire inflation indicator assemblies 19 is optionally disabled. Thus, receipt of an input indicative of operation of the vehicle by tire pressure monitoring controller 18 from lockout 33 would disable operation of tire inflation indicator assemblies 19. Thus, and optionally, control 18 processes the input 32 in order to lock out illumination of tire inflation indicator assemblies 19 during operation of vehicle 12. This further reduces the likelihood of the tire inflation monitoring system providing a distraction not only to the driver of vehicle 12 during normal driving of vehicle 12, but also to operators of vehicles in the vicinity of vehicle 12. Tire inflation monitoring system 16 may additionally receive an input 34 indicative of the locked state of the vehicle doors. Preferably, control 18 provides outputs to illuminate tire inflation indicator assemblies 19 only when the vehicle doors are in an unlocked state, which is likely when the tires of the vehicle are being inflated. Most preferably, control 18 is capable of illuminating tire inflation indicator assemblies 19 in response to a sensed tire inflation condition only for a predetermined period of time after door lock input 34 indicates that the vehicle doors have changed to an unlocked state and, optionally and preferably, after ignition sensing circuit 32 indicates that the vehicle ignition is not operating (i.e., the engine is off). This period of time, which is determined by timeout 37, may be less than or equal to about two hours and, preferably, less than or equal to about 30 minutes. Most preferably, this predetermined period of time is less than or equal to about 15 minutes. Control 18 may additionally produce outputs to illuminate tire inflation indicator assemblies 19 in response to a tire pressure sensor 20 sensing commencement of a manual tire pressure adjust event such as by sensing a change in pressure of its associated tire indicative of a user of the vehicle inflating/deflating that tire, or sensing depression of the close-out nipple provided in the tire valve stem to allow connection to an air hose/to allow bleed off of tire pressure. In this manner, the tire inflation indicator assembly is illuminated when it is of assistance to the manual inflation of the tires. The tire inflation assembly may stay capable of illumination after a given event (such as unlocking a door, opening a door, turning off the vehicle ignition, detection of an indication of a manual tire pressure adjust event) for a predetermined period of time which, for example, is less than or equal to about two hours and, preferably, is less than or equal to about 30 minutes and, most preferably, is less than or equal to about 15 minutes.

Provision of door lock input 34 and/or ignition sensing circuit 32 and/or timeout 37 is advantageous towards ensuring that the tire inflation indicator system 16 remains armed and powered for a sufficient time period to allow the driver to pull up to a service station to service tire pressures, but not so that the tire inflation indicator system 16 would remain powered and armed all the time a vehicle is parked (and thus risk depleting the vehicle battery which typically operates at 12 volts nominal). Since sensors 19, controller 18 and other electronic elements of system 16 require electric power to operate, and since when stopped at a service station it is usual and safest to turn off the vehicle ignition while attending to the tire pressures, tire inflation indicator system 16 typically will operate on vehicle battery power while the driver is inflating/deflating tires on wheels mounted to the vehicle, and so system 16 includes a battery depletion protection to obviate running down the battery when the vehicle is normally parked.

Tire inflation indicator system 16 optionally comprises a tire pressure adjust sensor 39 that provides an input to controller 18 alerting that a manual tire pressure adjust event is beginning. Thus, for example, when the vehicle is parked, tire inflation indicator system 16 optionally remains in a quiescent, armed mode (that draws very little current from the vehicle battery, with a current draw of less than about 15 milliamps preferred, a current draw of less than about 10 milliamps more preferred, and a current draw of less than about 5 milliamps most preferred). Thus, even when prolonged parked, tire inflation indicator system 16 is powered but active only in a monitoring, low-current state, and with controller 18 monitoring an input from tire pressure adjust sensor 39. When a manual tire pressure adjust event is detected by tire pressure adjust sensor 39 (such as by detection of depression of the close-off nipple in the valve stem at the particular wheel tire at a side of the vehicle a person is manually inflating from a compressed air line, or by detection of a change in tire pressure indicative of a user-actuated tire inflate/deflate event), controller 18 activates the appropriate tire inflation indicator assembly 19 on that particular vehicle side in order to indicate to the person attending to the tire, who typically is crouching down at the wheel tire, the tire pressure status in that particular tire. Since significant current consumption is typically only required by the indicator light sources themselves, use of tire pressure adjust sensor 39 can allow system 16 to be in an armed but low power state continually and with the vehicle parked and the vehicle ignition turned off so that vehicle battery power alone is provided to system 16. Once tire pressure adjust sensor 39 detects that the tire adjust event is complete and/or timeout 37 times-out, any illumination of indicator(s) 19 can cease, and system 16 can revert to its quiescent, low current consumption state (and so minimize depletion of vehicle battery charge).

Note also that an interior cabin display of tire pressure status (such as via a display at a location within the vehicle interior cabin such as at or on the interior rearview mirror assembly) can optionally be provided as part of system 16, most preferably though only when ignition sensing circuit 32 indicates that the vehicle ignition is operational and the engine is running. Thus, when operating the vehicle while driving on the highway, or when stopped with the engine running, the driver can view a display located in the interior cabin that alerts as to tire pressure status at the individual vehicle wheels. When the driver determines that the tire pressure at a particular wheel needs adjustment, he or she can drive to a service station or the like, stop at an air compressor, preferably (for safety) turn off the engine, and exit the vehicle to manually inflate/deflate the particular tire, while aided by the tire inflation assistance monitoring system of this present invention. Alternately, the driver can remain in the vehicle, and have a service attendant manually inflate/deflate the particular tire, while aided by the tire inflation assistance monitoring system of this present invention. Provision of the tire inflation assistance monitoring system of this present invention as an additional feature to an interior vehicle cabin tire pressure status displaying system is a significant enhancement to such a system, and it can be added economically, given that many of the components, such as tire pressure sensors, wireless transmission transmitter/receivers and the like, are already existing in the interior vehicle cabin tire pressure status displaying system.

Tire inflation indicator assembly 19 may include a plurality of different colored indicators or lamps in order to indicate various inflation conditions of the tires of vehicle 12. Such indicators can be coded (such as by color coding, intensity coding, frequency of flash coding, sequence coding, positional coding or the like) in order to signal to the driver when the tire pressure is below, at, or above the desired tire pressure. For example, one such indicator may be a green indicator which indicates that the pressure of the monitored tire or tires is within an acceptable pressure range, such as recommended by the manufacturer of the vehicle. A red indicator may illuminate when the pressure monitored by pressure sensor 20 is less than that recommended by the vehicle operator. The red indicator may flash when the pressure sensed by a pressure sensor 20 is greater than the range of pressures recommended by the vehicle manufacturer. Preferably, tire inflation indicator assembly 19 includes a single color indicator in order to reduce the cost thereof. The single color indicator may, for example, be a green indicator which is illuminated in a steady fashion when the pressure sensed by tire pressure sensor 20 is within an acceptable range recommended by the vehicle manufacturer and flashing when outside of that range. Preferably, the indicator may flash at a first rate, such as at a relatively slow rate, when the pressure sensed by the pressure sensor 20 is less than the range recommended by the vehicle manufacturer and at a faster rate when the pressure sensed by sensor 20 is above the range recommended by the vehicle manufacturer. This single color indicator could be in an OFF condition during inflation of the tire until the inflation condition reaches the normal operating range recommended by the vehicle manufacturer. Other lamp operation protocols may suggest themselves to the skilled artisan.

Preferably, tire inflation indicator 19 includes one or more light-emitting light sources, such as solid-state light emitting diodes (LEDs), available from numerous sources. Various colors of LED can be used (or combined) such as blue, white, orange, yellow, red, amber and red-orange. Alternatively, the tire inflation indicator may be supplied as a conventional incandescent light source, a halogen light source, a fluorescent light source such as a vacuum fluorescent lamp, a light pipe such as fiber-optic bundle forming a light pipe, and the like. Most preferably, illumination by the tire inflation indicator is achieved using non-incandescent light sources, such as light-emitting diodes (LEDs), organic light-emitting material, electroluminescent sources (both organic and inorganic), and the like, and most preferably such non-incandescent sources are low power and are directed sources, such as described in U.S. Pat. No. 5,938,321 and application Ser. No. 09/287,926, filed Apr. 7, 1999, now U.S. Pat. No. 6,139,172, which are incorporated herein by reference in their entireties, and in such as is disclosed in co-assigned U.S. patent application Ser. No. 09/466,010, filed Dec. 17, 1999, now U.S. Pat. No. 6,420,975, the entire disclosure of which is hereby incorporated by reference herein, and in co-assigned U.S. patent application Ser. No. 09/449,121, filed Nov. 24, 1999, now U.S. Pat. No. 6,428,172, the entire disclosure of which is hereby incorporated by reference herein.

The light source of tire inflation indicator assembly 19 can include a lens, which may be supplied as a segmented lens, a prismatic lens, or a Fresnel lens, which may be clear or tinted, and may be provided over such light source.

Other modifications may include providing an input 36 from a vehicle keyless entry system. Control 18 may respond to input 36 by providing outputs to illuminate tire inflation indicators 19 upon the user operating the keyless entry system to unlock the doors. The control 18 would preferably illuminate tire inflation indicator assemblies 19 upon actuation of the keyless entry system until the outputs to the tire inflation indicator assemblies are locked out by receiving an input 32 indicating that the vehicle is operating and/or until after a predetermined time interval, determined by timeout 37, has elapsed. Although the invention is illustrated in use with an exterior vehicle portion such as exterior rearview mirror assemblies, a tire inflation indicator assembly, according to the invention, could also be positioned within the interior cabin of the vehicle, such as at a vehicle interior rearview mirror assembly 228 (FIG. 1), or at an inner cabin roof portion such as a header console 229, or at an instrumentation panel 227, or the like. However, this is less preferred as an interior cabin portion such as the interior mirror assembly is not as readily visible to a person inflating a tire mounted on a vehicular wheel (as compared to mounting the indicator of the tire inflation indicator assembly on an exterior vehicle portion such as an exterior side view mirror assembly, or at/on a side marker turn indicator, or at/on an exterior side body panel such as a door panel, wheel well, fender portion or at/on a door handle assembly or the like). Also, the tire inflation indicator assembly can optionally be provided as part of the vehicle wheel assembly itself. For example, the valve provided at the wheel tire to inflate the tire can include a tire inflation indicator assembly (such as a non-incandescent light emitting source such as an electroluminescent source (organic or inorganic) or a light-emitting diode) which has a light emission coded to the inflation status of the tire.

Also, the tire inflation indicator assembly, according to the invention, can be mounted at, or combined with, a light assembly already present on an exterior vehicle portion such as a mirror-mounted turn signal or a side marker turn signal or an exterior mirror-mounted security light. Thus, for example, a side marker turn signal light source present on the side body panel for the purpose of signaling a lane change when a turn signal stalk in the interior vehicle cabin is actuated can also serve the dual purpose of acting as the tire inflation indicator for the tire inflation indicator assembly, according to the invention, and with the inflation status being indicated to the person inflating a tire on the side of the vehicle on which the side marker turn signal is mounted by flashing the turn signal to a code pattern determined and understood to signal a below-desired tire pressure state, a desired tire pressure state, and/or an overly inflated tire pressure state. Likewise, a mirror-mounted signal light or a security light, such as are disclosed in U.S. Pat. No. 5,669,704, the entire disclosure of which is hereby incorporated by reference herein, can be similarly used for dual-purposes.

Optionally, an audible tire inflation indicator can be provided in addition to (or as an alternate to) the visible tire inflation indicators described above for the tire inflation monitoring systems of the present invention. Thus, and referring to FIG. 6, tire inflation indicator system 116 is similar to tire inflation indicator system 16 described above. Thus, tire inflation indicator system 116 includes a tire pressure monitoring controller 118 (that typically includes an antenna, a microprocessor and associated electronic circuitry and that preferably includes user actuation/manual input elements such as switches or buttons or voice actuated input elements that allow a driver select, for example, a particular tire for display of its tire pressure or change the display from Imperial units to Metric units or enter a "training" mode whereby the driver can identify to the controller the location of a tire sensor on a particular wheel of the vehicle so that, during, for example, a tire rotation, the controller can learn which sensor is on what wheel such as by, for example, the driver "burping" tire pressure on a particular identified wheel such as the front passenger-side wheel when the system is in "learning" mode so that the controller can associate that particular wireless broadcast signal with that particular wheel) that receives tire pressure level input signals 122a, 122b, 122c, 122d (preferably via short-range RF wireless transmission and most preferably in accordance with the BLUETOOTH protocol) from tire pressure sensors 120a, 120b, 120c, 120d located, respectively, within the pressurized cavity of the front passenger-side tire, the front driver-side tire, the rear passenger-side tire and the rear driver-side tire (said tires mounted onto the respective wheels of a vehicle). System 116 is optionally, and preferably provided with at least one of lockout 133, door lock status input 134, ignition sensing circuit 132, timeout 137, and tire pressure adjust sensor 139 (preferably, one such tire pressure adjust sensors at each wheel of the vehicle). System 116 also preferably includes visible exterior passenger-side mounted tire inflation indicator 119 (preferably a passenger-side exterior side view mirror-mounted visible mounted tire inflation indicator) and visible exterior driver-side mounted tire inflation indicator 119' (preferably a driver-side exterior side view mirror-mounted visible mounted tire inflation indicator) that operates as described above. System 116 also includes audible tire inflation indicator 145. Audible tire inflation indicator 145 can be of several types. For example, audible tire inflation indicator 145 can comprise a sound-generating microchip or similar solid-state sound or audible tone generating element that is part of tire pressure sensors 120a-d and that "chirps" or sounds or otherwise gives an audible sound coded to the state of inflation of the tire while air is being pumped in or bled out by a driver or service attendant during a tire inflation/deflation event such as at an air pump at a service station. The tone or audible signature of audible tire inflation indicator 145 can signal to the driver or service attendant, while that person is in the act of adjusting air pressure of a particular tire on a vehicle such as at a service station, whether the instantaneous tire pressure of the particular tire being serviced is at, below or above the tire pressure recommended for that particular tire on that particular model vehicle (and optionally, at the particular ambient temperature and/or vehicle load at which the tire pressure adjust event is occurring). Note that where a solid-state sound generator is used as audible tire inflation indicator 145, and where it is incorporated as part of a tire pressure sensor that is located within the pressurized-air tire cavity of a vehicular wheel, then audible tire inflation indicator 145 can optionally, and preferably, operate as part of the tire pressure sensor itself without a need for wireless transmission to and from an interior cabin-mounted controller 118. In this regard, the tire sensor, the audible tire inflation indicator and the controller are collocated as part of the same tire cavity-mounted tire pressure sensing module. Alternately, audible tire inflation indicator 145 can comprise the vehicle horn. In such an embodiment, and while the person is actually adjusting the tire pressure on a particular tire when external to the vehicle (and typically crouched down at that particular wheel being serviced and preferably with the vehicle ignition turned off), a wheel-mounted tire pressure sensor 120a (taking the example where the person is outside the vehicle adjusting the tire pressure of the front passenger-side wheel) transmits a wireless signal 122a that is received at vehicle tire pressure monitoring controller 118 that is preferably located within the interior cabin of the vehicle (preferably at, on, or within an interior rearview mirror assembly or at, on or within a display assembly such as a flip-down video display assembly, as described below). Controller 118 processes signal 122a, and determines whether the tire pressure being sensed by tire sensor 120a is below, at, or above the tire pressure recommended by the vehicle manufacturer/tire manufacturer for that particular model/type of tire on that particular model vehicle (optionally taking into account the ambient temperature the vehicle is operating in and the load in the vehicle, such as might be determined by sensors associated with and sensing the vehicle suspension system). Dependent on the tire pressure sensed, controller 118 causes the circuitry controlling the vehicle horn to cause the horn to sound an audible signal or pattern of sounds that signal to the person adjusting the front passenger-side tire pressure that that tire is below, above and/or at the desired tire pressure recommended for that particular tire, and that audibly guide or prompt that person to pump more air in or bleed air out in order to adjust that tire's pressure to the correct pressure level, for example, 35 psi (pounds per square inch). In addition, and optionally and preferably, visual passenger-side tire inflation indicator 119 can visually signal the instantaneous tire pressure being sensed at the front passenger-side wheel as its tire pressure is being adjusted. To avoid distracting or perturbing others in the vicinity, the sound level emitted by the car horn when functioning as an audible tire pressure indicator can be reduced in level from that normal for the horn, and it can also be of a sound pattern distinctive to a particular brand of vehicle/automaker so that a person adjusting tire pressure on his or her vehicle can identify and distinguish the audible tire pressure adjust signal of that person's vehicle from other audible signals from other vehicles, including from any other audible tire pressure indicator device-equipped vehicle that happens to be undergoing a tire pressure adjust in the immediate vicinity (a relatively rare/unlikely event given that most service stations have only one air hose provide to pump air into customers' tires). Other locations for audible tire inflation indicator 145 are possible on a vehicle such as a sound/tone generator located in either of, or both of, the driver-side and passenger-side exterior side view mirror assemblies and/or in any of the door handle assemblies of the vehicle or in an engine compartment or in a trunk compartment or in a side door panel or in a wheel well or in a body panel of the vehicle. Note that in the context of the present invention, an audible tire pressure indicator comprises a sound device that generates a sound pattern audible to a person outside the vehicle while that person is undertaking a tire pressure adjustment of a tire on a wheel mounted on the vehicle (such as with an air hose from a pressurized air pump such as at a service station), and such that the audible sound indicator encompasses generating an audible sound that indicates to the person adjusting the tire pressure that the tire pressure is at, below and/or above a recommended level for that tire on that vehicle, and as known to the vehicle tire pressure monitoring controller (typically stored in an electronic storage element thereof) of the vehicle tire pressure monitoring system. Note also that in the context of the present invention, a visible or visual tire pressure indicator comprises a light emitting light source (such as a light emitting diode or an incandescent source or a fluorescent source or an electroluminescent source) that, when powered, emits a light pattern visible to a person outside the vehicle while that person is undertaking a tire pressure adjustment of a tire on a wheel mounted on the vehicle (such as with an air hose from a pressurized air pump such as at a service station), and such that the visual or visible tire pressure indicator encompasses generating a light that indicates to the person adjusting the tire pressure that the tire pressure is at, below and/or above a recommended level for that tire on that vehicle, and as known to the vehicle tire pressure monitoring controller (typically stored in an electronic storage element thereof) of the vehicle tire pressure monitoring system. An audible tire pressure indicator device can be located anywhere in the vehicle such as in the vehicle interior cabin, in an engine compartment, in a trunk compartment, in a body panel, or in a vehicular accessory (such as an interior mirror assembly or an exterior mirror assembly or a door handle assembly or a console assembly), but is preferably located exterior to the interior cabin of the vehicle (so as to be more readily audible to a person outside the vehicle in the act of adjusting tire pressure). A visible or visual tire pressure indicator device can be located in an interior portion of the vehicle (such as at, on, within or adjacent an interior mirror assembly or a header console assembly or a dome light assembly) or at an exterior portion of the vehicle (such as at, within or adjacent an exterior side view mirror assembly or a door handle assembly), but preferably at a location readily visible to a person outside crouched at a wheel.

Also, in any of the above embodiments, a tire pressure sensor can be located in a spare tire of the vehicle, and the spare tire pressure can be adjusted aided by the audible and/or visible and/or tactile tire pressure inflation status indicators of the present invention.

Also, optionally, the tire pressure sensor located in each tire on the vehicle can include a solid-state vibrator or trembler (such as the vibration devices common on pagers and cell phones that provide a vibration indication of receipt of a call or of a message, as known in the art). Thus, when, for example, a tire pressure sensor at a particular wheel senses that the tire pressure in that particular tire is at (or close to) the recommended or desired tire pressure, then the air inlet/outlet valve or stalk or valve stem to which an air hose connects is caused to vibrate, by (referring to FIG. 6) vibrator elements

124*a*, 124*b*, 124*c*, 124*d* (that are respectively associated with the tire pressure sensor/air inlet valve of the front wheel tires and the rear wheel tires), and thus indicate to a person in the act of a tire pressure adjust that the tire pressure is at (or close to at) the desired tire pressure. Such trembler or vibrator can be configured only to operate when an actual tire pressure adjust event is occurring (such as only being active when tire pressure is rapidly changing such as might indicate (and be characteristic of) a tire pressure adjust event occurring, or when the nipple in the valve stem is depressed). Thus for example, should an air hose be connected to the valve stem that allows inflation/deflation of a tire on a wheel equipped with a tire sensor of this invention that includes a vibrator element, then, upon recognition that a tire adjust event is occurring (such as by detection or depression of the tire inlet nipple and/or by detection of a rapid rate of change of air pressure), the tire pressure sensor determines whether the instantaneous tire pressure is above or below the desired, pre-determined tire pressure level recommended for that tire on that vehicle, and upon detecting (for example) that tire pressure is higher than desired, the tire pressure sensor causes its in-built vibrator to vibrate or tremble which in turn causes the valve stem to tremble. Since the person adjusting the tire pressure is holding the nozzle of an air hose to that tire valve stem, that person will feel these vibrations, and knowing from the vehicle owner's manual that "vibration" means that "tire pressure is too great", is instructed by the tactile feel of the nozzle on the nipple to deflate the tires. Once the correct tire pressure is reached, the vibrations cease, and upon feeling that the vibrations have ceased, the person can cease deflating the tire. If however the valve stem is not trembling or vibrating when the person first initiates a tire pressure adjust, the person knows (again from the vehicle owner's manual) that this signifies that the tire is under-inflated, and so the person is prompted to pump air in to inflate the tire, but to cease once a vibration or tremble in the valve stem is first felt, as this signifies that the air pressure in the tire has now reached the recommended pressure level. Different tactile codes can be envisaged that are indicative of tire pressure level in a tire while that tire is being inflated or deflated using an air hose from an air pump at a service station. The advantages of a tactile tire pressure indicator as described herein include that a module comprising the tire pressure sensing transducer, a tire pressure processor (preferably a microprocessor-based tire pressure monitor), a battery, associated circuitry, the inlet valve (including its stem and nipple), and the vibrator or tremble-generator can be provided as a sealed (preferred), unitary package that can be placed onto a wide variety of tire cavities on wheels, and without the necessity and/or expense of providing a wireless link to an in-cabin controller (although such is preferable when there is a desire to provide a vehicle tire pressure display to the driver while the driver is driving). Further, a tactile tire pressure indicator such as described herein such as shown in FIG. 6 can be used in conjunction with a tire pressure display system that senses states of tire inflation or deflation by monitoring a performance characteristic of an ABS braking system on the vehicle.

As described above, it is preferable that a display of tire pressure status be provided in the interior cabin of the vehicle (such as interior cabin tire pressure status display 123 of system 116) so that the driver, when operating the vehicle such as when driving down the highway, can check/be made aware of the tire pressure at any of the wheels on the vehicle. Note, and as described above, such interior cabin tire pressure displays are intended for use while driving the vehicle on a highway, and are normally not intended for use when the vehicle is stopped and with its ignition turned off, and are not normally adapted to be visible or useful to a person outside a vehicle and crouched down at a wheel in the act of making a tire pressure adjustment using an air hose as typically provided at a service station or the like. As described above, a preferred location for such an interior cabin tire pressure status display is at, on or within an interior mirror assembly of the vehicle. Also, and as disclosed in U.S. provisional application Ser. No. 60/243,986, filed Oct. 27, 2000, in U.S. provisional application Ser. No. 60/238,483, filed Oct. 6, 2000, U.S. provisional application Ser. No. 60/237,077, filed Sep. 30, 2000, U.S. provisional application Ser. No. 60/234,412, filed Sep. 21, 2000, U.S. provisional application Ser. No. 60/218,336, filed Jul. 14, 2000, and U.S. provisional application Ser. No. 60/186,520, filed Mar. 2, 2000, U.S. Pat. No. 6,124,647 and U.S. patent application Ser. No. 09/660,712, filed Sep. 13, 2000, now U.S. Pat. No. 6,291,906, the entire disclosures of which are hereby incorporated by reference herein, an interior cabin-located tire pressure status display can be displayed at a variety of interior mirror assemblies, accessory modules mounted at, on, within or adjacent to the interior mirror assembly, and display assemblies including flip/down, stowable video display assemblies (and preferably display assemblies including flip/down, stowable video display assemblies mounted at, on, within or adjacent to the interior mirror assembly). In this regard, it is preferable that the vehicle tire pressure monitoring controller (such as controllers 16 and 116 of, respectively, FIGS. 5 and 6) be incorporated into such interior mirror assemblies or such accessory modules or such flip-down video display assemblies.

Figure 7:
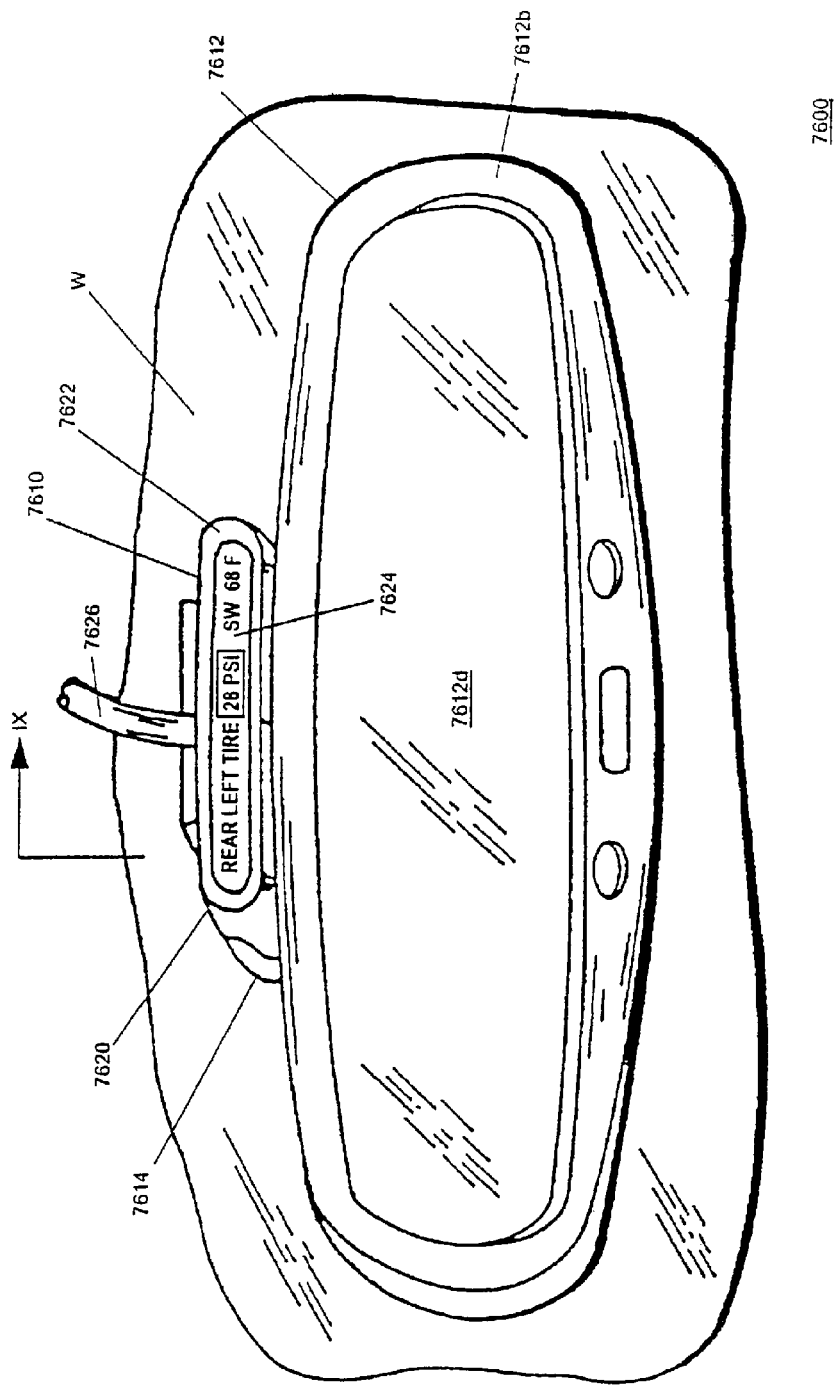
FIG. 7 is a front elevation view of a video mirror system incorporating a tire pressure display of the present invention.
Figure 8:
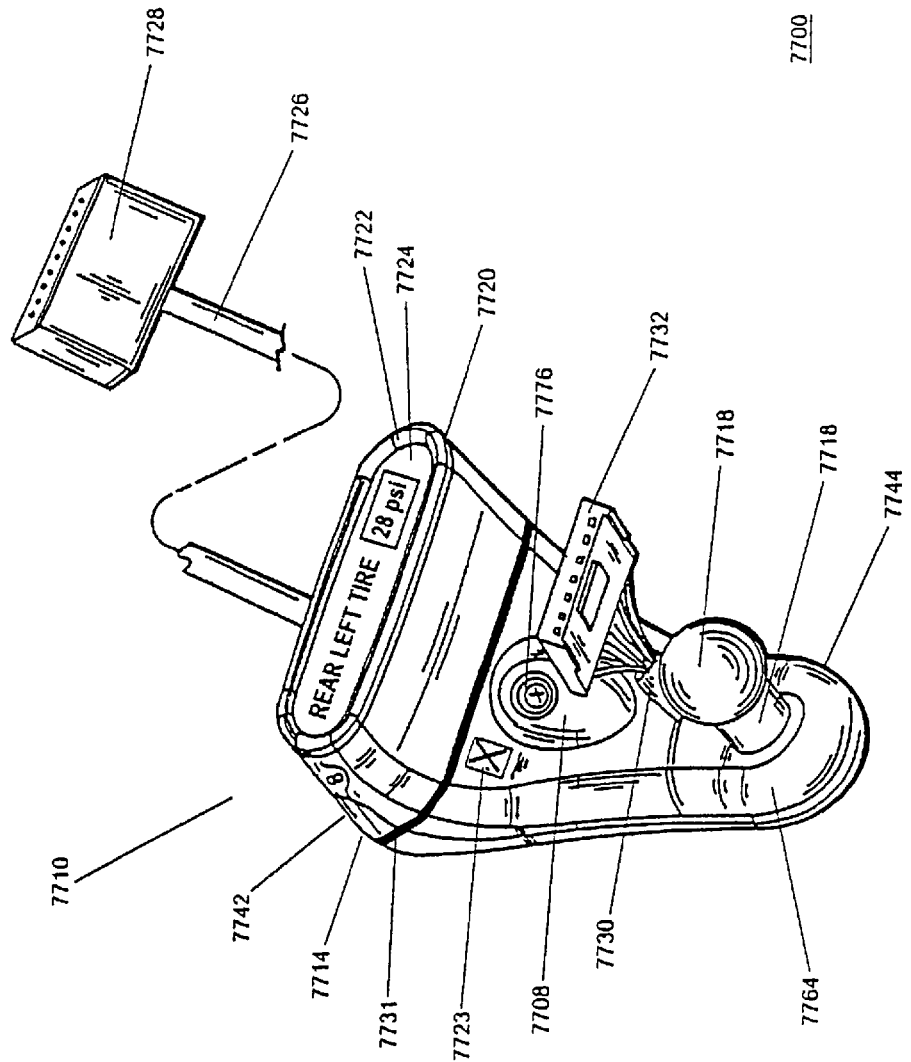
FIG. 8 is an enlarged perspective view of a rearview mirror support incorporating a tire pressure display of the present invention.

Thus, as referring to FIGS. 7 and 8 (and such as is disclosed in U.S. provisional application Ser. No. 60/243,986, filed Oct. 27, 2000, in U.S. provisional application Ser. No. 60/238,483, filed Oct. 6, 2000, the entire disclosures of which are hereby incorporated by reference herein), an interior cabin tire pressure status display 7624 can be included in interior mirror assembly system 7600. Referring to the FIGS., rearview mirror support 7710 includes a vehicle information display 7624, 7724 of tire pressure status, similar to the unitary interior mirror support and information display assembly disclosed in U.S. Pat. No. 6,087,953, the entire disclosure of which is hereby incorporated by reference herein. Support 7710 further includes a pivot/swivel joint 7731 that allows adjustment of the viewing position of information display 7624, 7724 when support 7710 fixedly mounts to a windshield-mounted mirror attachment button as described in U.S. Pat. No. 6,087,953. As seen in FIG. 8, information display 7724 can display tire pressure status and/or can display a variety of information (such as the tire pressure display/compass directional heading/exterior temperature display shown in display 7624 in FIG. 7) and such as is described above in relation to the other embodiments of the present invention. Mirror housing 7612*b* mounts to ball member 7718 to form a pivot joint that allows adjustment of mirror housing 7612*b* about support 7710. Note that the connection of mirror housing 7612*b* to support 7710 can include a second pivot joint to allow "two-ball" adjustability of the mirror housing. Also, ball member 7718 can optionally be replaced with a mirror assembly attachment member (such as with the mirror button configuration as used on that particular vehicle) and then the interior mirror assembly can detachably and preferably, break-away attach to support assembly 7710. This allows removal of an existing interior mirror assembly from the windshield button in a vehicle, mounting of support assembly 7710 on that windshield-mounted button, and reattachment of the existing interior mirror assembly (or another) onto support assembly 7710 via the mirror-mounting button provided thereon. Note also that the various circuitry, antennae and transmitters/receiver, including the vehicle tire pressure monitoring controller discussed above, can be included in housing 7714 of adjustable support/accessory assembly 7710 such as vehicle tire pressure monitoring controller 7723 (that preferably includes an RF receiving antenna, a microprocessor and all the circuitry, user input controls/buttons and other controls needed to receive and process wireless signals broadcast from the various tire pressure sensors located in the tire on the wheels of the vehicle) of rearview mirror support 7710 (or alternately, can be positioned in adjustable mirror housing 7612b behind reflective element 7612d). Further, housing 7612b or support/accessory assembly 7710 can include a telematic system including a telematic system including floating car data can be included in any of the assemblies of the present invention whereby the vehicle transmits its position to a central aggregator (such as in support assembly 7710 or in mirror housing 7612b). The central aggregator also receives positional data from many other vehicles on that highway/in that region. The central aggregator integrates the position, speed, direction etc of all the vehicles inputting, as well as weather data, road repair data etc, traffic-flow data, road-condition data and the like, and integrates these to report back to individual vehicles the best possible route for that vehicle, taking all conditions including traffic, weather etc into account. Also, telematic and/or cellular phone transmissions from the vehicle can be detected and analyzed using wireless location technology (such as is available from Webraska) in order to locate the position of a mobile device user in a vehicle on a highway. Also, any of the telematic systems of the present invention can include a vehicle emergency messaging system.

Figure 9:
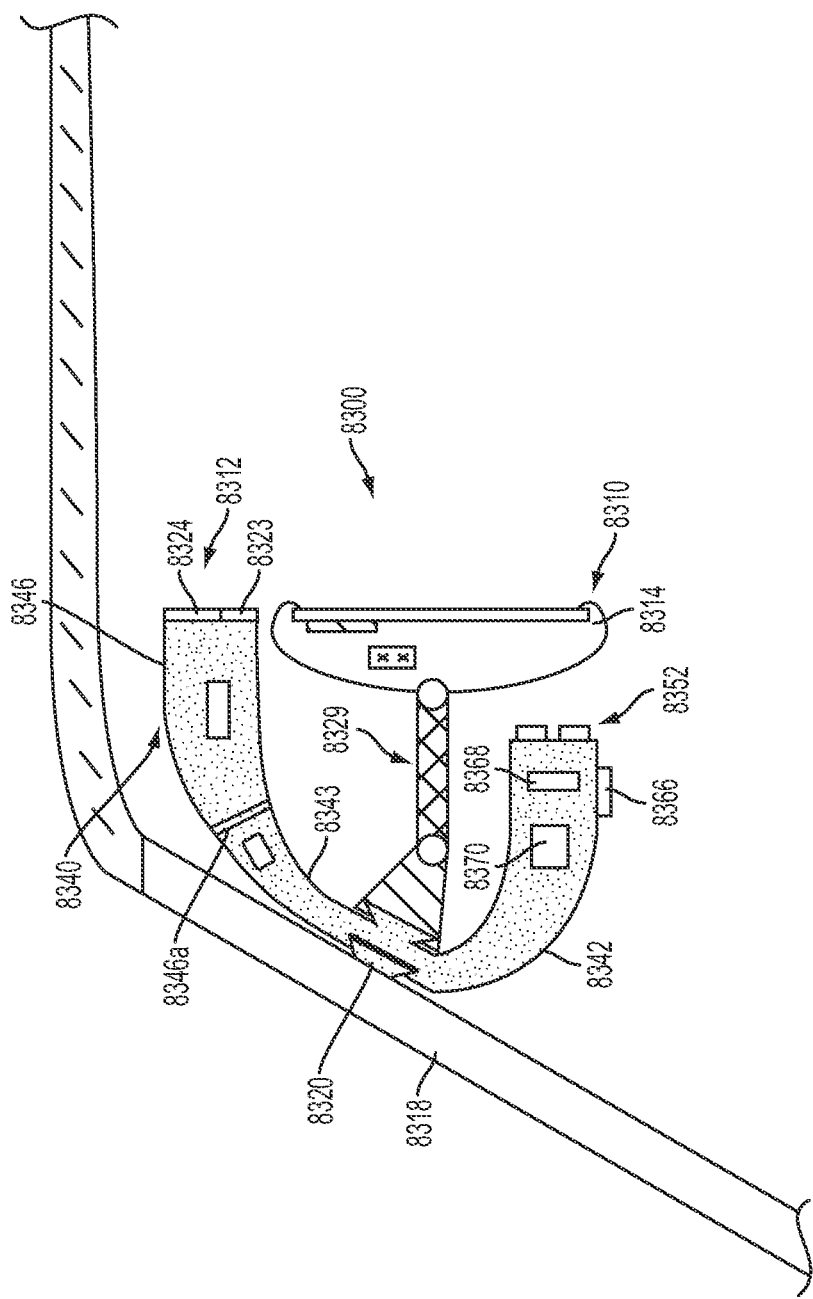
FIG. 9 is a side elevation view of an accessory module/mirror system incorporating a vehicle tire pressure monitoring system of the present invention.

Referring to FIG. 9, another embodiment 8300 of an accessory module/mirror system that includes a vehicle tire pressure monitoring controller 8323 (that preferably includes an RF receiving antenna, a microprocessor and all the circuitry, user input controls/buttons and other controls needed to receive and process wireless signals broadcast from the various tire pressure sensors located in the tire on the wheels of the vehicle) is illustrated. Accessory module/mirror system 8300 includes an interior rearview mirror assembly 8310 and an accessory module 8312. Rearview mirror assembly 8310 can be a double-ball (as illustrated) or a single-ball mirror assembly, as such are known in the rearview mirror art. Accessory module 8312 is adapted to releasably mounted to an interior vehicle, such as a windshield 8318 on a mirror mounting button 8320, and such as is disclosed in U.S. provisional application Ser. No. 60/243,986, filed Oct. 27, 2000, in U.S. provisional Ser. No. 60/238,483, filed Oct. 6, 2000, the entire disclosures of which are hereby incorporated by reference herein. Modular 8312 includes a housing 8340 with an upper portion 8346, a lower portion 8342, and a medial or central portion 8343. In the illustrated embodiment, lower portion 8342 comprises a fixed portion, which extends below central portion 8343 and below support 8329 of interior rearview mirror assembly 8310 but preferably forwardly of housing 8314 of interior rearview mirror assembly 8310. In this manner, lower portion 8342 is essentially hidden or in an unobtrusive/unnoticeable position to minimize the distraction to the driver while optimizing the use of the space below and behind the mirror housing 8314 of interior rearview mirror assembly 8310, while minimizing interference with the driver's forward field of view through the windshield. Lower portion 8342, similar to lower portion 8242, includes a plurality of user interface accessories 8352 (including user interfaces to controller 8323), which are positioned in such a manner to permit easy physical access to the various accessories mounted thereon or therein. For example, lower portion 8342 may include a microphone 8366, a speaker 8368, and a digital message recorder and/or note taker 8370. In addition, accessory module 8312 also incorporates as interior cabin-located vehicle tire pressure monitoring controller 8323. The tire pressure monitoring controller 8323 preferably include a wireless receiver such as an RF receiver that receives wireless communication from individual tire pressure sensors, such as piezo-electric transducers, located in the individual tire valves and/or wells of the vehicle such as is described in U.S. Pat. No. 5,741,966, the disclosure of which is herein incorporated by reference in its entirety. Various other accessories may also be incorporated into module 8312. For further details of additional or other accessories which may be incorporated, reference is made to the previous embodiments and to the various patents and applications incorporated by reference herein. It should also be understood that lower portion 8342 may optionally comprise an adjustable portion. Also, controller 8323 can be located in any portion of module. Accessory module 8312 includes an information display element 8324 (such as a vacuum fluorescent display or a liquid crystal display or a field-emission display or an electroluminescent display or a light emitting diode display, and preferably a multi-pixel display and more preferable, a reconfigurable display) that displays an output of controller 8323 and that conveys information to the driver as to the tire pressure status of one, some or all of the tires on the wheels of the vehicle. Note, and as disclosed in U.S. provisional application Ser. No. 60/243,986, filed Oct. 27, 2000, in U.S. provisional application Ser. No. 60/238,483, filed Oct. 6, 2000, the entire disclosures of which are hereby incorporated by reference herein, the provision of a module 8312 such as shown in FIG. 9 that includes both controller 8323 and display element 8324 of a tire pressure monitoring and/or tire pressure display system is particularly advantageous as it includes mounting the module onto a windshield-mounted rearview mirror attachment element or button 8320 (or alternately, a header-mounted rearview mirror attachment element or plate), and with the interior rearview mirror assembly 8310 detachably and, preferably, break-away mounting to mirror assembly attachment button or element 8321 that is part of module 8312. In this manner, a tire pressure monitoring and/or tire pressure display system can be readily mounted into a vehicle by first detaching the existing rearview mirror assembly from its mount (typically a windshield-mounted button), next attaching module 8312 to that windshield-mounted button, and then re-attaching the rearview mirror assembly to the mirror-mounting element or button (that is the same as on the windshield) that is part of module 8312. The read-out/indication of tire pressure is readily viewable by the driver such as at display 8321. Note that optionally, the viewing position of display 8321 is positionable such as by swivel or pivot joint 8346a, or optionally display 8321 can be canted or angled towards the driver to enhance viewability by the driver of information displayed thereon. Also, optionally, display 8321 can be positioned on module 8312 so as to be visible below the mirror case of the interior mirror assembly (as opposed to above as in FIG. 9).

Also, and as disclosed in U.S. provisional application Ser. No. 60/243,986, filed Oct. 27, 2000, in U.S. provisional application Ser. No. 60/238,483, filed Oct. 6, 2000, the entire disclosures of which are hereby incorporated by reference herein, and referring to FIG. 10, an accessory module/mirror system 7900 incorporating a controller 7923 for a tire pressure monitoring and/or tire pressure display system is illustrated. Accessory module/mirror system 7900 includes an interior rearview mirror assembly 7910 and an accessory module 7912, which includes one or more viewable user interface accessories 7950 and optionally one or more user interface accessories 7951 which are accessible but positioned in a manner behind interior rearview mirror 7910 so that they are not necessarily visible to the driver of the vehicle when the driver is in a normal sitting position, such as when driving.

Figure 12:
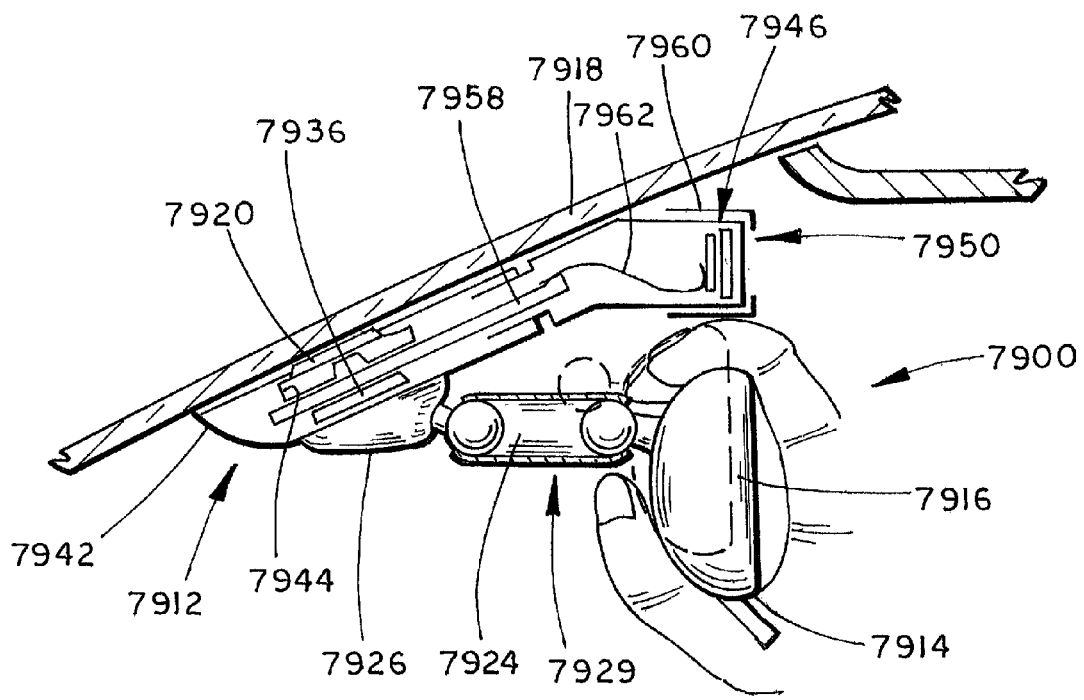
FIG. 12 is an enlarged side elevation view similar to FIG. 11.
Figure 13:
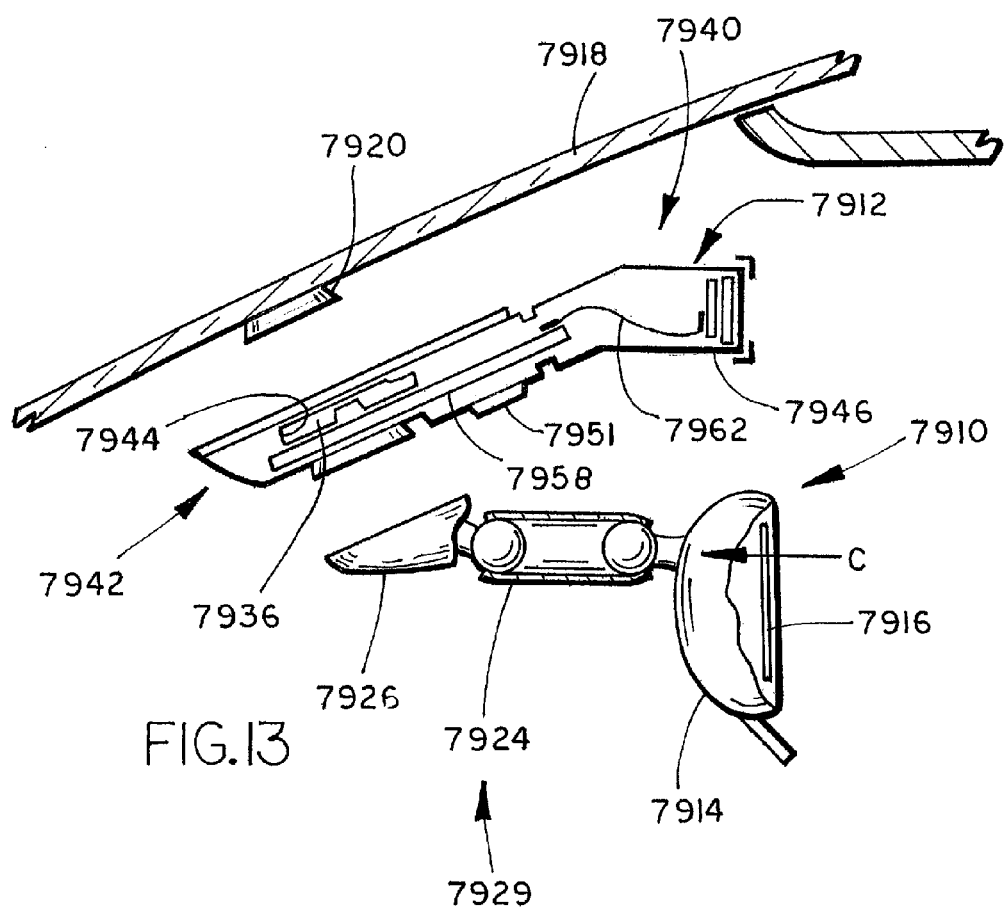
FIG. 13 is an exploded side elevation view of the accessory module/mirror system of FIGS. 10-12.

As best seen in FIGS. 12 and 13, interior rearview mirror assembly 7910 includes a mirror casing or housing 7914 and a reflective element 7916 (for example a prismatic or an electro-optic reflective element) and, further, a mirror housing support 7929, similar to the previous embodiments. Optionally and preferably, when reflective element 7916 comprises a prismatic reflective element, interior rearview mirror assembly 7910 includes a toggle for adjusting the position of the reflective element between its day and night viewing positions, such as described in U.S. patent application Ser. No. 09/533,127, filed Mar. 23, 2000, now U.S. Pat. No. 6,318,870, which is incorporated herein by reference in its entirety. In addition, though illustrated as a dual ball mount support, housing support 7929 may include a fixed support arm or may include a single ball mount arrangement.

Accessory module 7912 is adapted to mount to a vehicle and, preferably, adapted to releasably mount in the interior of the vehicle. In the illustrated embodiment, accessory module 7912 is adapted to releasably mount to windshield 7918 on a windshield mounting button 7920 and, preferably, includes a mirror mount 7944, such as a channel shaped member, which provides a break-away mounting for module 7912 on button 7920. It should be understood that module 7912 may also be mounted to a header of the vehicle. Button 7920 may be of conventional design and is preferably mounted to the inner surface of windshield 7918 by an adhesive. In addition, accessory module 7912 preferably includes a mirror mounting button 7936 for releasably mounting interior rearview mirror assembly 7910 to module 7912 and, in turn, to windshield 7918. Alternately, accessory module 7912 can mount adjacent to but separate from the attachment element of the interior mirror assembly (such as mounting to a separate windshield-mounted attachment element or header-mounted attachment member, such as described above).

Mirror housing support 7929 preferably comprises a dual ball mount support with a support arm 7924 and a mirror mount 7926 with ball and socket connections between support arm 7924 and mirror mount 7926 and between support arm 7924 and mirror casing 7914 to provide pivoting of support arm 7924 about mirror mount 7926 and/or pivoting of housing 7914 about support arm 7924. Mirror mount 7926 releasably engages mirror mounting button 7936 of accessory module 7912 and provides a break-away mounting of interior rearview mirror assembly 7910 to module 7912.

Figure 11:
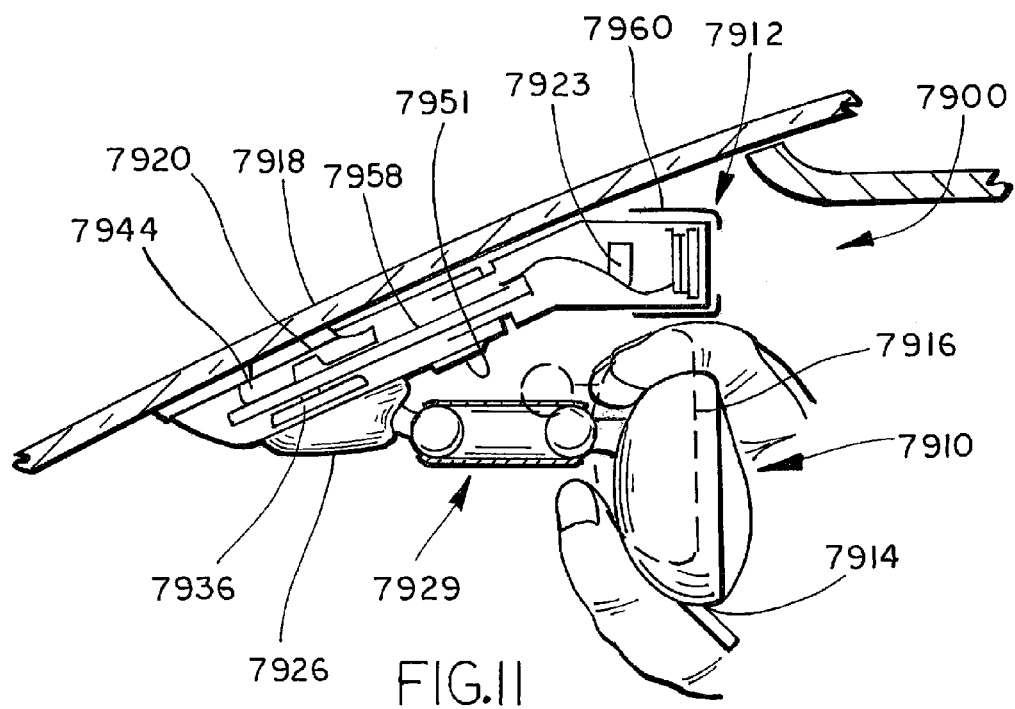
FIG. 11 is a side elevation view of the accessory module/mirror system of FIG. 10.

Referring again to FIG. 10, accessory module 7912 includes a module housing 7940 with a lower portion 7942 (FIGS. 11-13) including mirror mount 7944 for releasably engaging mirror mounting button 7920. Mirror mount 7944 is provided by a channel shaped recess which is either formed in housing 7940 or provided by a channel shaped member mounted to housing 7940. An opposed side of lower portion 7942 of body 7940 is provided with mirror mounting button 7936 and, preferably, with mirror mounting button 7936 aligned with mirror mount 7944. In this manner, when interior rearview mirror assembly 7910 is mounted to mirror mounting button 7936 and module 7912 is mounted to button 7920, mirror mounting button 7920 and mirror mounting button 7936 are aligned along a common axis.

An upper portion 7946 of body 7940 is positioned above housing 7914, including bezel 7948, and reflective element 7916 of interior rearview mirror assembly 7910 and includes one or more of the viewable user interface accessories 7950. Accessories 7950 may include, for example, a display 7952, user-actuatable controls/buttons 7954, and/or lights 7956. In the illustrated embodiment, accessories 7950 are positioned on a rearwardly facing portion of upper portion 7946 and are preferably aligned to provide a compact arrangement which offers a wealth of information in a small space.

In addition, accessory module 7912 may house a variety of vehicle accessories and controls in addition to tire pressure system controller 7923. For example, a GPS navigational system, including a GPS antenna, may be included in housing 7940. Other accessories that may, for example, be included in housing 7940 include a trainable garage door opener, such as a Homelink® Video System registered trademark system available from JCI of Holland, Mich., and/or may include a cellular phone system including a complete telecommunication system/antenna/transceiver and/or telematic system including antenna and transceiver and/or an automatic toll booth/remote transaction transceiver system and/or a compass direction system, including a compass sensor, such as described above and/or any of the vehicle accessories and functions described above. In addition, housing 7940 may include a microphone system (preferably a multi-microphone array including a digital sound processing system, which may also be including in housing 7940). Such a microphone system is suitable for use in voice command interactions, cellular phone interactions, hands-free phone operations, telematic communications, and the like. Furthermore, accessory module/mirror system 7900 may include a loud speaker, located, for example in housing 7940 or mirror casing 7914 (or, less preferably, elsewhere in the vehicle) that, for example, functions as a speaker for an audible tire pressure indicator device. Preferably, the loudspeaker comprises a solid-state, ceramic speaker element (such as a piezo-electric loudspeaker element). Such solid-state, ceramic speakers are provided in a thin configuration (less than 5 mm in thickness and often less than 3 mm in thickness), and are available from such as Panasonic of Tokyo, Japan. These solid-state loudspeakers are particularly adaptable to mounting in a compact space (such as within the various housings of the present invention) and/or mounting onto a PCB. Preferably, module 7912 also includes a carrier member 7958 positioned in housing 7940, for example, in lower portion 7942, for supporting one or more of the vehicle accessories and controls, including supporting circuitry for the various user interface accessories.

User interface accessories 7950, such as user-actuatable buttons 7954, may be used to actuate or interface with one or more of the various systems (including a tire pressure monitoring system and/or a tire pressure display system, such as described above and in the patents and applications incorporated by reference herein, which may be incorporated into accessory module/mirror system 7900. For example, buttons 7954 may be used to actuate such vehicle functions as the opening of a trunk or hood of the vehicle, emergency light flashers, a road side assistance system, such as an ONSTAR® system, selection of display of tire pressure of a particular wheel, entering a "learning/training" state for a tire pressure system or the like. Display 7952 can function as a display screen for a tire pressure system and optionally for other systems as well such as a GPS system, telematic system, a remote transaction system, or the like, which may or may not be incorporated into module 7912. However, it is preferable that module 7912 provide a self-contained unitary module which houses complete or sub-systems, such as the components (such as an antenna, user-input controls, microprocessor, electronic memory, and associated circuitry) of a tire pressure monitoring/tire pressure display system (other than those components that are located outside the interior cabin, such as in the wheels or as part of an exterior mirror assembly) and may additionally house other systems or sub-systems such as a GPS system comprising a GPS antenna, GPS circuitry, and a display screen displaying the GPS information. In this manner, module 7912 is especially suitable as an after-market product. However, optionally, module 7912 can be installed when the vehicle is being produced at the OEM automaker. Alternately or in addition, display 7952 can function as a display for a portable computer device, portable cellular phone, and/or a portable personal digital assistance device, such as a PalmPilot® or other personal digital assistant devices. In addition, display 7952 may serve multiple purposes, such as a video screen for an onboard vehicular camera and/or a video monitor screen for a portable computing/PDA/cellular phone/communication device. For example, a removable telecommunication and/or computing accessory, as previously described, can be removably docked into a docking station of accessory module 7912. In addition, optionally, display 7952 may be removably mounted in accessory module 7912 so that display 7952 may be detached and used remote from the vehicle such as part of a portable video device, portable computer monitor, portable PDA, or a portable navigation device.

Display 7952 may include a display element 7952a (FIG. 10), such as a vacuum fluorescent display, an LED display, a field emission display, an electroluminescent display, or a liquid crystal display and optionally may comprise a multi pixel display capable of being reconfigured and capable of displaying scrolling text including alphanumeric text in various fonts and languages. In this manner, display 7952 may be used to display text messaging. For example, display element 7952a may display, in response to a GPS system, for example the name of the next street or junction or highway or entrance or exit ramp being approached by the vehicle equipped with accessory module/mirror system 7900, or display element 7952a may display the tire pressure in a particular wheel tire in response to an interrogation by the driver or in response to the tire pressure display system detecting that a particular tire's tire pressure has fallen below, or is above, a recommended tire pressure level that is stored in controller 7923.

Light or lights 7956 may form part of an interior camera surveillance system, and preferably comprise low-level non-incandescent light sources, such as light emitting diodes, organic light emitting diodes, electroluminescent sources (inorganic and organic), or the like. Other features that may be incorporated into accessory module/mirror system 7900 and, preferably into accessory module 7912, include an inclinometer, such as an accelerometer-based inclinometer or a liquid based inclinometer. Such an inclinometer may serve as a sensor to detect vehicle inclination and may be coupled to a system such as a comprehensive anti-rollover system, which is especially desirable in vehicles with high centers of gravity (such as sports utility vehicles).

In preferred form, upper portion 7946 of housing 7940 includes an adjustable portion such as telescoping portion 7960 on which user interface accessories 7950 are mounted. In this manner, an occupant of the vehicle may adjust the position of the user interface accessories to suit their needs. In order to accommodate the repositioning of user interface accessories 7950, accessories 7950 are connected to carrier 7958 by extendable cable or wiring 7962. In addition, generally non-viewable user interface accessories 7951, such as phone jacks, power sockets, or card readers, or the like may be positioned behind mirror case 7914 on housing 7940. Since these accessories do not require visual interface, unlike the video display buttons, or the like, they may be advantageously positioned in non-viewable and otherwise unused space though these accessories may be viewed if the interior rearview mirror assembly is removed or the user shifts their position to, for example, a bent position.

Referring again to FIG. 12, in preferred form, upper portion 7946 of housing 7940 is spaced above casing 7914 of interior rearview mirror assembly 7910 to permit an occupant of the vehicle to grasp housing 7914 to adjust the position of reflective element 7916 without hindrance from upper portion 7946 of housing 7940. In addition, movable portion 7960 of housing 7940 may optionally be provided with a sliding/swivel adjustment so that, in addition to moving the user interface accessory 7950 toward or away from the user, user interface accessory 7950 may be tilted or adjusted downwardly or upwardly as desired.

In the illustrated embodiment, housing 7940 provides the various user actuatable or user visible accessories and/or displays at its upper portion. In this manner, the user interface accessories, such as user actuatable buttons 7954 and display 7952 and lights 7956 are positioned above bezel 7948 and reflective element 7916, as previously noted, causing minimal distraction to the driver and, further, without hampering the driver's forward field of view. Alternately, accessory module 7912 may include a housing with an enlarged lower portion which extends and projects below bezel 7948 and reflective element 7916 or may include both upper and lower portions which provide and position accessories both above and below housing 7914, as will be more fully described in reference to FIGS. 12 and 13. Preferably, the lower portion of module 7912 is substantially located or nested behind the lower portion of the adjustable mirror housing (such as casing 7914 of mirror assembly 7910) of the interior mirror assembly so as to be essentially not visible/noticeable and thus unobtrusive to the driver during the driver's normal driving task, and such as not to significantly intrude into the driver's forward field of vision through the windshield.

It can be appreciated from the foregoing description, that accessory module 7912 provides a suitable after-market product which can be simply installed on an existing mirror mounting button, already provided by the vehicle manufacturer, with the interior rearview mirror assembly mounted directly onto the accessory module. Furthermore, accessory module 7912 may be removed for repair, replacement, or upgrade as needed or as desired. It should be noted that accessory module is separate and distinct from interior mirror assembly 7910, and for example, optionally can be manufactured and sold independent of the interior mirror assembly, and by a different manufacturer. Also, optionally, accessory module 7912 (as with other accessory modules of the present invention) can attach to the windshield (or header region) at an attachment element different than that of the interior mirror assembly.

Referring to FIG. 14, the numeral 8012 generally designates another embodiment of the accessory module that includes components of a tire pressure monitoring system and/or tire pressure display system. Accessory module 8012 includes a housing 8040, similar to the previous embodiment, and illustrates an alternate arrangement for viewable user interface accessories 8050. User interface accessories 8050 are positioned similar to user interface accessories 7950 above bezel 7948 and reflective element 7916 of interior rearview mirror assembly 7910. In the illustrated embodiment, user interface accessories 8050 include a display 8052 which is positioned closer to the left hand side of module 8012 to be positioned for closer viewing to the driver of the vehicle (in the case of a vehicle that drives on the right hand side of the road) and a plurality of buttons 8054 which are grouped together on the right hand side of accessory module 8012 (as viewed in FIG. 14). Similar to the previous embodiment, user interface accessories 8050 include a pair of lights 8056 which are positioned on opposed ends of upper portion housing 8040 to provide lighting to both sides of the vehicle interior.

It should be understood, that the selection and arrangement of user interface accessories 7950, 8050 may be modified to suit the needs of the vehicle manufacturer or the customer. In addition, because accessory modules 7912 and 8012 comprise separate unitary modules, modules 7912 and 8012 are particularly suitable in an after-market installation or for being produced at the OEM automaker. In addition, modules 7912, 8012 may be provided in a variety of models including economy, mid-range, and deluxe models, for example.

Referring to FIG. 15, another embodiment of the accessory module/mirror system 8100 is illustrated that includes components of a tire pressure monitoring system and/or tire pressure display system. Accessory module/mirror system 8100 includes an interior rearview mirror assembly 8110 and an accessory module 8112. Interior rearview mirror assembly 8110 may be similar to any one of the previous embodiments and, therefore, reference is made therein for further details. Similar to the previous embodiments, accessory module 8112 mounts to the vehicle and, preferably, to windshield 8118 on a mirror mounting button 8120, which is provided on the windshield typically by the vehicle manufacturer. Accessory module 8112 includes a housing 8140 with a lower portion 8142 including a channel or mirror mount (similar to mirror mount 7944) on one side of housing 8140, for releasably mounting module 8112 to button 8120, and a mirror mounting button 8136 on its opposed side for releasably mounting interior rearview mirror assembly 8110 to mirror mount 8112 using a break-away connection, which in turn is releasably mounted to windshield 8118 using a break-away connection on button 8120. As noted in reference to the previous embodiment, mirror mounting button 8136 may be formed on housing 8140 or may be secured thereto using conventional means, such as fasteners, an adhesive, or the like.

Upper portion 8146 of housing 8140 preferably comprises a telescoping portion which permits adjustment or repositioning of the viewable user interface accessories 8150, which are mounted in housing 8140. User interface accessories 8150 may include for example a display 8152, a plurality of user actuatable buttons 8154, and a microphone and/or speaker 8156. As described in reference to the previous embodiment, accessory module 8112 may incorporate a plurality of different systems including user interface systems, such as a GPS system, a roadside assistance system, a telematic system, a remote transaction system or the like. Display 8152, therefore, may display information relating to a tire pressure monitoring system and/or tire pressure display system as well as, optionally, information relating to other systems such as a GPS system, telematic system, remote transaction interaction system, and/or roadside assistance system, for example using text messaging or the like. Furthermore, buttons 8154 may be used to actuate or communicate with any of the various systems. For example, one button may be used to activate a roadside assistance system, such as an ONSTAR® system. In addition, buttons 8154 may be used to activate vehicle systems, such as a hood or trunk latch, to turn on an interior light, or the like.

Similar to the previous embodiments, accessory module 8112 is especially suitable as an after-market product which can be mounted to a conventional mirror mounting button which is provided by the vehicle manufacturer. Other accessories which may be included in accessory module 8112 include antennas, including antennas for a tire pressure monitoring system and/or tire pressure display system, garage door openers, keyless entry systems, radio receiver, microwave receivers, remote transaction transceivers, toll payment transceivers, cellular phone systems, telematic systems, or the like. In addition, accessory module 8112 may incorporate one or more image capturing devices, such as a CCD camera or a CMOS camera, for use, for example, as a video phone camera or a seat occupancy camera, or a vehicle interior surveillance camera, or the like, or may incorporate a compass direction sensor (such as described above) or a rain sensor/fog sensor/fogging sensor (such as described above). In addition, display 8152 may display images collected from the image capturing device and/or information from any of the accessories in accessory module 8112 (and/or from accessories located elsewhere in the vehicle such as at, on or within the interior mirror assembly and/or an exterior mirror assembly).

Referring again to FIG. 15, accessory module 8112 further optionally includes a vehicle power socket 8160 connected to the vehicle ignition system or a battery electrical system, such as a cigarette lighter type socket (conventional in many automobiles) into which accessories can be plugged. In the illustrated embodiment, socket 8160 is located on the rearward facing side 8140a (when module 8112 is mounted to mounting button 8120) and preferably behind interior rearview mirror casing 8114. In this manner, socket 8160 is located in a portion of module 8112 hidden by interior rearview mirror assembly 8114 and, yet, is accessible to an occupant of the vehicle. Alternately, module 8112 can be wired to the vehicle electrical system and/or be solar-powered via solar panels. In preferred form, user interface accessories which require visual interaction or recognition are preferably located in the visible portions of module 8112, such as upper portion 8146 of housing 8140, which is above interior rearview mirror casing 8114.

Figure 16:
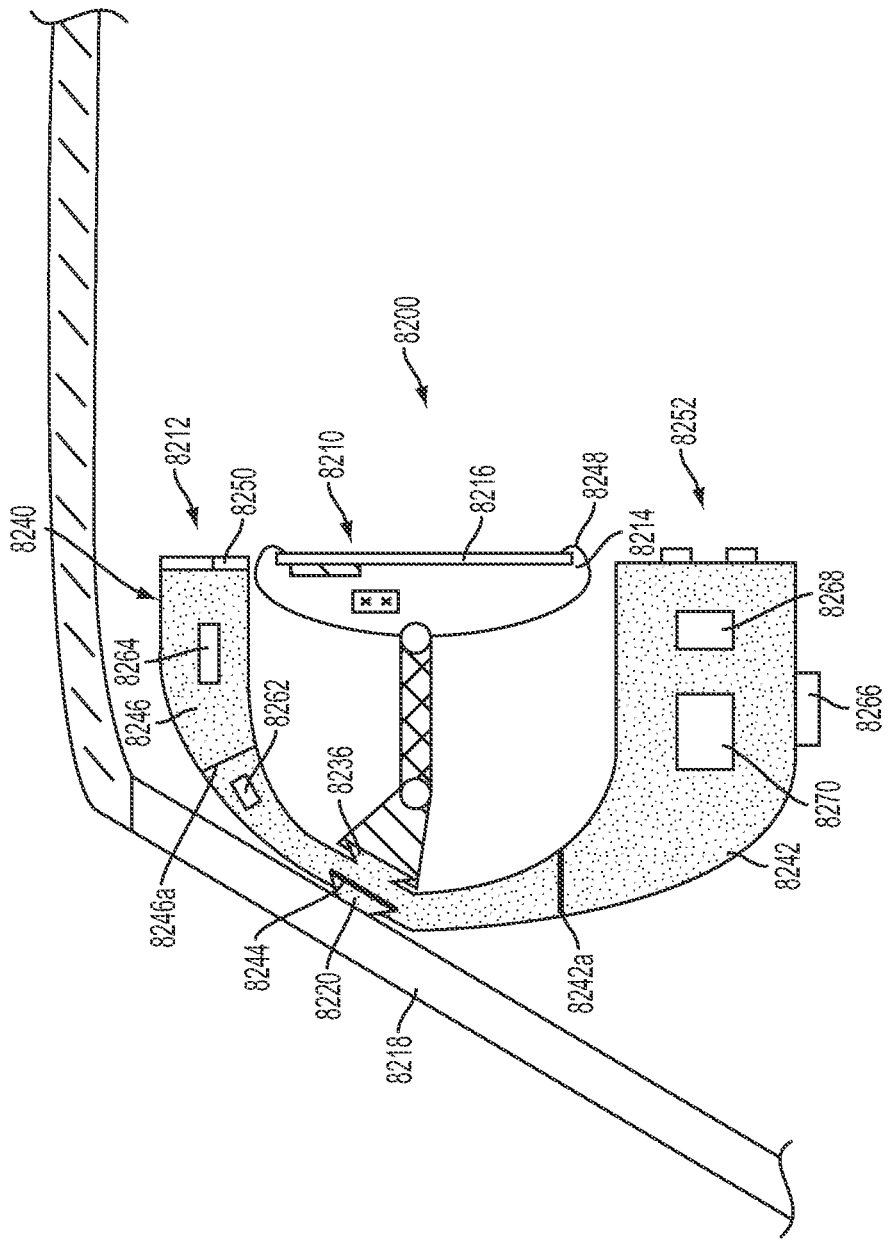
FIG. 16 is a side elevation view of another embodiment of an accessory module/mirror system incorporating a tire pressure monitoring and/or display system of the present invention.

Referring to FIG. 16, another embodiment 8200 of an accessory module/mirror system that includes components of a tire pressure monitoring system and/or tire pressure display system is illustrated. Accessory module/mirror system 8200 includes an interior rearview mirror assembly 8210 and an accessory module 8212. For further details of interior rearview mirror assembly 8210, reference is made to the previous embodiments. Accessory module 8212 is adapted to releasably mount to an interior of a vehicle, such as to a windshield 8218, on a mirror mounting button 8220. In addition, accessory module 8212 includes a mirror mounting button 8236 on which interior rearview mirror assembly 8210 may be releasably mounted to accessory module 8212 and in turn windshield 8218. Similar to the previous embodiments, preferably mirror mounting buttons 8220 and 8236 are aligned along a common axis to provide a serial mounting of interior rearview mirror assembly 8210 and accessory module 8212 (although other mounting configurations are possible including a parallel mounting on a common attachment adapter element, or separate mounting, as described above). Alternately, other attachment elements can be used, such as described above.

In the illustrated embodiment, accessory module 8212 includes a housing 8240 with a generally C-shaped cross-section to form an upper portion 8246, for positioning above casing 8214 of interior rearview mirror assembly 8210, and a lower portion 8242 for positioning below housing 8214 of interior rearview mirror assembly 8210. In addition, housing 8240 includes a central portion 8243, which includes a mounting member 8244 for releasably engaging mirror mounting button 8220 and, further, includes mirror mounting button 8236. As previously described above, mirror mounting button 8236 is preferably aligned with mirror mount 8244 and, thus, is provided on central portion 8243 of housing 8240 on an opposed side or rearward facing side of accessory module 8212.

In the illustrated embodiment, upper portion 8246 is adapted to be adjustable, by an adjustable element such as by a pivot, tilt, swivel, or nesting connection 8242*a* or a combination thereof, so that the viewable user interface accessories 8250 are visually and/or physically accessible to an occupant of the vehicle and, further, are adjustable to meet the occupant's needs. For examples of optional user interface accessories, reference is made to the previous embodiments.

Lower portion 8242 is optionally similarly adapted to be adjustable, such as by a pivot, tilt, swivel, or nesting connection 8242*a*, so that the various user interface accessories 8252 supported thereon or therein may be repositioned along with lower portion 8242 of housing 8240. In the illustrated embodiment, lower portion 8242 protrudes rearwardly from central portion 8243 such that accessories 8252 are positionable below housing 8214 of interior rearview mirror assembly 8210 or slightly rearward of bezel 8248 and reflective element 8216 as desired.

Module 8212, similar to the previous embodiment, may include a plurality of systems and accessories as previously described, such as an antenna 8262, an image capturing device 8264, a microphone 8266, and/or a speaker 8268. Accessory module 8212 may include other or further accessories, including, for example a message recorder or digital note taker 8270, whereby voice recordings, such as telephone numbers, notes, dictation, preferably short dictations, can be recorded for easy replay by an occupant of the vehicle. In addition, digital message recorder or digital note taker 8270 may be used in conjunction with microphones (such as 8266) or speakers (such as 8268) located in module 8212 or elsewhere in the vehicle. In addition, recorder and/or note taker 8270 may be used as an answering machine for use with a digital phone, which is either incorporated into module 8212, interior rearview mirror assembly 8210, or elsewhere in the vehicle. Thus, digital message recorder and/or note taker 8270 can play back the message or notes as the occupant of the vehicle so chooses or as controlled by a setting in the digital message recorder or not taker. In addition, digital message recorder or digital note taker 8270 may be adapted to communicate with a dockable cellular phone, such as described in U.S. patent application Ser. No. 09/449,121, filed Nov. 24, 1999, now U.S. Pat. No. 6,428,172, and U.S. patent application Ser. No. 09/585,379, filed Jun. 1, 2000, which are herein incorporated in their entireties by reference herein. Alternately, digital message recorder or digital note taker 8270 (or any other accessory in module 8212) may communicate with (and/or serve as a message recorder for) a phone remote from module 8212 or interior rearview mirror assembly 8210, such as a phone in a pocket of a vehicle occupant, a bag, or a compartment, so that messages may be downloaded from the remote cellular phone to the digital message recorder or digital note taker using, for example, a short range communication protocol, such as BLUETOOTH, as previously described. In this manner, the occupant of the vehicle may choose to screen incoming calls on their phone.

Figure 16A:
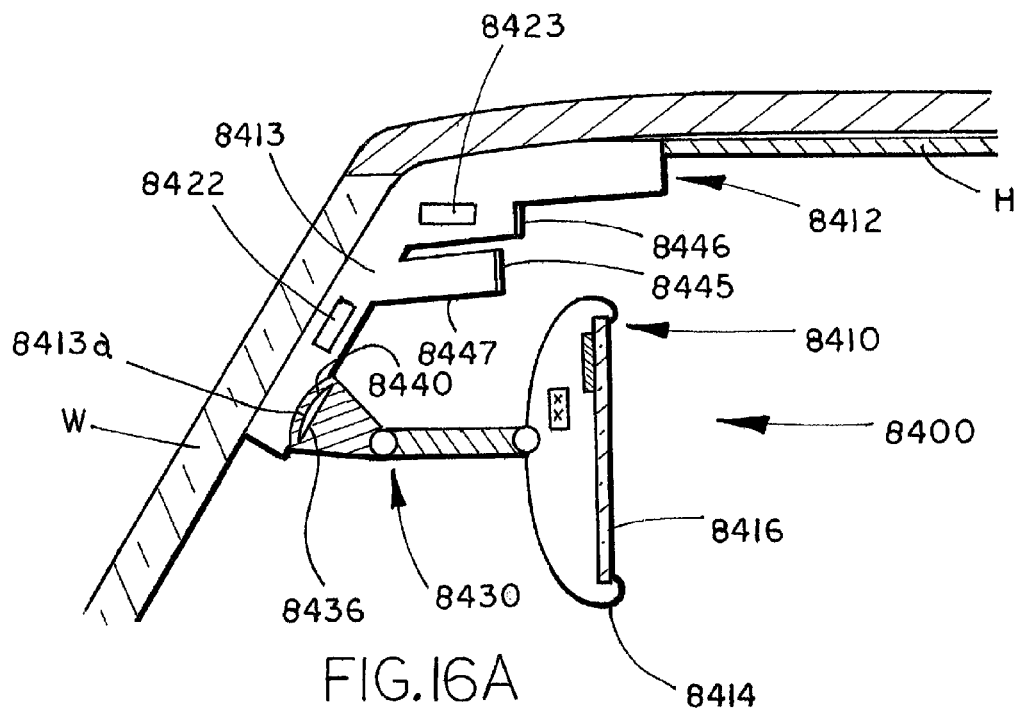
FIG. 16A is a side elevation view of another embodiment of an accessory module/mirror system incorporating a tire pressure monitoring and/or display system of the present invention.

Also, as an alternate to having an accessory module (such as described above and herein) that attaches to or adjacent to a windshield-mounted (or header-mounted) interior mirror assembly, an accessory module can be incorporated as a portion of a header console or header/headliner portion of the vehicle such that the accessory module (that can house the accessories including displays, antennae and controllers such as disclosed herein) can be an extension of the header that extends down from the header to the region, for example, where an interior mirror assembly typically attaches to a windshield. Thus, and as illustrated in FIG. 16A, an accessory module/mirror system 8400 of the present invention includes an interior rearview mirror assembly 8410 and a header console 8412, which mounts to the headliner H of a roof portion of a vehicle. As will be more fully described below header console 8412 includes an extension 8413 which extends down from headliner H along the inner surface of windshield W of the vehicle and extends behind mirror assembly 8410 to provide ample space and mounting surfaces for one or more vehicle accessories, such as described above. Header console 8412 is particularly suitable for mounting vehicle systems, such as the tire pressure monitoring system described above, user actuatable devices, such as user actuatable buttons, displays, such as video displays, so that the user actuatable devices and displays are at a location accessible or viewable by one or more occupants of the vehicle.

As shown in FIG. 16A, a lower portion 8413*a* of extension 8413 of header console 8412, which extends downwardly behind the upper portion of windshield W (such portion of windshield W which typically includes a shadeband element as known in the art), includes a mirror mounting button 8436 on which mirror assembly 8410 detachably attaches to header console 8412. Optionally, the downwardly extending portion of header/header console 8412 may be mounted to the inner surface of windshield W, such as by an adhesive or may be releasably, mechanically attached such as by being received by and/or supported by one or more attaching members adhered to the inner surface of the windshield, such as by attachment members, including rails, channels, or the like. Or, the downwardly extending portion of header/header console 8412 may be spaced or set-off from the inner surface. Or, the downwardly extending portion of header/header console 8412 may contact or rest on inner surface of the windshield.

Desirably, wiring and/or cables which supply power and/or signals to components in interior rearview mirror assembly 8410, including components in casing 8414, such as reflective element 8416, may be carried by header console 8412 and may pass through extension 8413 so that the wires and/or cables are protected from damage and further are hidden from view for aesthetic reasons.

In the illustrated embodiment, interior rearview mirror 8410 includes a casing 8414, a reflective element 8416 which is supported in casing 8414, and a support 8430. Reflective element 8416 preferably comprises a variable reflectance reflective element, such as a prismatic or an electrochromic (EC) reflective element. Support 8430 comprises a dual-ball mount type support of the type described in reference to the previous embodiments, which provides for multi-axis repositioning of casing 8414 and, therefore, reflective element 8416 or may comprise a single-ball support, as such are known in the rearview mirror art. Support 8430 includes a channel shaped mirror mount 8440 for releasably engaging mounting button 8436 to form a break-away connection between mirror assembly 8410 and header console 8412.

As noted above, header console 8412 may support a plurality of vehicle accessories, including for example an antenna 8422, including a global positioning system (GPS) antenna; a rain sensor, including a contacting and a non-contacting rain sensor; one or more cameras; lights; components of or an entire electronic toll collection (ETC) assembly; loud speakers and/or microphones, including for example a microphone array, such as for a sound system (such as disclosed in co-assigned U.S. patent application Ser. No. 09/466,010, filed Dec. 17, 1999, now U.S. Pat. No. 6,420,975; Ser. No. 09/396,179, filed Sep. 14, 1999, now U.S. Pat. No. 6,278,377; Ser. No. 09/382,720, filed Aug. 25, 1999, now U.S. Pat. No. 6,243,003; Ser. No. 09/449,121, filed Nov. 24, 1999, now U.S. Pat. No. 6,428,172; Ser. No. 09/433,467, filed Nov. 4, 1999, now U.S. Pat. No. 6,326,613; and Ser. No. 09/448,700, filed Nov. 24, 1999, now U.S. Pat. No. 6,329,925, the entire disclosures of all of which are hereby incorporated by reference herein); components of or an entire cellular phone system; components of or an entire telematic system, including a transceiver, an antenna, one or more user actuatable devices, such as user actuatable buttons; pull down or flip displays, including video displays, such as described and reference previously; universal garage door opener systems, such as HOMELINK; digital sound processing systems; a trip computer, seat occupancy detector; air bag actuation status display; sensors for compass headings or temperature; a vehicle tire pressure monitoring controller 8423 (that preferably includes an RF receiving antenna, a microprocessor and all the circuitry, user input controls/buttons and other controls needed to receive and process wireless signals broadcast from the various tire pressure sensors located in the tire on the wheels of the vehicle), a display element 8445 for display information relating to, for example the tire pressure monitoring system, other vehicle status, including coolant temperature, fuel levels, or the like, and/or external environmental status or information, such as outside temperature, compass headings or the like. In addition, accessory module/mirror system 8400 may include a second display element 8446 for displaying other information, such as email messages, or for displaying images such as images relating to interior surveillance systems, rearvision aid systems, or teleconferencing images or the like.

As best seen in FIG. 16A, displays 8445 and 8446 are positioned above and forwardly of mirror casing 8414 whereby the displays do not interfere with or distract the driver and yet are accessible for easy viewing and are accessible for touching in the case of touch activated display screens. Optionally, at least one of the displays screens is positioned high enough within the vehicle cabin so that the images, such as tire pressure indicators, may be viewable from outside the vehicle, including at the rear of the vehicle so that a person inflating a rear tire could view the indications provided by the tire pressure indicators. In addition, display element 8445 may be provided in a separate housing or module 8447 which can be removed for replacement, repair or upgrade.

In this manner, accessory module/mirror system 8400 can be removed as an assembly for repair, replacement, or upgrade with features removed or added to either the mirror assembly 8410 or header console 8412 to thereby customize the accessory module/mirror system 8400 to suit the particular needs of the vehicle customer. Furthermore, by extending the header console downwardly and forward of the mirror assembly, significantly increased storage spaced is realized at the mirror mounting location but outside of casing 8414.

Figure 16B:
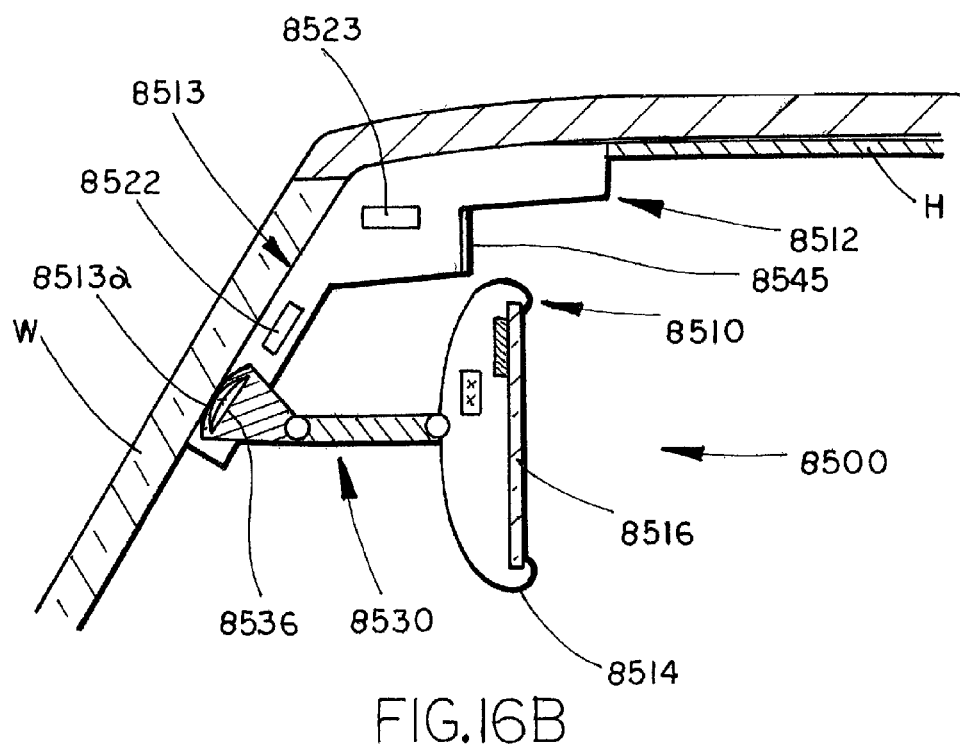
FIG. 16B is a side elevation view of another embodiment of an accessory module/mirror system incorporating a tire pressure monitoring and/or display system of the present invention.

Referring to FIG. 16B, another embodiment 8500 of an accessory module/mirror system of the present invention is illustrated. Accessory module/mirror system 8500 includes an interior rearview mirror assembly 8510 and a header console 8512, which mounts to the headliner H of a roof portion of a vehicle, similar to the previous embodiment.

As will be more fully described below header console 8512 includes an extension 8513 which extends down from headliner H along the inner surface of windshield W of the vehicle and extends behind mirror assembly 8510 to provide ample space and mounting surfaces for one or more vehicle accessories, such as described in reference to the previous embodiments and the referenced applications. Header console 8512 is particularly suitable for mounting vehicle systems, such as the tire pressure monitoring system described above, user actuatable devices, such as user actuatable buttons, displays, such as video displays, so that the user actuatable devices and displays are at a location accessible or viewable by one or more occupants of the vehicle similar to the previous embodiment.

As best understood from FIG. 16B, extension 8513 of header console 8512 extends downwardly behind the upper portion of windshield W (such portion of windshield W which typically includes a shadeband element as known in the art) and includes a forked portion 8513a, such as an inverted V-shaped or U-shaped portion, which straddles a mirror mounting button 8536 that is mounted to windshield W. Optionally, the downwardly extending portion of header/header console 8512 may be mounted to the inner surface of windshield W, such as by an adhesive or may be releasably, mechanically attached such as by being received by and/or supported by one or more attaching members adhered to the inner surface of the windshield, such as by attachment members, including rails, channels, or the like. Or, the downwardly extending portion of header/header console 8512 may be spaced or set-off from the inner surface. Or, the downwardly extending portion of header/header console 8512 may contact or rest on inner surface of the windshield. Similarly, wiring and/or cables which supply power and/or signals to components in interior rearview mirror assembly 8510 may pass through extension 8513 so that the wires and/or cables are protected from damage and further are hidden from view for aesthetic reasons.

Mirror mounting button 8536 provides a mount for mirror assembly 8510, which detachably attaches to mounting button 8536 by a channel shaped mirror mount 8540. In the illustrated embodiment, interior rearview mirror 8510 includes a casing 8514, a reflective element 8516 which is supported in casing 8514, and a support 8530. Reflective element 8516 preferably comprises a variable reflectance reflective element, such as a prismatic or an electrochromic (EC) reflective element. Support 8530 comprises a dual-ball mount type support of the type described in reference to the previous embodiments, which provides for multi-axis repositioning of casing 8514 and, therefore, reflective element 8516 or may comprise a single-ball support, as such are known in the rearview mirror art. Support 8530 includes mirror mount 8540 for releasably engaging mounting button 8536 to thereby form a break-away connection between mirror assembly 8510 and windshield W.

As noted above, header console 8512 may support a plurality of vehicle accessories, including for example an antenna 8522, including a global positioning system (GPS) antenna; a rain sensor, including a contacting and a non-contacting rain sensor; one or more cameras; lights; components of or an entire electronic toll collection (ETC) assembly; loud speakers and/or microphones, including for example a microphone array, such as for a sound system (such as disclosed in co-assigned U.S. patent applications: Ser. No. 09/466,010, filed Dec. 17, 1999, now U.S. Pat. No. 6,326,613; Ser. No. 09/396,179, filed Sep. 14, 1999, now U.S. Pat. No. 6,278,377; Ser. No. 09/382,720, filed Aug. 25, 1999, now U.S. Pat. No. 6,243,003; Ser. No. 09/449,121, filed Nov. 24, 1999, now U.S. Pat. No. 6,428,172; Ser. No. 09/433,467, filed Nov. 4, 1999, now U.S. Pat. No. 6,326,613; and Ser. No. 09/448,700, filed Nov. 24, 1999, now U.S. Pat. No. 6,329,925, the entire disclosures of all of which are hereby incorporated by reference herein); components of or an entire cellular phone system; components of or an entire telematic system, including a transceiver, an antenna, one or more user actuatable devices, such as user actuatable buttons; pull down or flip displays, including video displays, such as described and reference previously; universal garage door opener systems, such as HOMELINK; digital sound processing systems; a trip computer, seat occupancy detector; air bag actuation status display; sensors for compass headings or temperature; a vehicle tire pressure monitoring controller 8523 (that preferably includes an RF receiving antenna, a microprocessor and all the circuitry, user input controls/buttons and other controls needed to receive and process wireless signals broadcast from the various tire pressure sensors located in the tire on the wheels of the vehicle), a display element 8545 for display information relating to, for example the tire pressure monitoring system, other vehicle status, including coolant temperature, fuel levels, or the like, and external environmental status or information, such as outside temperature, compass headings or for displaying other information, such as email messages, or for displaying images such as images relating to interior surveillance systems, rearvision aid systems, or teleconferencing images or the like.

As best seen in FIG. 16B, display 8545 is positioned above and forwardly of mirror casing 8514 whereby display 8545 does not interfere with or distract the driver and yet is accessible for easy viewing and, further, is optionally accessible for touching in the case of a touch activated display screen. In addition, display element 8545 optionally is positioned high enough within the vehicle cabin so that the images, such as tire pressure indicators, may be viewable from outside the vehicle, including at the rear of the vehicle so that a person inflating a rear tire could view the indications provided by the tire pressure indicators.

As noted in reference to the previous embodiment, by extending the header console downwardly and forward of the mirror assembly, significantly increased storage spaced is realized at the mirror mounting location but outside of casing 8514. In a similar manner, the mirror assembly 8510 and/or header console 8512 may be removed for upgrade or replacement of components within either the mirror assembly or the console to thereby customize the accessory module/mirror system 8500 to suit the particular needs of the vehicle customer.

It can be appreciated that the mirror assemblies of the previous embodiments either connect to or through the header console. Optionally, one or more electrical/electronic devices or functions housed or provided in the interior rearview mirror assemblies may communicate with, such as by wireless communication, including RF communication, or electrically couple, such as by wires and/or cables, to control circuitry either wholly or partially housed in the header console. For example, the interior rearview mirror assemblies may include a sensor, such as a photo sensor, which communicates with or electrically couples to sensor circuitry located at least partially in the respective header console. For an example of a suitable communication system that may be incorporated in the present invention reference is made to U.S. Pat. No. 6,099,131, which is commonly assigned to Donnelly Corporation of Holland, Mich., which is incorporated by reference in its entirety herein.

Figure 17:
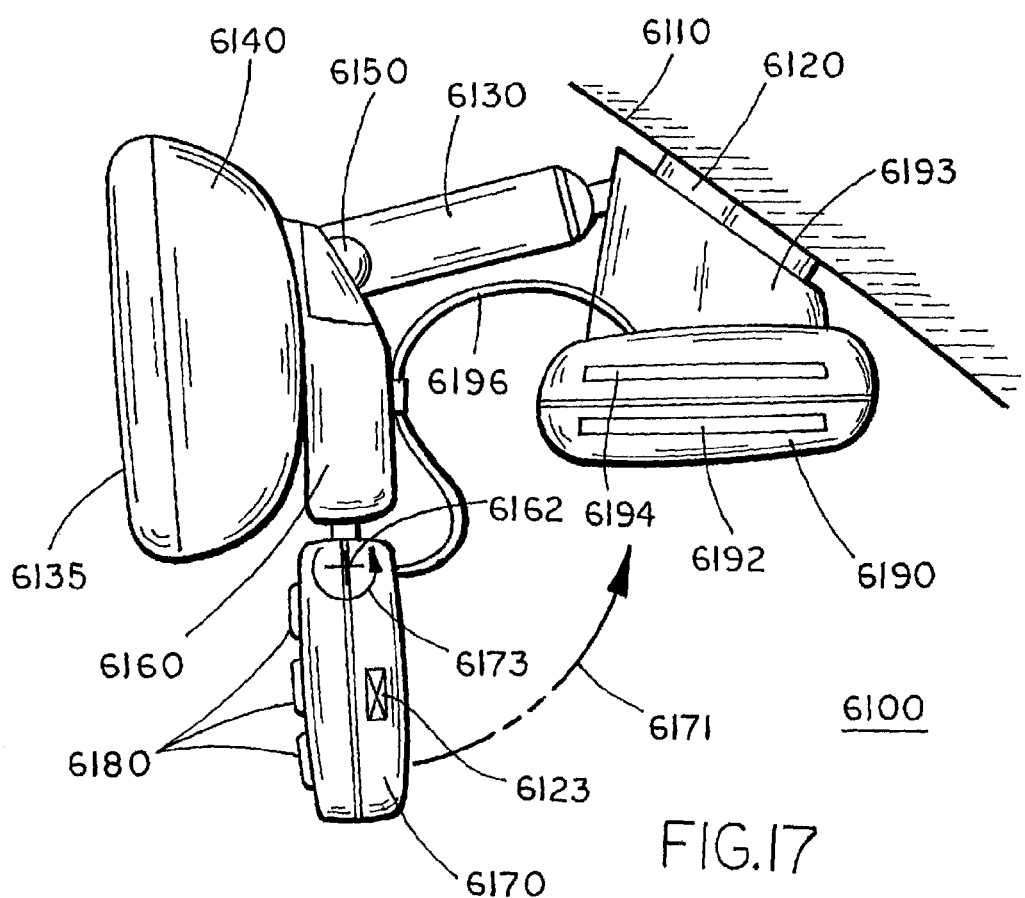
FIG. 17 is a side elevation view of another embodiment of a video mirror system incorporating a tire pressure monitoring and/or display system of the present invention.

FIG. 17 shows a video mirror system 6100 comprising an interior mirror assembly 6135 that is attached by mirror mount 6120 to vehicle windshield 6110. Video mirror system 6100 includes a controller 6123 (preferably including an antenna, a microprocessor, user input controls, electronic memory and allied circuitry) that is a component of a tire pressure monitoring system and/or a tire pressure display system. Pod 6190 removably attaches to mirror mount 6120 via pod attachment element 6193. Pod 6190 includes a video controller board 6194 and a video display driver board 6192. Pod 6190 connect to video display housing 6170 via cable 6196 which carries video and electronic signals to the video screen housed in video display housing 6170. Video display attachment element 6160 removably attaches to ball joint 6150 of mirror support arm 6130. Video display housing is movable about joint 6162 to move in the direction indicated by arrow 6171 to stow under mirror assembly 6135 when view of the screen in video display housing 6170 is not desired. Video display housing is also movable about joint 6162 to move in the direction indicated by arrow 6173 to allow rotation of video display housing 6170 in order to adjust the viewing angle of the video screen in housing 6170. Buttons 6180 allow user-access to the control functions and features of the video mirror system 6100. By placing the electronic boards in pod 6190, weight in housing 6170 is beneficially decreased, leading to reduced effect on mirror reflective element image vibration.

Figure 18:
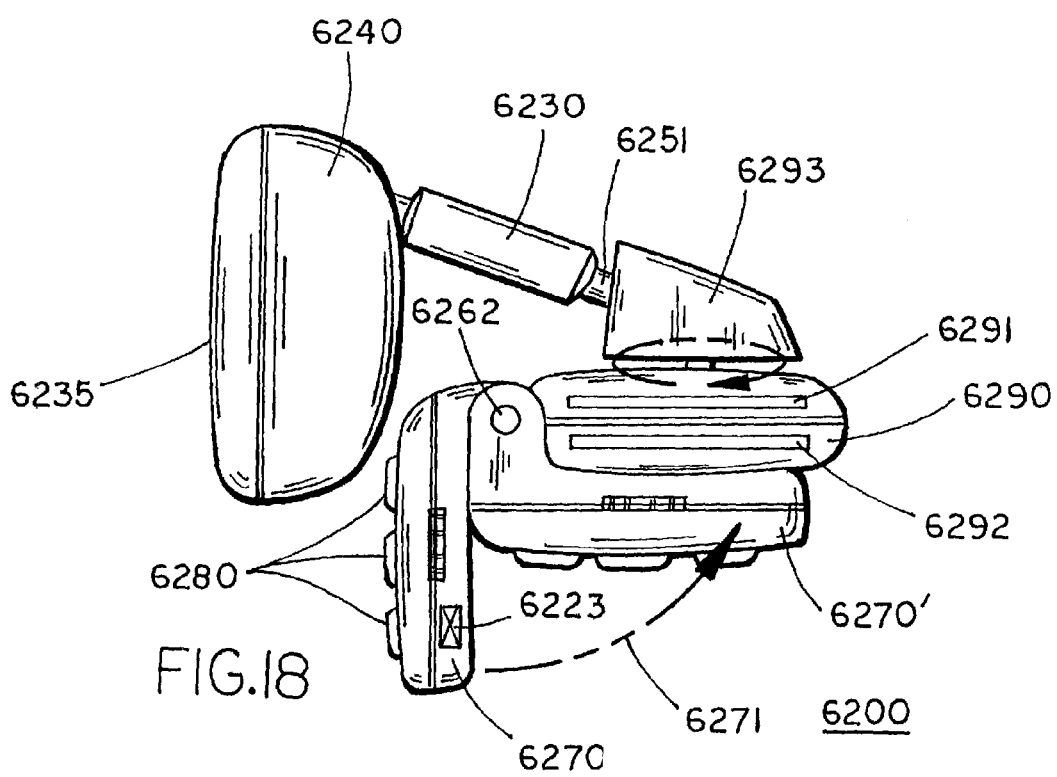
FIG. 18 is a side elevation view of another embodiment of a video mirror system incorporating a tire pressure monitoring and/or display system of the present invention.

FIG. 18 shows a video mirror system 6200 (that includes a controller 6223 (preferably including an antenna, a microprocessor, user input controls, electronic memory and allied circuitry) that is a component of a tire pressure monitoring system and/or a tire pressure display system) including a video display housing 6270 that is attached via pivot joint 6262 to video pod 6290 that in turn attaches (removably) via video attachment element 6293 to the lower ball-joint of mirror support arm 6230 of interior mirror assembly 6235. As shown by arrow 6271, video display housing 6270 can move about pivot joint 6262 to stow below video pod 6290 (as in 6270'). Video pod 6290 contains various electronic boards 6291, 6292, that can include a variety of electronic features and accessories, as described above. Buttons 6280 allow user-access to the control functions and features of the video mirror system 6200.

FIG. 19 shows a video mirror system 6300 and a video display assembly 6370 (that includes a controller (preferably including an antenna, a microprocessor, user input controls, electronic memory and allied circuitry) that is a component of a tire pressure monitoring system and/or a tire pressure display system) that includes a video screen 6372 in video display housing 6374 and user-access controls 6380. Video display housing 6374 rotates and articulates about video housing support arm 6390. When not desired for viewing, video display housing 6374 can move to stow to the rear and below bezel 6338 of interior rearview mirror assembly 6335.

Figure 20A:
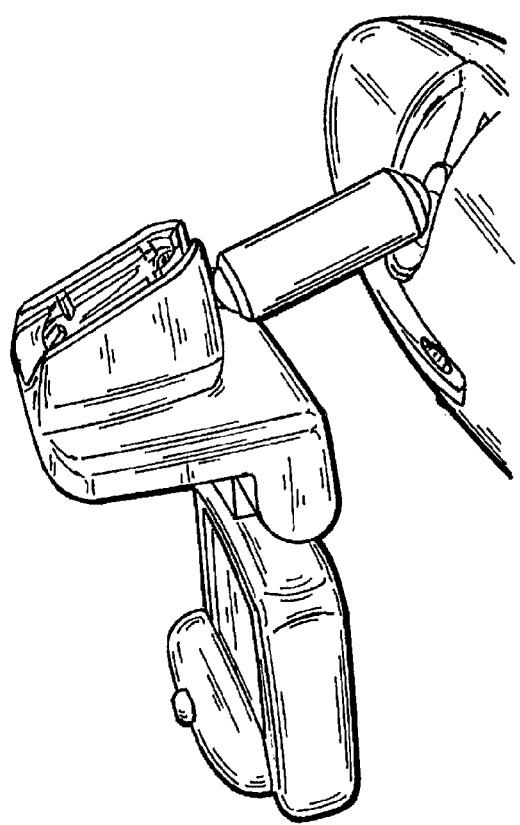
FIG. 20A is a rear perspective view of a video mirror system incorporating a tire pressure monitoring and/or display system of the present invention.
Figure 20B:
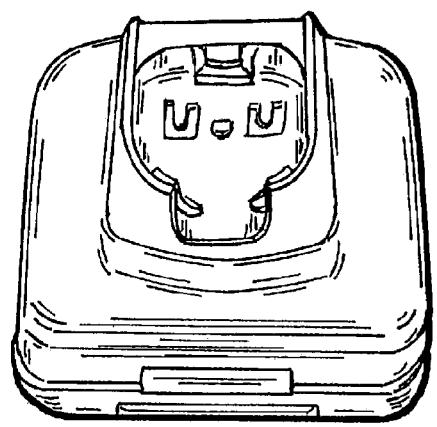
FIG. 20B is a rear perspective view of a video display attachment mount for the video mirror system of FIG. 20A.
Figure 21A:
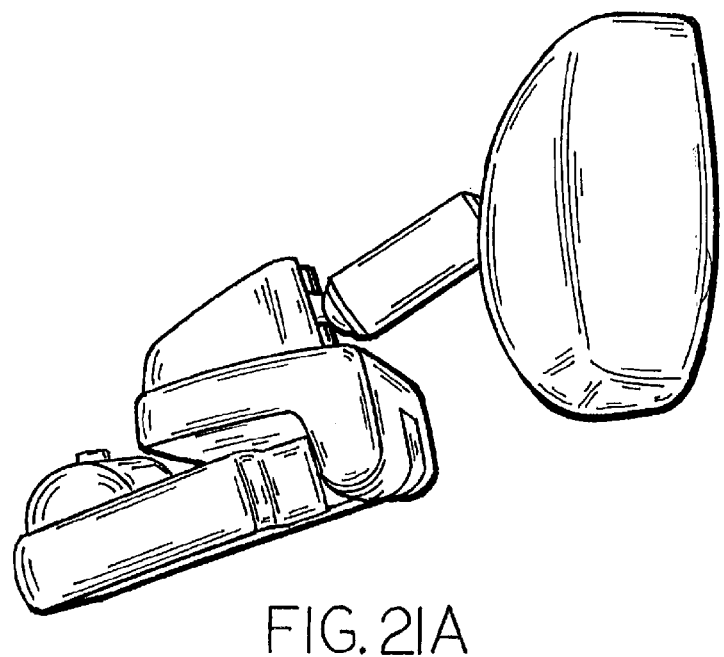
FIG. 21A is a side elevation view of a video mirror system of FIG. 20A with the video display assembly moved to a stowed position.
Figure 21B:
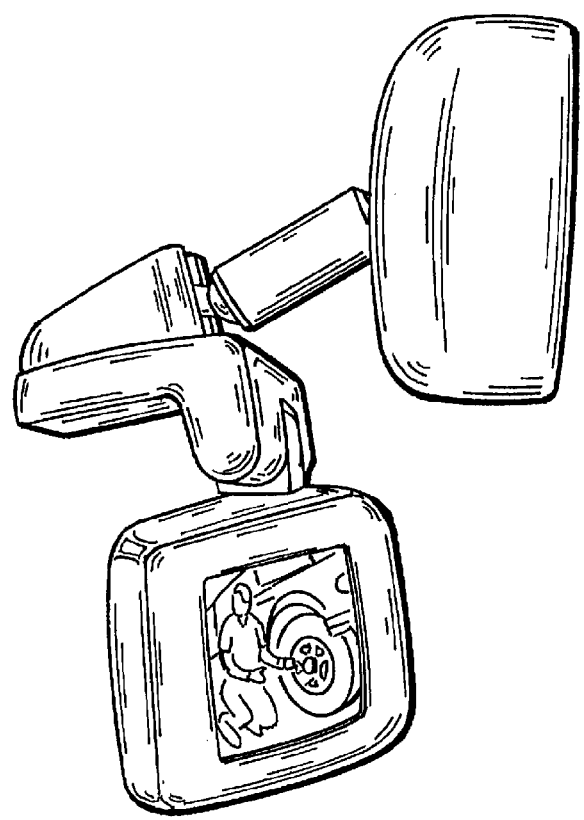
FIG. 21B is a similar view to FIG. 21A illustrating the video display housing moved to a viewing position.
Figure 22A:
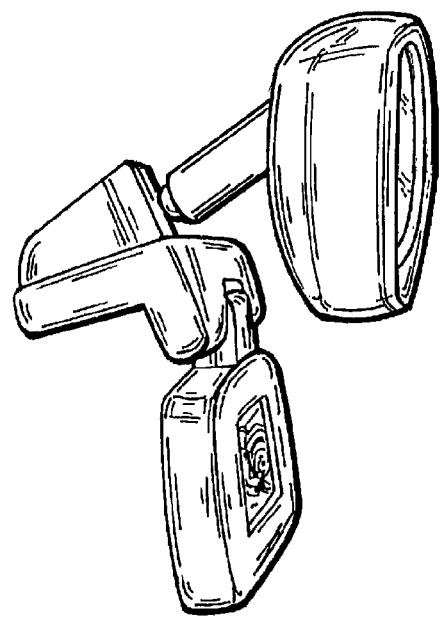
FIG. 22A is a similar view to FIG. 21A illustrating the video display assembly moved to a second viewing position.
Figure 22B:
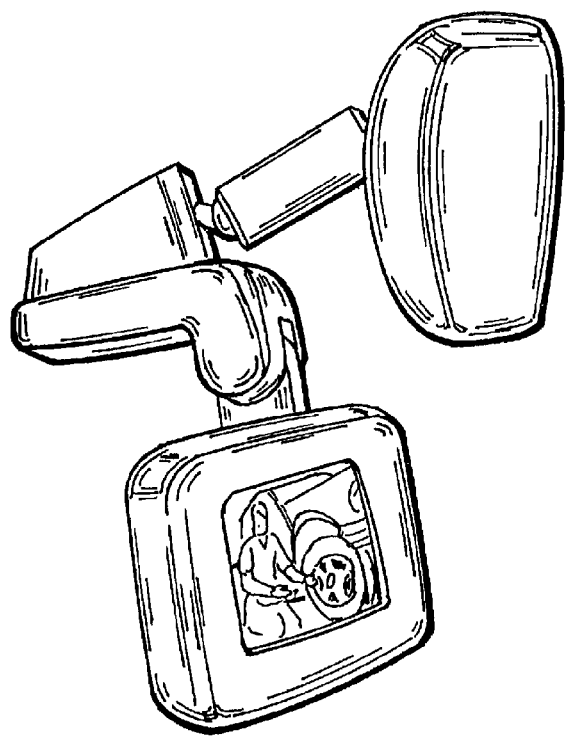
FIG. 22B is a similar view to FIG. 22A illustrating the video display housing rotated to another viewing position.

FIGS. 20A, 20B, 21A, 21B, 22A, and 22B show various views of a video mirror system that includes a controller (preferably including an antenna, a microprocessor, user input controls, electronic memory and allied circuitry) that is a component of a tire pressure monitoring system and/or a tire pressure display system. As best seen in FIG. 20B, a detachable video display attachment mount is provided that snaps onto the lower ball-joint/mirror mount of the interior mirror assembly (as best seen in FIG. 20A). An example of a suitable video attachment mount can be found in U.S. Pat. No. 5,576,687, the entire disclosure of which is hereby incorporated by reference herein. A preferred attachment mount to attach the video display assembly to the interior mirror assembly includes a coupler for engaging the mirror mount that supports the interior mirror assembly on a windshield mirror button. The coupler of the mount of the video display assembly includes a tab at one end for catching the interior mirror mount and a clip at another end to engage a portion of the interior mirror assembly. The coupler of the video display assembly also preferably includes a shafted fastener received in the interior mirror mount and/or a sliding fastener engaging a cooperating element of the mirror mount and/or a shafted fastener received in the mirror mount. Preferably, the coupler of the video display assembly includes an attachment member for snapping onto the interior mirror assembly (preferably at the interior mirror mount). As can best be seen in FIGS. 21A and 21B, the video display housing can rotate about a T-joint to stow generally horizontally behind the interior mirror housing when video screen viewing is not desired (FIG. 21A), but can flip down to a generally vertical plane when desired to be viewed (see FIG. 21B). Also, as seen in FIGS. 22A and 22B, the video display housing can rotate about its attachment joint to allow the viewing angle of the video screen to be positioned to suit the user's needs.

Use of a flip-down display assembly (and preferably a flip down or stowable video display assembly) to house a component of a tire pressure monitoring system and/or a tire pressure display system (such as its controller including antenna, microprocessor, user-input controls, electronic memory and allied circuitry) or to display an information output of a tire pressure monitoring system and/or a tire pressure display system has several advantages. For example, use of a video display facilitates a detailed and consumer-friendly display of all four tire pressures simultaneously on a video representation of the vehicle. Also, the video display of, for example, a flip-down video display assembly (that attaches to, for example, the mount of an interior mirror assembly; an example of a suitable video display assembly attachment mount can be found in U.S. Pat. No. 5,576,687, the entire disclosure of which is hereby incorporated by reference herein; and a preferred attachment mount to attach the video display assembly to the interior mirror assembly includes a coupler for engaging the mirror mount that supports the interior mirror assembly on a windshield mirror button or an assembly that attaches local to or at the attachment point in the vehicle where the interior mirror attaches (such as is described in U.S. Pat. No. 4,930,742, the entire disclosure of which is hereby incorporated by reference herein) can, for example, display the output of an interior-cabin monitoring camera, such as a baby-view camera, or of an external viewing camera, such as a forward viewing camera or rearward viewing camera such as a forward park-aid camera or a reverse-aid camera (such camera/display systems as disclosed in U.S. provisional application Ser. No. 60/243,986, filed Oct. 27, 2000, in U.S. provisional application Ser. No. 60/238,483, filed Oct. 6, 2000, and in U.S. patent application Ser. No. 09/466,010, filed Dec. 17, 1999, now U.S. Pat. No. 6,420,975, the entire disclosures of which are hereby incorporated by reference herein), and with the tire pressure information generated by the tire pressure display/monitoring system controller (and preferably with the tire pressure display/monitoring system controller included in the flip-down display assembly, including the antenna that receives wireless broadcasts, typically RF signals, from the tire sensors in the individual wheels on the vehicle, as well as any microprocessor, user-input controls/buttons, electronic memory and allied circuitry associated with the controller) displayed as an alternate to other images displayed on the display screen and/or superimposed upon any display being displayed (or as a "picture in a picture") by the display screen. For example, a flip-down video screen may be displaying a view of a baby in a rear-seat child seat and/or be displaying a GPS data display that guides the driver with regard to direction/local geography. When requested by the driver (such as by voice command or by actuation of a user-input control such as a button or touch screen) or when the tire pressure display/monitoring system detects that tire pressure in a particular tire is below or above a recommended level for that tire on that vehicle, then a display of tire pressure (for example, a display that indicates that the rear passenger-side tire pressure is at 26 psi and that the correct tire pressure should be 35 psi, thus alerting the driver to make a tire pressure adjustment at a convenient service station) is displayed at the flip-down video display assembly, either separate from or superimposed upon whatever that display screen was currently displaying. Note that the flip-down video display assembly (or any other display assembly/accessory assembly/interior rear view mirror assembly/exterior side view mirror assembly used in conjunction with a tire pressure display/monitoring system, such as described herein), can include a range of accessories, including an antenna (such as an RF antenna or a microwave antenna) and/or receiver circuitry (and any allied circuitry) associated with receipt of wireless communication from, for example, a GPS satellite or a telematics service provider or a satellite provider of information or entertainment to the vehicle (such as from a satellite news, information and entertainment provider such as Sirius Inc., that provides, for example, digital broadcast signals via satellite of radio stations, or from a provider that broadcasts digital television signals that are received, and processed in the vehicle, and preferably with at least some components, such as the antenna and receiver circuitry located at, on, in or adjacent to the interior rearview mirror assembly and/or at, on or adjacent to any associated video display assembly).

A further embodiment of a video mirror system 6700 that included in a tire pressure monitoring system and/or a tire pressure display system is shown in FIG. 23. Video mirror system 6700 includes an interior rearview mirror assembly 6710 and a video display assembly 6712, which incorporates movable support 6732 that includes support arm 6738 and pivot joints 6732*a*, 6732*b*. Similar to the previous embodiments, interior rearview mirror assembly 6710 includes a mirror housing 6714 and a reflective element 6716 (preferably, an electrochromic reflective element) and, further, a mirror housing support 6729. Mirror housing support 6729 includes a mirror mount 6726 and a support arm 6724. Though illustrated with a dual ball mount arrangement, support 6729 may include a fixed support arm or may include a single ball mount arrangement to permit either pivoting of support arm 6724 about mirror mount 6726 or pivoting between support arm 6724 and housing 6714, as will be understood by those skilled in the art.

Video display support 6732 comprises an elongate support arm 6738 with an upper fixed portion 6751 which is adapted to detachably mount to windshield mirror mounting button 6720. Upper fixed portion 6751 includes a mirror mounting button 6736, on which mirror mount 6726 of mirror assembly 6710 is detachably mounted to provide a detachable, and preferably break-away connection, for interior rearview mirror assembly 6710. The lower portion of support arm 6738 includes a pivot joint 6732*b* to video screen housing 6730 of video display assembly 6712. Pivot joints 6732*a*, 6732*b* allow a viewer of video screen 6731 to adjust its viewing angle to suit the need/preference of the driver or front-seat passenger of the vehicle. Similar to the previous embodiments, video display assembly 6712 includes a video screen 6731 (that, preferably, is coated on its outer surface with an antiglare means, such as described above, and most preferably an interference-stack anti-glare multi-coating stack of thin films, typically metal oxides, forming an anti-glare multilayer stack), which is housed in a housing 6730, and a carrier 6742, such as a printed circuit which supports electronics for various functions preferably within assembly 6712, including video screen 6731. Further, video display assembly 6712 preferably includes at least one control button 6744 which may be used, for example, to actuate screen 6731 (or change a contrast/color tint, display intensity, or the like) and/or other functions provided by the circuit board on carrier 6742.

Upper fixed portion 6751 of video display assembly 6712 includes a housing portion that includes a variety of vehicle accessories and controls including tire pressure display controller 6773. For example, a GPS navigational system 6754, including a GPS antenna, is included in housing 6751. Also included is another accessory 6756 that may, for example, comprise a trainable garage door opener such as the HomeLink® GDO system available from JCI of Holland, Mich. and/or may comprise a cellular phone system including a complete telecommunication system/antenna/transceiver and/or a telematic system including antenna and transceiver and/or an automatic toll booth/remote transaction transceiver system and/or a compass direction system including a compass sensor, such as is described above and/or any of the vehicle accessories and functions described above. Upper fixed portion 6751 also includes a microphone system 6750 (preferably a multi-microphone array including a digital sound processing system included in housing 6751) suitable for use in voice command interactions, cellular phone interactions, hands-free phone operations, telematic communications and the like, and a loudspeaker 6752 suitable to, for example, audibly convey to the driver navigational directions/instructions from the GPS system 6754 and/or audibly read out e-mail messages received through an INTERNET connection via a telematic link, and the like, or can function as a component of a speaker phone system included in video display assembly 6712. A rain sensor 6758 is included in or at upper portion 6751. Cell phone and other function user access control interfaces/buttons 6746 are included in the forward facing upper portion of video display housing 6730. The lower portion of video display housing 6730 includes an information display 6748 that includes a non-video information display element 6749 that is visible to the driver and/or occupant of the vehicle. Information display element 6749 can be any one of the display types described previously (such as a vacuum fluorescent display, an LED display, an electroluminescent display, or a liquid crystal display), and preferably is a multi-pixel display capable of being reconfigured, and capable of displaying scrolling text including alphanumerical text in various fonts and languages. For example, display element 6749 can display, in response to GPS system 6754, the name of the next street or junction or highway entry/exit ramp being approached by the vehicle equipped with video mirror system 6700. Display element 6749 can display an information output of a tire pressure monitoring system and/or a tire pressure display system, and a component (such as the controller) of a tire pressure monitoring system and/or a tire pressure display system can be incorporated into video mirror system 6700.

As seen in video mirror system 6700, a stand-alone GPS and/or cellular phone and/or telematic system, including voice operated and voice recognizing systems, and/or stand-alone tire pressure display/monitoring systems, can be provided in an assembly that attaches local to or at the attachment point in the vehicle where the interior mirror attaches (such as is described in U.S. Pat. No. 4,930,742, the entire disclosure of which is hereby incorporated by reference herein) and in a manner that use can be made of the microphones and/or control buttons and/or other accessories in the video display assembly without effecting the position of the mirror housing of the interior mirror assembly (and thereby the field of view of its reflective element). Thus, for example, a driver can dial a phone number or actuate a telematic control button or actuate a control of a tire pressure display/monitoring system in video mirror system 6700 without effecting the position of the mirror housing or otherwise perturbing the interior mirror assembly (the interior mirror assembly being separate from and independent of the video display assembly). Also, the weight of the accessories, controls, microphones, antennae, circuitry, and the like in the video display assembly is supported by the windshield mounting button/header mounting plate (or alternately, by a separate windshield attachment member/header attachment member as previously described) and not by the interior mirror assembly so that vibration of the mirror reflective element is unaffected. Also, by mounting the video display assembly as in video mirror system 6700, provision of a stand-alone telematic system and/or telecommunication/phone system (including a video phone system) and/or a GPS navigational system as an aftermarket/dealership option/OEM option item is facilitated. Note that variants of video mirror system 6700 are possible, including some where the video display and its support are dispensed with and display element 6749 is located at fixed portion 6751 (such as part of a lobe or gondola visible below the interior mirror assembly) and is used to convey information to the driver, in conjunction with audio instructions played via loudspeaker 6752 (or alternately, played over another loudspeaker in the vehicle cabin).

Also, the video display in any of the video mirror applications of the present invention, such as video mirror system 6700, can function as the display screen for a portable computer device, a portable cellular phone, and/or a portable personal digital assistant device (PDA) such as a PalmPilot® or other personal digital assistant. When serving as the display screen of a PDA, the PDA/in-vehicle display screen can optionally operate in combination with a cellular phone or as a stand-alone device. Also, any of the video display screens of the present invention, such as video display screen 6731, can serve multiple purposes such as a video screen for an on-board vehicular camera and/or as the video monitor screen for a portable computing/PDA/cellular phone/telecommunication device, an added on as or time. The video display system of the present invention can itself function as an in-vehicle PDA and/or cellular phone, in addition to other functions as described above. Portable devices such as PDAs, cellular phones, and palm/notebook/laptop portable computers can connect to/communicate with the video mirror systems of the present invention by direct wired connection/docking or by wireless communication such as described in U.S. patent application Ser. No. 09/561,023, filed Apr. 28, 2000, now U.S. Pat. No. 6,553,308; U.S. provisional Pat. application Ser. No. 60/131,593, filed Apr. 29, 1999; and U.S. provisional Pat. application Ser. No. 60/199,676, filed Apr. 21, 2000, the entire disclosures of which are hereby incorporated by reference herein. Preferably, the video mirror systems of the present invention, such as video mirror system 6700, is equipped with a mobile device communication port (such as an IrDA-port) that transmits/receives data via wireless infrared communication. For example, any of the video display housings and/or any of the video attachment members/mounts and/or any of the interior mirror assemblies can be equipped with a mobile device communication port (such as an IrDA-port) that transmits/receives data via wireless infrared communication. Also, any of the video display assemblies, including any of the video display screens or video display housings can be adapted to receive data input by touch such as by a human finger or a stylus such as via a touch screen, and such as is disclosed in U.S. provisional Pat. application Ser. No. 60/192,721, filed Mar. 27, 2000, the entire disclosure of which is hereby incorporated by reference herein. The flip down/positionable video display assemblies of the present invention are preferred locations for a wireless telecommunications receiver, transmitter or communications node, including such used as part of a GPS navigational system. Also, the front surface of the stowed flip-down video display assemblies of the present invention can optionally be used as an information display location itself or as a location for a transmitter or receiver for the like of a GPS system, an interactive system, and a telematic system. Also, since it is perceived unsafe, and in some jurisdictions illegal, to transport children in a 5th wheel towed vehicle unless there is aural communication with the towing vehicle, placement of microphones and cameras in the towed vehicle, in combination with the video mirror systems and other displays of the present invention, can allow full communication with any towed vehicle, both visual and oral/aural, an aspect of the present invention that is of importance for the RV industry in particular. Note also a reverse-aid camera that views immediately rearward of the vehicle is useful in guiding a driver when maneuvering the vehicle to attach a tow bar receiving element on the vehicle (typically, a ball element) to a the "tow ball" receiving socket on a tow bar of a trailer or the like. By "seeing" the ball element on a video screen such as any of those described herein, the driver can position the vehicle to engage the hitch-joining element of the trailer to be towed. Note also that any of the interior mirror assemblies or video display assemblies can include a camera-based "black box" recorder of the forward driving scene and/or the cabin of the vehicle. Such a "black box" recorder can, for example, be located in the cavity formed by the mirror housing of the interior rearview mirror assembly, or can be mounted to the mount that attached the mirror assembly to a windshield or header portion of the interior cabin of the vehicle. Note that, for economy, a preferable audible tire pressure indicator device comprises the horn of the vehicle that is normally present (such as in an engine compartment of the vehicle) to be sounded when the driver needs to alert others of his/her presence. Note also that, optionally, any of the video display assemblies and interior rearview mirror assemblies disclosed herein can include an electronic toll collection transceiver (located such as in an interior mirror housing or in an attachment to an interior mirror mount or in a display assembly).

Figure 24:
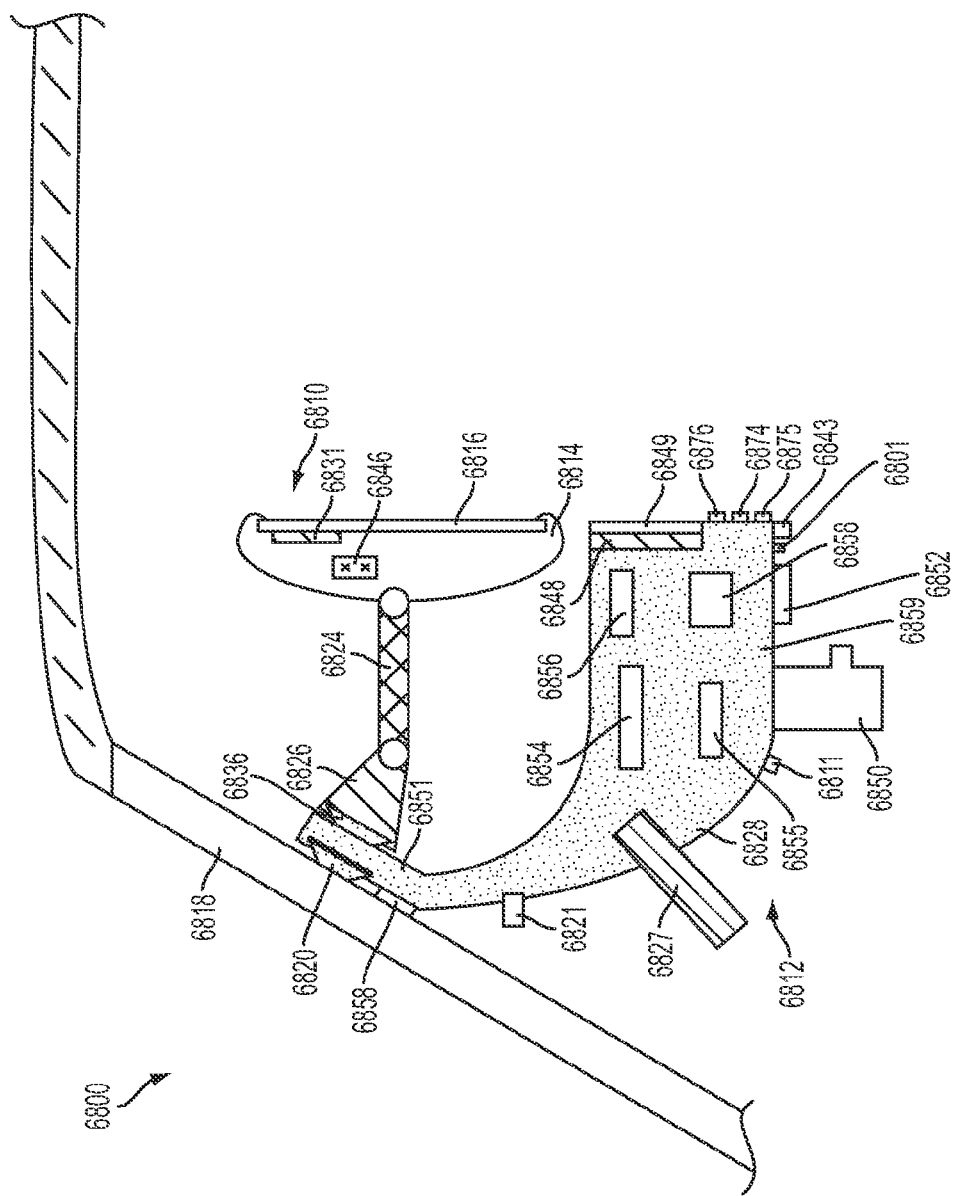
FIG. 24 is a side elevation view of another embodiment of a video mirror system incorporating a tire pressure monitoring and/or display system of the present invention.

A further embodiment of a video mirror system 6800 that includes components of and/or displays information generated by a tire pressure monitoring system and/or a tire pressure display system is shown in FIG. 24. Video mirror system 6800 includes an interior rearview mirror assembly 6810. Similar to the previous embodiments, interior rearview mirror assembly 6810 includes a mirror housing 6814 and a reflective element 6816 (preferably, an electrochromic reflective element) and, further, a mirror housing support 6824. Mirror housing 6814 further includes a video screen 6831 and control circuitry 6846. The mirror mount 6826 mounts to a mirror mounting member or button 6836. Mirror button 6836 is part of the attachment portion 6851 of accessory assembly 6812. Attachment portion 6851 of accessory assembly 6812 is adapted to detachably mount to windshield mirror mounting button 6820. As described above, attachment portion 6851 includes a mirror mounting button 6836, on which mirror mount 6826 of mirror assembly 6810 is detachably mounted to provide a detachable, and preferably break-away connection, for interior rearview mirror assembly 6810. Note that windshield mounting button 6820 is generally co-axial with mirror mounting button 6836 of attachment member or portion 6851. Accessory assembly 6812 preferably includes at least one control button 6876 which may be used, for example, to actuate screen 6831 (or change a contrast/color tint, display intensity, or the like) and/or other functions provided by circuit board 6846.

Attachment portion 6851 of accessory assembly 6812 includes a housing portion 6859 that includes a variety of vehicle accessories and controls, such as the controller and/or display for a tire pressure monitoring system and/or a tire pressure display system. For example, a GPS navigational system 6854, preferably including a GPS antenna, is included in housing 6859. Also included are other accessories 6856, 6855, 6858 that may, for example, comprise a trainable garage door opener such as the HomeLink® GDO system available from JCI of Holland, Mich. and/or may comprise a cellular phone system including the complete telecommunication system/antenna/transceiver and/or a telematic system including antenna and transceiver and/or an automatic toll booth/remote transaction transceiver system and/or a compass direction system including a compass sensor, and/or a complete tire pressure display/monitoring controller, such as is described above and/or any of the vehicle accessories and functions described above. Accessory housing 6859 also includes a microphone system 6850 (preferably a multi-microphone array including a digital sound processing system included in housing 6859) suitable for use in voice command interactions, cellular phone interactions, telematic communications and the like, and a loudspeaker 6852 suitable to, for example, audibly convey to the driver navigational directions/instructions from the GPS system 6854 and/or audibly read out e-mail messages received through an INTERNET connection via a telematic link, and the like. A rain sensor 6858 is included in or at attachment portion 6851. Cell phone and other function user access control interfaces/buttons 6874, 6876 are included in the forward facing (towards the driver/interior cabin occupant) of accessory housing 6859. Accessory housing 6859 includes an information display 6848 that includes a non-video information display element 6849 that is visible to the driver and/or occupant of the vehicle. Information display element 6849 can be any one of the display types described previously (such as a vacuum fluorescent display, an LED display, an electroluminescent display, or a liquid crystal display), and preferably is a multi-pixel display capable of being reconfigured, and capable of displaying scrolling text including alphanumerical text in various fonts and languages. For example, display element 6849 can display, in response to GPS system 6854, the name of the next street or junction or highway entry/exit ramp being approached by the vehicle equipped with video mirror system 6800. Accessory module 6812 is also equipped with a video camera 6843 for viewing a portion of the interior cabin (such as, for example, viewing a front passenger seat so as to function as a seat occupancy detector) and/or for viewing an occupant of the vehicle (such as a driver's head/face portion). Optionally, near-IR and/or visible light sources, as described previously, can be positioned at housing 6859 so as to illuminate the target area being viewed by camera 6843. A forward facing camera 6821 is also provided at or within accessory module 6812 with a field of view through the front windshield (for automatic headlamp control and/or collision avoidance and/or windshield fogging detection and/or rain sensing and/or smart headlamp control). User actuatable controls 6875 are provided on the front portion of accessory housing 6859 to allow user actuation of a variety of vehicle functions and/or accessories (such as actuation of or color/tint control of video screen 6831). A photo sensor 6811 (such as a photo diode, or a photo transistor, or a photo resistor) is provided to allow measurement of cabin ambient lighting for a variety of purposes, such as automatic intensity control of the video image displayed on video screen 6831. An instrument panel/floor console/gear shift console illuminating light source 6801 (preferably an LED) is provided at the lower surface of accessory housing 6859.

As seen in video mirror system 6800, a stand-alone GPS and/or cellular phone and/or telematic system, including voice operated and voice recognizing systems, as well as other vehicle functions such as a keyless entry receiver, a map/reading light, an intrusion detector, a seat occupancy detector, a trainable/universal garage door opener, a rain sensor, a compass sensor, a headlamp controller, a twilight sentinel, a tool transceiver, a remote transaction transceiver, a windshield fogging detector as well as any other vehicle accessory described above, can be provided in a module assembly that attaches local to or at the attachment point in the vehicle where the interior mirror attaches (such as is described in U.S. Pat. No. 4,930,742, the entire disclosure of which is hereby incorporated by reference herein) and in a manner that use can be made of the microphones and/or control buttons and/or other accessories in the accessory assembly without effecting the position of the mirror housing of the interior mirror assembly (and thereby the field of view of its reflective element), and preferably in a manner and at a location such that at least a portion, and preferably at least a substantial portion, of the accessory module is disposed behind the rear of the interior mirror housing of the interior rearview mirror assembly (and so in a region that minimizes obstruction of the driver's forward field of view through the front windshield). Thus, for example, a driver can dial a phone number or actuate a telematic control button in video mirror system 6800 without effecting the position of the mirror housing or otherwise perturbing the interior mirror assembly (the interior mirror assembly being separate from and independent of the accessory assembly). Also, the weight of the accessories, controls, microphones, antennae, circuitry, and the like in the accessory assembly is supported by the windshield mounting button/header mounting plate (or alternately, by a separate windshield attachment member/header attachment member as previously described) and not by the interior mirror assembly so that vibration of the mirror reflective element is unaffected. Also, by mounting the accessory assembly as in video mirror system 6800, provision of a stand-alone telematic system and/or telecommunication/phone system (including a video phone system) and/or a GPS navigational system as an aftermarket/dealership option/OEM option item is facilitated. Note that variants of video mirror system 6800 are possible, such as where the accessory assembly is provided with pivot joints, as previously described, in order to allow positioning at a position and/or viewing angle desirable to a driver and/or occupant. Thus, for example, accessory housing 6859 of accessory module assembly 6812 can be movable about accessory module attachment portion 6851 so that the position of accessory module housing 6859 can be adjusted (about at least one axis, preferably about at least two axes, more preferably, about at least three axes) to position the user access/control buttons, information display and the like at the accessory housing 6859 at a location and/or a viewing angle desired/preferred by an occupant of the vehicle such as a driver or front seat passenger. Also, optionally and preferably, accessory module housing 6859 can be stowed as previously described when viewing of its information display and/or access to its control inputs is not desired. Thus, accessory module 6812 can comprise a flip-down accessory housing 6859 that is articulatable left to right and up and down. Also, when a cellular phone and/or a telematic device and/or a PDA and/or personal computing device is docked in or included in the accessory assembly 6812, accessory assembly 6812 can include a loudspeaker (as described above) and associated sound amplification circuitry so that accessory module assembly 6812 functions as a stand-alone in-vehicle sound system, thus providing, for example, a speaker-phone function. Also, a passenger side inflatable restraint indicator display that indicates the state of activation/deactivation of an air bag or similar inflatable occupant restraint in the vehicle cabin (such as is described in U.S. Pat. No. 6,087,953, the entire disclosure of which is hereby incorporated by reference herein) can be included in accessory assembly 6812 such as at information display 6848. Also, accessory assembly 6812 can include various accessories and devices such as a seat occupancy detector (visible detector, ultrasound detector, radar detector, microwave detector, thermal detector (including a pyrodetector), infra red detector) and/or a keyless entry receiver and/or a cabin occupancy detector (such as a pyrodetector or an infra red detector or an ultrasound detector or an infra red detector) and/or a map light/reading light.

Figure 24A:
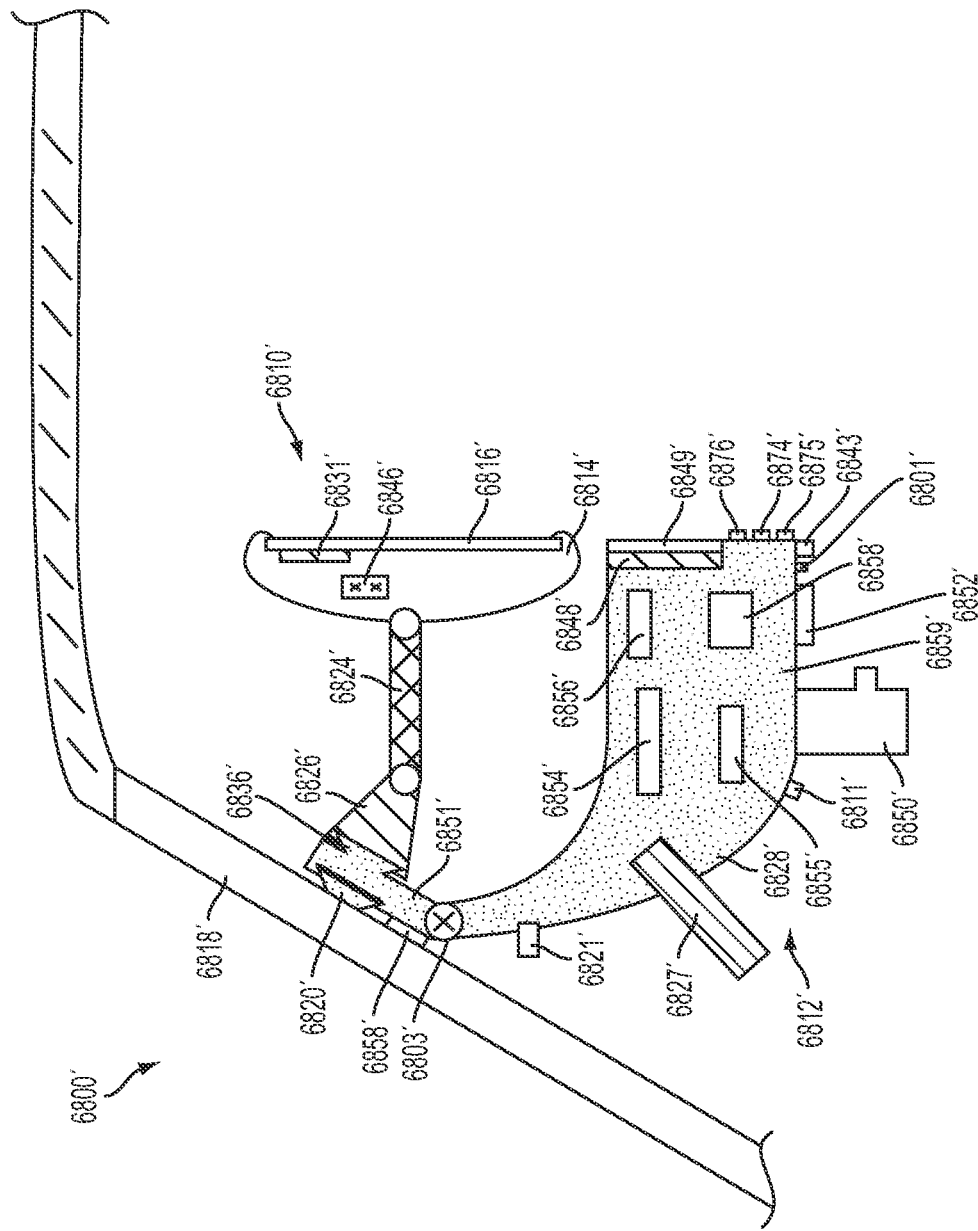
FIG. 24A is a side elevation view of yet another embodiment of a video mirror system incorporating a tire pressure monitoring and/or display system of the present invention.

A further embodiment of a video mirror system 6800' that includes components of (such as a controller that includes an antenna, a microprocessor, user-input controls, and/or allied electronic circuitry) and/or an information display of a tire pressure monitoring system and/or a tire pressure display system is shown in FIG. 24A. Video mirror system 6800' is similar in features and content to video mirror system 6800 of FIG. 24, and comprises an interior mirror assembly 6810' and an accessory module assembly 6812'. Accessory module attachment portion 6851' of accessory module assembly 6812' attaches to windshield-mounted attachment member 6820' via a break-away mount that detaches when an impact at above a pre-determined impact force is experienced. Preferably, attachment member 6820' consists of a mirror mounting button such as is commonly found on the inner surface of vehicular windshields of MY00 vehicles such as from Ford Motor Company, Toyota Motors, BMW, General Motors Corporation, Volkswagen, Mazda, Daimler Chrysler Corporation, Nissan, Renault, Volvo, Audi and the like. Also, preferably, the receiving portion of accessory module attachment portion 6851' that attaches to windshield-mounted attachment member 6820' is the same as would be found on the mounting portion of an interior rearview mirror assembly that would attach to the windshield mounting button on the windshield of that particular vehicle model. This has several advantages. By making the mounting-to-the-windshield-button portion of accessory module assembly 6812' the same as that of the interior rearview mirror assembly that would normally attach to that particular type/construction of windshield-mounted mirror button, an automaker can supply an interior rearview mirror assembly and/or an accessory module assembly (with an interior mirror assembly mounting thereto) in accordance with the option(s) selected by a consumer ordering an individual vehicle. Also, dealership and after-market installation of an accessory module assembly is greatly facilitated. Only one mirror button need be mounted on the windshield (typically by the windshield manufacturer), although, optionally more than one attachment member can be adhered to the glass inner surface of the windshield, preferably with a substantially opaque black-out frit to mask the presence of such members when viewed from outside the vehicle through the front windshield. Also, because a mirror mount design is used for the attachment of accessory module attachment portion 6851' to the windshield-mounted attachment member 6820', such attachment can be a break-away/detachable mounting that passes automaker and governmental safety standards and specifications for head impact, air-bag deployment, and the like, as well as being easy to install (such as at a vehicle assembly line) and/or to remove (such as during a service repair or the like) while maintaining a secure, reliable attachment during normal use for the vehicle lifetime. Also, a pivot joint 6803' (such as a ball joint similar to that commonly used on interior mirror assembly support arms, as described above) is provided on accessory module attachment portion 6851' so that should accessory module housing 6859' be impacted, such as in an accident, the housing moves away from the impacting body (such as an occupant's head), thus reducing potential injury. Thus, accessory module 6812' is adapted to meet automaker and regulatory head impact standards and specifications. Pivot joint 6803' also allows positioning of accessory housing 6859' to suit a driver's and/or occupant's needs, such as, for example, to position information display element 6849' for view by the driver and/or controls 6876', 6874', 6875' for ready access by the driver.

Also, and optionally, the accessory module assembly 6812 and the other flip-down, articulatable video display assemblies described above can be supported by an attachment member separate from the windshield-mounted or header-mounted mirror attachment button or plate. Examples of such separate mounting members are described above. A preferred adhesive to attach windshield mirror mounting buttons and/or windshield mounting attachment members for supporting an accessory module assembly or a video display assembly is a structural adhesive such as a modified epoxy structural bonding tape available from 3M of Minneapolis-St. Paul, Minn. under the trade names SBT9214, SBT9263 and SBT9270. Alternately, a silicone adhesive, such the silicone adhesive available from Dow Corning of Midland, Mich. under the trade name SOTEFA can be used or a polyvinyl butyral adhesive such as available from Solutia is can be used. For heavier video mirror systems/accessory module assemblies, such as those weighing in excess of 500 g and particularly in excess of 750 g, use of a structural bonding tape such as described above to bond the attachment member (such as the windshield mirror button) to the inner surface of the windshield is preferred.

Also, the video display in any of the video mirror/video display assemblies above, such as video mirror system 6800, can function as the display screen for a portable computer device, a portable cellular phone, and/or a portable personal digital assistant device (PDA) such as a PalmPilot® or other personal digital assistant. When serving as the display screen of a PDA, the PDA/in-vehicle display screen can optionally operate in combination with a cellular phone or as a stand-alone device. Also, any of the video display screens above, such as video display screen 6831, can serve multiple purposes such as a video screen for an on-board vehicular camera and/or as the video monitor screen for a portable computing/PDA/cellular phone/telecommunication device in addition to, or as an alternative to, functioning as a display of a tire pressure display/monitoring system. For example, a removable telecommunication and/or computing accessory 6827 can be removably docked into docking station 6828 of accessory module 6812. For example, and as described in disclosed in U.S. patent application Ser. No. 09/585,679 filed Jun. 1, 2000, which is incorporated herein in its entirety, and in U.S. patent application Ser. No. 09/449,121, filed Nov. 24, 1999, now U.S. Pat. No. 6,428,172, the entire disclosure of which is hereby incorporated by reference herein, a cellular phone or a personal digital assistant device such as a PalmPilot® or a pager or a hand-held communication device and the like can be removably attached to accessory module 6812. Also, note that, optionally, any of the display assemblies (such as the flip down displays described above) of the present invention and/or the camera assemblies of the present invention can be detached and used remote from the vehicle (or hand-held in the vehicle) as part of a portable video device, portable computer monitor, portable PDA or portable navigation device.

Thus, it is seen that the present invention provides a tire inflation monitoring system which provides a useful adjunct to the inflation of the vehicle tires. Because the visible tire inflation indicator assembly is positioned at or on an exterior vehicle portion such as a body side panel or on an exterior rearview mirror assembly where it is readily visible from the area surrounding each of the vehicle tires, it facilitates rapid adjustment of the inflation condition of the tires, thus increasing the safe operation of the vehicle. Also, preferably, the tire inflation indicator assembly is positioned on the exterior body portion at a location readily visible to a person crouching down at a wheel tire to inflate. The present invention includes provision of audible and/or tactile tire pressure indicators, as described above.

Furthermore, a tire inflation monitoring system, according to the invention, provides a useful indication to the vehicle user when the user is entering or leaving the vehicle that the tire pressure monitored by each of the tire inflation indicator assemblies is within a range of pressure as recommended by the manufacturer or outside of that range, thus alerting the user to take action to bring the pressure of the tire within the range specified by the manufacturer preferably before operating the vehicle.

Other modifications may suggest themselves to the skilled artisan. For example, a single tire inflation indicator assembly 19 may include one color indicator for the rear tire on that side of the vehicle and a different color indicator for the front tire on that side of the vehicle. Alternatively, one tire inflation indicator assembly may be provided for indicating the tire inflation condition of the rear tire assembly, and a different tire inflation indicator assembly may indicate the direct inflation condition of the front tire on that side of the vehicle.

Also, communication between components of the tire inflation assistance monitoring system of this present invention can be by wire (such as a direct wire connection or via an optical fiber link) or via a bus system (such as a CAN or LIN system, as known in the arts) or wirelessly such as by IR or RF communication (such as using a local area RF broadcast network such as the BLUETOOTH protocol from Motorola of Schaumberg, Ill.), such as is disclosed in and co-assigned U.S. patent application Ser. No. 09/466,010, filed Dec. 17, 1999, now U.S. Pat. No. 6,420,975, the entire disclosure of which is hereby incorporated by reference herein, and in and co-assigned U.S. patent application Ser. No. 09/449,121, filed Nov. 24, 1999, now U.S. Pat. No. 6,428,172, the entire disclosure of which is hereby incorporated by reference herein.

Note also, while it is preferable to position the visible tire pressure indicator (such as a high intensity LED light source) on an exterior portion of the vehicle, it may optionally be located at an interior cabin portion (such as at a rearview mirror assembly (preferably at its mount to a header or windshield portion, or at a lower/underside portion of the mirror housing), or as part of an interior roof portion such as a headliner region or a dome light or as part of a door panel/frame/assembly (inside the vehicle but visible via a side window)). However, preferably it is mounted at an interior portion that is visible to a person crouching down to pump air into a tire on the vehicle. Use of an audible tire pressure indicator (such as a horn of the vehicle or another sound generator that momentarily sounds or "chirps" when the correct tire pressure is reached) in conjunction with a visible tire pressure indicator (and especially an interior cabin-mounted visible tire pressure indicator) is most preferred.

Also, it may be advantageous to mount a controller for the passenger-side wheel tire sensors (or at least the antenna thereof) in or at the passenger-side exterior side view mirror assembly (such as in the mirror casing thereof) so that a passenger-side tire adjust event is readily recognized. Also, it may be advantageous to mount a controller for the driver-side wheel tire sensors (or at least the antenna thereof) in or at the driver-side exterior side view mirror assembly (such as in the mirror casing thereof) so that a driver-side tire adjust event is readily recognized. Also, it may be advantageous to mount a controller for the driver-side wheel tire sensors (or at least the antenna thereof) in or at the driver-side door handle assembly (s) (such as in the casing thereof) so that a driver-side tire adjust event is readily recognized. Also, it may be advantageous to mount a controller for the passenger-side wheel tire sensors (or at least the antenna thereof) in or at the passenger-side door handle assembly(s) (such as in the casing thereof) so that a passenger-side tire adjust event is readily recognized.

Also, any of the displays or video displays above can display tire pressure status, as described above, and further can optionally, occasionally, or frequently display other types of information, such as temperature, compass headings, messages, including pager status, pager messages, E-mail messages, images from an interior cabin surveillance system or back-up system, or the like, in addition to or alternately to the tire pressure status.

Other displays are possible, such as of a night-vision camera (preferably a multi-pixel pyrodetection array) that views forward of the vehicle (or rearward) when driving/parking at night. Location at or within an exterior side view mirror assembly is a desired location. Also, preferably, either or both of the night vision camera and the video display screen it displays on is removable from the vehicle. Thus, for example, a vehicle can be equipped with a night vision camera assembly (such as available from Raytheon) and with the night vision camera assembly detachably mounted to the vehicle (such as to a door of the vehicle such that the imaging surface/lens of the camera assembly is outside the vehicle. The field of view of the night vision camera is in the direction of the vehicle's forward direction of travel. A displays screen for this camera can be provided in the interior cabin (such as at, on or adjacent to the interior rearview mirror assembly). The display screen is included in a display assembly that is also detachably mounted in the vehicle. Then, for example, when a driver drives to a dark site (such as a field or woods while out hunting) using and guided by the vehicle-mounted night vision camera/display system, the driver can optionally detach the camera from its mount on the vehicle and detach the display from its mount on the vehicle, and then remount the night vision camera and the display assembly onto a portable, battery-powered module that the driver can then use as a portable night vision system that allows the driver "see" in the dark by using viewing the image generated by the night vision camera on the display screen of the display device. This provides a night vision "flashlight" utility. Upon return to the vehicle, the driver demounts the camera and display assemblies from the portable module, remounts them on the vehicle, and recommences in-vehicle use while driving home.

Also, tire pressure monitoring systems of the type which include at each wheel, within the pressurized cavity of the tire, a pressure transducer, preferably also a temperature transducer, a microcontroller or control circuit, and a radio frequency transmitter, in many cases do not have any external source of power. A small battery must support the continuous transmission of data for many years, 10 years being typical of automotive component required lifetimes. It is, therefore, essential that the wheel based measuring and transmitting units consume as little power as possible. In order to achieve minimum power consumption, pressure and temperature conditions are measured and transmitted on a regular but relatively infrequent basis. Typically, the measurement and transmission periods may be in the order of micro or milliseconds, while the delay between these periods may be in the order of seconds or tens of seconds. While, since generally tire pressures and temperatures change relatively slowly, these frequencies of transmission are sufficient for normal communication of tire conditions. However, they are not sufficient to monitor the rapid changes associated with typical inflation rates, or deflation rates resulting from severe tire damage. It is preferable, therefore, to increase the rate of data transmission, to the order of several transmissions per second, during periods of rapid tire pressure change, to provide timely feedback to the operator during the tire inflation process during a tire pressure adjust event such as at a service station, or to provide timely warning of a relatively rapid tire deflation due to tire damage to a driver while driving the vehicle (such as via any of the in-cabin tire pressure/status displays described above. While the tire pressure monitoring system may be put into tire inflation mode by a user operated switch (or by detection of depression of a tire valve nipple or the like), it may preferably be selected automatically when the central control unit detects the increased frequency of transmissions from a particular wheel mounted unit.

It should be noted that the above described system to aid the tire inflation process may be applied to tire pressure monitoring systems which do not rely on battery powered transmissions such as wireless induction systems or systems which incorporate mechanically generated power based on wheel rotation.

The temperature of the air within a tire cavity varies significantly over time due to varying ambient temperature, road surface temperature, and heat generation due to tire wall flexing while driving. Since the air within the tire obeys Boyle's Law, the pressure and tire volume vary with varying temperature according to the formula: $P \times V/T =$ a constant. Typically the desired tire air pressure is specified at a nominal ambient temperature, but in a typical tire inflation situation in which the vehicle has been driven to a service station or suitable source of compressed air, the tires on the wheels on that vehicle are typically at temperatures other than (and higher than) the nominal ambient value (for example, if parked for a prolonged period so that tire temperature matched ambient temperature), depending on the recent driving history or current ambient conditions. It is undesirable to wait such as at a service station for sufficient time for the tires to cool to ambient temperatures before inflation. It is, therefore, preferable that the tire pressure monitoring system includes an algorithm based on Boyle's Law (or another gas pressure/temperature relationship), which corrects for the effect of temperature, and with the tire pressure monitoring system determining the appropriate pressure set point on the basis of the desired pressure at ambient temperature and the temperature of the air in the tire, and a pressure volume relationship for the particular tire and wheel rim combination. It is reasonable to ignore the volume variable since this will be approximately constant for a particular pressure for a particular wheel rim and tire combination. Thus a tire pressure indicator provided such as at an outside side view mirror assembly, or by use of a horn chirp or similar momentary sounding of the car horn, by flashing of the turn signal lamps, or by other means can provide a signal to the operator at a temperature compensated pressure such that on return to nominal ambient temperature the pressure will return to the desired set point. By this means the vehicle operator does not have to be concerned with absolute pressure values, or with the effects of temperature. This same algorithm may be used for continuous monitoring such that out of adjustment pressure warnings are only initiated after temperature compensations have been made. Thus, on setting up the system, it is only necessary to input the manufacturer's recommended pressure at nominal temperatures for each tire on the vehicle. If the system requires wheel position training, the appropriate action such as a slight inflation or deflation of tires in sequence can be taken. Thereafter the tire condition indication merely requires a system-active status and a low or high pressure condition (if present) input, and wheel position identification.

It is known to provide a system with a receiver local to each wheel on the vehicle, for instance located in the wheel well, such that the system does not require the wheel position training step described above. For economic reasons, however, a single omni-directional receiver is more typically used. However, it is practical to combine the described tire monitoring system with two directional antennae in a central location such that one antenna is responsive to transmission sources to the left and right hand sides of the vehicle, the second responsive to transmission sources to the rear and front of the vehicle. Combination of the two antennae responses allows the economic determination, such as by a triangulation algorithm, of each wheel transmitter position without the need for local antennae, thus avoiding the need for the above described position training step, and retraining after tire rotation, and allowing an automatic identification of from what wheel type (front or rear; passenger-side or driver-side) an individual wireless broadcast of tire pressure data received at a central controller is being broadcast from. Such an autosensing tire pressure system (that automatically identifies the particular wheel on the vehicle from which a received wireless signal is being broadcast from so that it can distinguish that, for example, a tire sensor broadcasting is located on a rear driver's side wheel rather than any other wheel) has many advantages. Preferably, such an autosensing tire pressure system includes two spaced antennae (either spaced apart on a common assembly in the vehicle or at different locations in the vehicle, such as one antenna on a driver side, such as at a driver side exterior rearview mirror assembly, with the other on a passenger side, such as at a passenger side exterior rearview mirror assembly or with one located at an interior rearview mirror assembly and the other in a header console or other roof portion of the vehicle). By the receiving antennae of the tire pressure display/monitoring system being spaced apart but in known locations within or at the vehicle, a control or processor, such as within the tire pressure monitoring controller, can identify the location of a given tire sensor in a given wheel by analyzing the differences in the respective signals using, for example, triangulation techniques, which triangulation techniques are known in the art. Thus, the driver can rotate or change the position of tires on the vehicle and the tire monitoring system will "learn" or automatically identify the location of each tire sensor broadcasting, and will then be able to inform the driver, for example, that "Tire pressure for Front Passenger-Side Tire is 32 psi". Thus, an automatic vehicle wheel identification function is provided for the tire pressure display/monitoring system of the present invention.

The present invention provides a method of assisting manual tire inflation by a person whereby, for example, a driver can pull up to an air compressor station at a service station, turn off the vehicle engine and exit the vehicle, and crouch down at a particular wheel tire to inflate using the air hose provided at the service center. Upon connecting the air hose to the valve stem of that tire, the driver can view a visible indicator provided at an exterior vehicle portion such as on the underside of the casing that houses the exterior mirror reflector in the exterior side view mirror assembly on that side of the vehicle, and/or hear an audible tire pressure indicator such as can be provided via a sound pattern produced by the horn on the vehicle that is coded to/indicative of the tire pressure condition being sensed in a particular tire that is having its tire pressure adjusted, and/or experience actuation of a tactile tire pressure indicator while pumping air into a tire. Upon commencing the tire pressure adjust event, the driver can view the indicator, whose illumination is coded to indicate the tire pressure status (whether it be in an under pressure condition, a correct pressure condition or an over pressure condition) and/or listen for/to the sound generated by the audible tire pressure indicator, and/or experience actuation of a tactile tire pressure indicator while pumping air into a tire. Guided by the coded illumination of the indicator(s) and/or audible sounds provided external the vehicle and/or tactile feedback from the tactile tire pressure sensor, and while still crouched in the act of adjusting tire pressure, the driver can inflate/deflate that tire's pressure to the recommended, desired pressure level (a pressure level preferably stored in a memory of the vehicle).

Other changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. An accessory mounting system for a vehicle, said accessory mounting system comprising:
    an attachment element adhesively attached at an in-cabin surface of a vehicle windshield of a vehicle equipped with said accessory mounting system;
    said attachment element comprising a mirror mounting button;
    a plurality of attachment members adhesively attached at the in-cabin surface of the vehicle windshield local to said attachment element;
    an interior rearview mirror assembly comprising a mirror head and a mirror support;
    wherein said mirror head comprises a mirror reflective element and a mirror casing;
    wherein said mirror support comprises a mirror mount that is configured to mount said interior rearview mirror assembly to said mirror mounting button of said attachment element;
    a structure configured for mounting to said plurality of attachment members attached at the in-cabin surface of the vehicle windshield;
    said structure configured to receive and be supported by said plurality of attachment members that are adhesively attached at the in-cabin surface of the vehicle windshield;
    wherein said structure is configured to accommodate a forward facing camera; and
    wherein, with said structure received by and supported by said attachment members and when said structure is accommodating said forward facing camera, said forward facing camera has a field of view through the vehicle windshield.

2. The accessory mounting system of claim 1, wherein said structure accommodates at least another accessory selected from the group consisting of (a) a rain sensor, (b) a light sensor, (c) a tire pressure monitoring system receiver, (d) an antenna, (e) an antenna for an entry system, (f) a component of an electronic toll collection system, (g) an antenna for a global positioning system, (h) a component of a telematic system, (i) a speaker, (j) a microphone, (k) an illumination source, (l) a garage door opener, (m) a compass sensor and (n) a user actuatable input.

3. The accessory mounting system of claim 1, wherein said forward facing camera comprises a CMOS imaging device.

4. The accessory mounting system of claim 1, wherein said forward facing camera provides input for a camera-based "black box" recorder system.

5. The accessory mounting system of claim 1, wherein, with said structure received by and supported by said attachment members, said structure accommodates a plurality of accessories.

6. The accessory mounting system of claim 1, wherein, with said structure received by and supported by said attachment members, an uppermost portion of said structure is disposed above said attachment element.

7. The accessory mounting system of claim 1, wherein, with said structure received by and supported by said attachment members, a lowermost portion of said structure is disposed below said attachment element.

8. The accessory mounting system of claim 1, wherein, with said structure received by and supported by said attachment members, a lowermost portion of said structure is not disposed below a level that is generally aligned with a lowermost portion of said mirror head when said interior rearview mirror assembly is mounted to said mirror mounting button of said attachment element and when said interior rearview mirror assembly is normally used by a driver of the equipped vehicle.

9. The accessory mounting system of claim 1, wherein an uppermost portion of said structure is disposed above a level that is generally aligned with an uppermost portion of said mirror head when said interior rearview mirror assembly is mounted to said mirror mounting button of said attachment element and when said interior rearview mirror assembly is normally used by a driver of the equipped vehicle.

10. The accessory mounting system of claim 9, wherein, with said structure received by and supported by said attachment members, said uppermost portion of said structure is proximate or at a headliner of the equipped vehicle.

11. The accessory mounting system of claim 10, wherein, with said structure received by and supported by said attachment members, said uppermost portion of said structure is disposed beyond the vehicle windshield at a portion of the roof of the equipped vehicle.

12. The accessory mounting system of claim 1, wherein, with said structure received by and supported by said attachment members, (i) a lowermost portion of said structure is not disposed below a level that is generally aligned with a lowermost portion of said mirror head when said interior rearview mirror assembly is mounted to said mirror mounting button of said attachment element and when said interior rearview mirror assembly is normally used by a driver of the equipped vehicle, and (ii) an uppermost portion of said structure is disposed above a level that is generally aligned with an uppermost portion of said mirror head when said interior rearview mirror assembly is mounted to said mirror mounting button of said attachment element and when said interior rearview mirror assembly is normally used by a driver of the equipped vehicle.

13. The accessory mounting system of claim 1, wherein, with said structure received by and supported by said attachment members, at least one of (a) a lowermost portion of said structure is disposed below said attachment element, (b) an uppermost portion of said structure is disposed above said attachment element, (c) a rightmost portion of said structure is disposed leftward of said attachment element and (d) a leftmost portion of said structure is disposed rightward of said attachment element.

14. The accessory mounting system of claim 1, wherein a shadeband is disposed at the vehicle windshield at least proximate to where said attachment element and said plurality of attachment members are adhesively attached at the in-cabin surface of the vehicle windshield.

15. The accessory mounting system of claim 1, wherein a light absorbing layer disposed at the vehicle windshield at least partially masks the presence of said attachment element from view by a viewer who is viewing from outside the equipped vehicle through the vehicle windshield.

16. The accessory mounting system of claim 15, wherein said light absorbing layer disposed at the vehicle windshield further at least partially masks the presence of said structure from view by a viewer who is viewing from outside the equipped vehicle through the vehicle windshield.

17. The accessory mounting system of claim 1, comprising a housing that at least substantially hides the presence of said forward facing camera from view by a person viewing from inside the vehicle cabin.

18. The accessory mounting system of claim 17, wherein, with said structure received by and supported by said attachment members, an uppermost portion of said housing is disposed above said attachment element.

19. The accessory mounting system of claim 18, wherein, with said structure received by and supported by said attachment members, said housing houses a plurality of accessories.

20. The accessory mounting system of claim 18, wherein wiring that supplies at least one of power and a signal to said interior rearview mirror assembly pass through said housing.

21. The accessory mounting system of claim 18, wherein, with said structure received by and supported by said attachment members, a lowermost portion of said housing is disposed below said attachment element.

22. The accessory mounting system of claim 1, wherein said interior rearview mirror assembly comprise a single-ball interior rearview mirror assembly.

23. The accessory mounting system of claim 1, wherein said interior rearview mirror assembly comprise a double-ball interior rearview mirror assembly.

24. The accessory mounting system of claim 1, wherein, with said structure received by and supported by said attachment members, said structure straddles said attachment element.

25. The accessory mounting system of claim 1, wherein said forward facing camera comprises a CMOS imaging device and wherein said forward facing camera comprises a component of at least one of (i) an automatic headlamp control system of the equipped vehicle, (ii) a collision avoidance system of the equipped vehicle, (iii) a windshield fogging detection system of the equipped vehicle and (iv) a rain sensing system of the equipped vehicle.

26. The accessory mounting system of claim 1, wherein said mirror mount is configured to at least partially receive said mirror mounting button of said attachment element therein in order to mount said interior rearview mirror assembly to said mirror mounting button of said attachment element.

27. The accessory mounting system of claim 1, wherein said mirror mount makes a breakaway connection to said mirror mounting button of said attachment element.

28. The accessory mounting system of claim 1, wherein said structure accommodates a rain sensor.

29. The accessory mounting system of claim 1, wherein, with said structure received by and supported by said attachment members, said mirror mount can be mounted to said mirror mounting button of said attachment element and can be demounted from said mirror mounting button of said attachment element without demounting said structure from said attachment members.

30. The accessory mounting system of claim 1, comprising a vehicular tire pressure monitoring system having a tire pressure indicator assembly operable to provide at least one of an audible tire inflation status indicator and a visual tire inflation status indicator.

31. The accessory mounting system of claim 30, wherein said tire inflation status indicator provides indication of the inflation condition of a vehicle tire to a person exteriorly of the equipped vehicle when the person is engaged in an act of adjusting the tire pressure of the vehicle tire, and wherein a control of said tire pressure monitoring system receives inputs from tire pressure sensors sensing pressure of the vehicle tires and produces outputs to actuate said tire inflation status indicator.

32. The accessory mounting system of claim 30, wherein said tire inflation status indicator provides a visual tire inflation status indicator and wherein said visual tire inflation status indicator is provided at said interior rearview mirror assembly.

33. The accessory mounting system of claim 32, wherein said interior rearview mirror assembly comprises an interior rearview video mirror assembly comprising a transflective electrochromic mirror reflective element and a video display screen.

34. The accessory mounting system of claim 1, wherein said mirror reflective element comprises a prismatic mirror reflective element and wherein said interior rearview mirror assembly comprises a double-ball prismatic interior rearview mirror assembly.

35. The accessory mounting system of claim 1, wherein said attachment element accommodates a rain sensor.

36. The accessory mounting system of claim 1, wherein said mirror reflective element comprises an electrochromic mirror reflective element and wherein said interior rearview mirror assembly comprises a double-ball electrochromic interior rearview mirror assembly.

37. An accessory mounting system for a vehicle, said accessory mounting system comprising:
an attachment element adhesively attached at an in-cabin surface of a vehicle windshield of a vehicle equipped with said accessory mounting system;
said attachment element comprising a mirror mounting button;
at least one attachment member adhesively attached at the in-cabin surface of the vehicle windshield local to said attachment element;
an interior rearview mirror assembly comprising a mirror head and a mirror support;
wherein said mirror head comprises a mirror reflective element and a mirror casing;
wherein said mirror support comprises a mirror mount that is configured to mount said interior rearview mirror assembly to said mirror mounting button of said attachment element at the in-cabin surface of the vehicle windshield;
a structure configured for mounting to said at least one attachment member attached at the in-cabin surface of the vehicle windshield;
said structure configured to receive and be supported by said at least one attachment member that is adhesively attached at the in-cabin surface of the vehicle windshield;
wherein said structure is configured to accommodate a forward facing camera;
wherein, with said structure received by and supported by said at least one attachment member and when said structure is accommodating said forward facing camera, said forward facing camera has a field of view through the vehicle windshield; and
wherein, with said structure received by and supported by said at least one attachment member, said mirror mount can be mounted to said mirror mounting button of said attachment element and can be demounted from said mirror mounting button of said attachment element without demounting said structure from said at least one attachment member.

38. The accessory mounting system of claim 37, wherein said lowermost portion of said structure is not disposed below a level that is generally aligned with a lowermost portion of said mirror head when said interior rearview mirror assembly is normally mounted in the equipped vehicle.

39. The accessory mounting system of claim 38, wherein said uppermost portion of said structure is disposed above a level that is generally aligned with an uppermost portion of said mirror head when said interior rearview mirror assembly is normally mounted in the equipped vehicle.

40. The accessory mounting system of claim 39, wherein, with said structure received by and supported by said at least one attachment member, said uppermost portion of said structure extends at least to a headliner of the equipped vehicle.

41. The accessory mounting system of claim 37, comprising a housing that at least substantially hides the presence of said forward facing camera from view by a person viewing from inside the vehicle cabin.

42. The accessory mounting system of claim 41, wherein, with said structure received by and supported by said at least one attachment member, at least a portion of said housing is disposed above said attachment element.

43. The accessory mounting system of claim 41, wherein wiring that supplies at least one of power and a signal to said interior rearview mirror assembly passes through said housing.

44. The accessory mounting system of claim 37, wherein said structure accommodates at least another accessory and wherein said at least another accessory comprises at least one of (a) a rain sensor and (b) an antenna.

45. The accessory mounting system of claim 37, wherein said forward facing camera comprises a CMOS imaging device and wherein said forward facing camera comprises a component of at least one of (i) an automatic headlamp control system of the equipped vehicle, (ii) a collision avoidance system of the equipped vehicle, (iii) a windshield fogging detection system of the equipped vehicle and (iv) a rain sensing system of the equipped vehicle.

46. The accessory mounting system of claim 37, wherein said forward facing camera comprises a CMOS imaging device, and wherein a light absorbing layer disposed at the vehicle windshield at least partially masks the presence of said attachment element from view by a viewer who is viewing from outside the equipped vehicle through the vehicle windshield.

47. The accessory mounting system of claim 37, wherein said interior rearview mirror assembly comprise a double-ball interior rearview mirror assembly.

48. The accessory mounting system of claim 37, wherein said attachment element accommodates a rain sensor.

49. The accessory mounting system of claim 37, wherein, with said structure received by and supported by said at least one attachment member, at least one of (a) a lowermost portion of said structure is disposed generally below said attachment element, (b) an uppermost portion of said structure is disposed generally above said attachment element, (c) a rightmost portion of said structure is disposed generally leftward of said attachment element and (d) a leftmost portion of said structure is disposed generally rightward of said attachment element.

50. An accessory mounting system for a vehicle, said accessory mounting system comprising:
    an attachment element adhesively attached at an in-cabin surface of a vehicle windshield of a vehicle equipped with said accessory mounting system;
    said attachment element comprising a mirror mounting button;
    at least one attachment member adhesively attached at the in-cabin surface of the vehicle windshield local to said attachment element;
    an interior rearview mirror assembly comprising a mirror head and a mirror support;
    wherein said mirror head comprises a mirror reflective element and a mirror casing;
    wherein said mirror support comprises a mirror mount that is configured to mount said interior rearview mirror assembly to said mirror mounting button of said attachment element;
    a structure configured for mounting to said at least one attachment member attached at the in-cabin surface of the vehicle windshield;
    wherein said structure is configured to accommodate a forward facing camera;
    wherein, with said structure received by and supported by said at least one attachment member and when said structure is accommodating said forward facing camera, said forward facing camera has a field of view through the vehicle windshield; and
    wherein, with said structure received by and supported by said at least one attachment member, said structure accommodates said forward facing camera and a rain sensor.

51. The accessory mounting system of claim 50, wherein, with said structure received by and supported by said at least one attachment member, said mirror mount can be mounted to said mirror mounting button of said attachment element and can be demounted from said mirror mounting button of said attachment element.

52. The accessory mounting system of claim 51, wherein a light absorbing layer disposed at the vehicle windshield at least partially masks the presence of said attachment element from view by a viewer who is viewing from outside the equipped vehicle through the vehicle windshield.

53. The accessory mounting system of claim 50, wherein said mirror reflective element comprises a prismatic mirror reflective element and wherein said interior rearview mirror assembly comprises a double-ball prismatic interior rearview mirror assembly.

54. The accessory mounting system of claim 50, wherein said forward facing camera comprises a CMOS imaging device and wherein said forward facing camera comprises a component of at least one of (i) an automatic headlamp control system of the equipped vehicle, (ii) a collision avoidance system of the equipped vehicle, (iii) a windshield fogging detection system of the equipped vehicle and (iv) a rain sensing system of the equipped vehicle.

55. The accessory mounting system of claim 50, wherein said mirror reflective element comprises an electrochromic mirror reflective element and wherein said interior rearview mirror assembly comprises a double-ball electrochromic interior rearview mirror assembly.

56. An accessory mounting system for a vehicle, said accessory mounting system comprising:
    an attachment element adhesively attached at an in-cabin surface of a vehicle windshield of a vehicle equipped with said accessory mounting system;
    said attachment element comprising a mirror mounting button;
    at least one attachment member adhesively attached at the in-cabin surface of the vehicle windshield local to said attachment element;
    an interior rearview mirror assembly comprising a mirror head and a mirror support;
    wherein said mirror head comprises a mirror reflective element and a mirror casing;
    wherein said mirror support comprises a mirror mount that is configured to mount said interior rearview mirror assembly to said mirror mounting button of said attachment element at the in-cabin surface of the vehicle windshield;
    a structure configured for mounting to said at least one attachment member attached at the in-cabin surface of the vehicle windshield;
    said structure configured to receive and be supported by said at least one attachment member that is adhesively attached at the in-cabin surface of the vehicle windshield;
    wherein said structure is configured to accommodate a forward facing camera;
    wherein, with said structure received by and supported by said at least one attachment member and when said structure is accommodating said forward facing camera, said forward facing camera has a field of view through the vehicle windshield;
    wherein, with said structure received by and supported by said at least one attachment member, said mirror mount can be mounted to said mirror mounting button of said attachment element and can be demounted from said mirror mounting button of said attachment element without demounting said structure from said at least one attachment member; and
    a housing that at least substantially hides the presence of said forward facing camera from view by a person viewing from inside the vehicle cabin.

57. The accessory mounting system of claim 56, wherein said forward facing camera comprises a CMOS imaging device.

58. The accessory mounting system of claim 57, wherein wiring that supplies at least one of power and a signal to said interior rearview mirror assembly passes through said housing.

59. The accessory mounting system of claim 58, wherein said housing houses a plurality of accessories, one of which comprises a rain sensor.

60. The accessory mounting system of claim 56, wherein a light absorbing layer disposed at the vehicle windshield at least partially masks the presence of said attachment element from view by a viewer who is viewing from outside the equipped vehicle through the vehicle windshield.

61. The accessory mounting system of claim 60, wherein, with said structure received by and supported by said at least one attachment member, at least one of (a) a lowermost portion of said structure is disposed generally below said attachment element, (b) an uppermost portion of said structure is disposed generally above said attachment element, (c) a rightmost portion of said structure is disposed generally leftward of said attachment element and (d) a leftmost portion of said structure is disposed generally rightward of said attachment element.

62. An accessory mounting system for a vehicle, said accessory mounting system comprising:

an attachment element adhesively attached at an in-cabin surface of a vehicle windshield of a vehicle equipped with said accessory mounting system;

said attachment element comprising a mirror mounting button;

at least one attachment member adhesively attached at the in-cabin surface of the vehicle windshield local to said attachment element;

an interior rearview mirror assembly comprising a mirror head and a mirror support;

wherein said mirror head comprises a mirror reflective element and a mirror casing;

wherein said mirror support comprises a mirror mount that is configured to mount said interior rearview mirror assembly to said mirror mounting button of said attachment element;

a structure configured for mounting to said at least one attachment member attached at the in-cabin surface of the vehicle windshield;

said structure configured to receive and be supported by said at least one attachment member that is adhesively attached at the in-cabin surface of the vehicle windshield;

wherein said structure is configured to accommodate a forward facing camera;

wherein, with said structure received by and supported by said at least one attachment member and when said structure is accommodating said forward facing camera, said forward facing camera has a field of view through the vehicle windshield;

wherein, with said structure received by and supported by said at least one attachment member, at least one of (a) a lowermost portion of said structure is disposed generally below said attachment element, (b) an uppermost portion of said structure is disposed generally above said attachment element, (c) a rightmost portion of said structure is disposed generally leftward of said attachment element and (d) a leftmost portion of said structure is disposed generally rightward of said attachment element;

wherein, with said structure received by and supported by said at least one attachment member, said mirror mount can be mounted to said mirror mounting button of said attachment element and can be demounted from said mirror mounting button of said attachment element without demounting said structure from said at least one attachment member; and wherein a light absorbing layer disposed at the vehicle windshield at least partially masks the presence of said at least one attachment member from view by a viewer who is viewing from outside the equipped vehicle through the vehicle windshield.

63. The accessory mounting system of claim 62, wherein said light absorbing layer disposed at the vehicle windshield further at least partially masks the presence of said attachment element from view by a viewer who is viewing from outside the equipped vehicle through the vehicle windshield.

64. The accessory mounting system of claim 63, wherein said attachment element accommodates a rain sensor.

65. The accessory mounting system of claim 63, wherein said light absorbing layer comprises a substantially opaque frit layer.

66. The accessory mounting system of claim 63, wherein said light absorbing layer comprises a portion of a shadeband of the vehicle windshield.

67. The accessory mounting system of claim 63, wherein said structure accommodates at least another accessory and wherein said at least another accessory comprises a rain sensor, and wherein said interior rearview mirror assembly comprise a double-ball interior rearview mirror assembly, and wherein said forward facing camera comprises a CMOS imaging device.

68. The accessory mounting system of claim 62, wherein said structure accommodates a rain sensor.

69. The accessory mounting system of claim 62, wherein said forward facing camera comprises a CMOS imaging device and wherein said forward facing camera comprises a component of at least one of (i) an automatic headlamp control system of the equipped vehicle, (ii) a collision avoidance system of the equipped vehicle, (iii) a windshield fogging detection system of the equipped vehicle and (iv) a rain sensing system of the equipped vehicle.

70. An accessory mounting system for a vehicle, said accessory mounting system comprising:

an attachment element adhesively attached at an in-cabin surface of a vehicle windshield of a vehicle equipped with said accessory mounting system;

said attachment element comprising a mirror mounting button;

a plurality of attachment members adhesively attached at the in-cabin surface of the vehicle windshield local to said attachment element;

an interior rearview mirror assembly comprising a mirror head and a mirror support;

wherein said mirror head comprises a mirror reflective element and a mirror casing;

wherein said mirror support comprises a mirror mount that is configured to mount said interior rearview mirror assembly to said mirror mounting button of said attachment element;

a structure configured for mounting to said plurality of attachment members attached at the in-cabin surface of the vehicle windshield;

said structure configured to receive and be supported by said plurality of attachment members that are adhesively attached at the in-cabin surface of the vehicle windshield;

wherein said structure is configured to accommodate a forward facing camera;

wherein, with said structure received by and supported by said attachment members and when said structure is accommodating said forward facing camera, said forward facing camera has a field of view through the vehicle windshield;

wherein, with said structure received by and supported by said attachment members, at least one of (a) a lowermost portion of said structure is disposed generally below said attachment element, (b) an uppermost portion of said structure is disposed generally above said attachment element, (c) a rightmost portion of said structure is disposed generally leftward of said attachment element and (d) a leftmost portion of said structure is disposed generally rightward of said attachment element;

a housing that at least substantially hides the presence of said forward facing camera from view by a person viewing from inside the vehicle cabin, and wherein, with said structure received by and supported by said attachment members, at least a portion of said housing is disposed above said attachment element;

wherein, with said structure received by and supported by said attachment members, said mirror mount can be mounted to said mirror mounting button of said attachment element and can be demounted from said mirror mounting button of said attachment element without demounting said structure from said attachment members; and wherein a light absorbing layer disposed at the vehicle windshield at least partially masks the presence of said plurality of attachment members from view by a viewer who is viewing from outside the equipped vehicle through the vehicle windshield.

71. The accessory mounting system of claim 70, wherein wiring that supplies at least one of power and a signal to said interior rearview mirror assembly pass through said housing.

72. The accessory mounting system of claim 70, wherein said housing houses said forward facing camera and a rain sensor.

73. The accessory mounting system of claim 70, wherein said housing houses said forward facing camera and an antenna.

74. The accessory mounting system of claim 70, wherein said interior rearview mirror assembly comprises a video mirror having a video display screen disposed in said mirror head and displaying information for viewing through said reflective element by a driver of the equipped vehicle.

75. The accessory mounting system of claim 70, wherein said forward facing camera comprises a CMOS imaging device and wherein said forward facing camera comprises a component of at least one of (i) an automatic headlamp control system of the equipped vehicle, (ii) a collision avoidance system of the equipped vehicle, (iii) a windshield fogging detection system of the equipped vehicle and (iv) a rain sensing system of the equipped vehicle.

76. The accessory mounting system of claim 70, wherein said attachment element accommodates a rain sensor.

77. The accessory mounting system of claim 70, wherein said structure accommodates a rain sensor.

78. An accessory mounting system for a vehicle, said accessory mounting system comprising:
an attachment element adhesively attached at an in-cabin surface of a vehicle windshield of a vehicle equipped with said accessory mounting system;
at least one attachment member adhesively attached at the in-cabin surface of the vehicle windshield local to said attachment element;
said attachment element comprising a mirror mounting button;
an interior rearview mirror assembly comprising a mirror head and a mirror support;
wherein said mirror head comprises a mirror reflective element and a mirror casing;
wherein said mirror support comprises a mirror mount that is configured to mount said interior rearview mirror assembly to said mirror mounting button of said attachment element;
a structure configured for mounting to said at least one attachment member attached at the in-cabin surface of the vehicle windshield;
wherein, with said structure received by and supported by said at least one attachment member, at least one of (a) said structure is configured to accommodate a forward facing camera and, with said structure received by and supported by said at least one attachment member and when said structure is accommodating said forward facing camera, said forward facing camera has a field of view through the vehicle windshield, and (b) said structure straddles said attachment element;

wherein a light absorbing layer disposed at the vehicle windshield at least partially masks the presence of said attachment element from view by a viewer who is viewing from outside the equipped vehicle through the vehicle windshield; and wherein, with said structure received by and supported by said at least one attachment member, said mirror mount can be mounted to said mirror mounting button of said attachment element and can be demounted from said mirror mounting button of said attachment element without demounting said structure from said at least one attachment member.

79. The accessory mounting system of claim 78, comprising a housing that at least substantially hides the presence of said structure from view by a person viewing from inside the vehicle cabin.

80. The accessory mounting system of claim 79, and wherein said interior rearview mirror assembly comprise a double-ball interior rearview mirror assembly, and wherein said forward facing camera comprises a CMOS imaging device.

81. The accessory mounting system of claim 80, wherein said structure accommodates at least another accessory.

82. The accessory mounting system of claim 81, wherein said at least another accessory comprises a rain sensor.

83. The accessory mounting system of claim 79, wherein, with said structure received by and supported by said at least one attachment member, at least a portion of a housing is disposed above said attachment element.

84. The accessory mounting system of claim 78, wherein said light absorbing layer comprises a portion of a shadeband of the vehicle windshield.

85. The accessory mounting system of claim 84, wherein said light absorbing layer comprises a substantially opaque frit layer.

86. The accessory mounting system of claim 78, wherein said light absorbing layer comprises a substantially opaque frit layer.

87. The accessory mounting system of claim 86, wherein said light absorbing layer comprises a portion of a shadeband of the vehicle windshield.

88. The accessory mounting system of claim 78, wherein said forward facing camera comprises a CMOS imaging device and wherein said forward facing camera comprises a component of at least one of (i) an automatic headlamp control system of the equipped vehicle, (ii) a collision avoidance system of the equipped vehicle, (iii) a windshield fogging detection system of the equipped vehicle and (iv) a rain sensing system of the equipped vehicle.

89. The accessory mounting system of claim 78, wherein said attachment element accommodates a rain sensor.

90. An accessory mounting system for a vehicle, said accessory mounting system comprising:
an attachment element adhesively attached at an in-cabin surface of a vehicle windshield of a vehicle equipped with said accessory mounting system;
said attachment element comprising a mirror mounting button;

a plurality of attachment members adhesively attached at the in-cabin surface of the vehicle windshield local to said attachment element;

an interior rearview mirror assembly comprising a mirror head and a mirror support;

wherein said mirror head comprises a mirror reflective element and a mirror casing;

wherein said mirror support comprises a mirror mount that is configured to mount said interior rearview mirror assembly to said mirror mounting button of said attachment element;

a structure configured for mounting to said plurality of attachment members attached at the in-cabin surface of the vehicle windshield;

said structure configured to receive and be supported by said plurality of attachment members that are adhesively attached at the in-cabin surface of the vehicle windshield;

wherein said structure is configured to accommodate a forward facing camera;

wherein, with said structure received by and supported by said attachment members and when said structure is accommodating said forward facing camera, said forward facing camera has a field of view through the vehicle windshield;

wherein said forward facing camera comprises a CMOS imaging device;

wherein said interior rearview mirror assembly comprise a double-ball interior rearview mirror assembly; and wherein, with said structure received by and supported by said attachment members, said mirror mount can be mounted to said mirror mounting button of said attachment element and can be demounted from said mirror mounting button of said attachment element without demounting said structure from said attachment members.

91. The accessory mounting system of claim 90, wherein a light absorbing layer disposed at the vehicle windshield at least partially masks the presence of said attachment element from view by a viewer who is viewing from outside the equipped vehicle through the vehicle windshield.

92. The accessory mounting system of claim 91, wherein said light absorbing layer disposed at the vehicle windshield further at least partially masks the presence of said structure from view by a viewer who is viewing from outside the equipped vehicle through the vehicle windshield.

93. The accessory mounting system of claim 92, wherein, with said structure received by and supported by said attachment members, at least one of (a) a lowermost portion of said structure is disposed generally below said attachment element, (b) an uppermost portion of said structure is disposed generally above said attachment element, (c) a rightmost portion of said structure is disposed generally leftward of said attachment element and (d) a leftmost portion of said structure is disposed generally rightward of said attachment element.

94. The accessory mounting system of claim 92, wherein said mirror reflective element comprises an electrochromic mirror reflective element and wherein said interior rearview mirror assembly comprises an electrochromic interior rearview mirror assembly.

95. The accessory mounting system of claim 94, comprising a housing that at least substantially hides the presence of said forward facing camera from view by a person viewing from inside the vehicle cabin.

96. The accessory mounting system of claim 95, wherein said forward facing camera comprises a component of at least one of (i) an automatic headlamp control system of the equipped vehicle, (ii) a collision avoidance system of the equipped vehicle, (iii) a windshield fogging detection system of the equipped vehicle and (iv) a rain sensing system of the equipped vehicle.

97. The accessory mounting system of claim 92, wherein said attachment element accommodates a rain sensor.

* * * * *